INVENTORS
FRANK A. MORRIS
CHARLES R. FISHER

BY Francis E. Blake
ATTORNEY

March 21, 1961 C. R. FISHER, JR., ET AL 2,976,347

TELEGRAPH SWITCHING SYSTEM

Filed Jan. 18, 1957 30 Sheets-Sheet 2

March 21, 1961 C. R. FISHER, JR., ET AL 2,976,347

TELEGRAPH SWITCHING SYSTEM

Filed Jan. 18, 1957 30 Sheets-Sheet 5

March 21, 1961 C. R. FISHER, JR., ET AL 2,976,347

TELEGRAPH SWITCHING SYSTEM

Filed Jan. 18, 1957 30 Sheets-Sheet 6

RECEIVING COMMUTATOR-134

March 21, 1961 C. R. FISHER, JR., ET AL 2,976,347

TELEGRAPH SWITCHING SYSTEM

Filed Jan. 18, 1957 30 Sheets-Sheet 10

March 21, 1961 C. R. FISHER, JR., ET AL 2,976,347

TELEGRAPH SWITCHING SYSTEM

Filed Jan. 18, 1957 30 Sheets-Sheet 11

March 21, 1961 C. R. FISHER, JR., ET AL 2,976,347

TELEGRAPH SWITCHING SYSTEM

Filed Jan. 18, 1957 30 Sheets-Sheet 15

March 21, 1961 C. R. FISHER, JR., ET AL 2,976,347

TELEGRAPH SWITCHING SYSTEM

Filed Jan. 18, 1957 30 Sheets-Sheet 17

March 21, 1961 C. R. FISHER, JR., ET AL 2,976,347

TELEGRAPH SWITCHING SYSTEM

Filed Jan. 18, 1957 30 Sheets-Sheet 19

March 21, 1961 C. R. FISHER, JR., ET AL 2,976,347

TELEGRAPH SWITCHING SYSTEM

Filed Jan. 18, 1957 30 Sheets-Sheet 22

March 21, 1961 C. R. FISHER, JR., ET AL 2,976,347

TELEGRAPH SWITCHING SYSTEM

Filed Jan. 18, 1957 30 Sheets-Sheet 23

March 21, 1961 C. R. FISHER, JR., ET AL 2,976,347

TELEGRAPH SWITCHING SYSTEM

Filed Jan. 18, 1957 30 Sheets-Sheet 24

March 21, 1961 C. R. FISHER, JR., ET AL 2,976,347

TELEGRAPH SWITCHING SYSTEM

Filed Jan. 18, 1957 30 Sheets-Sheet 25

United States Patent Office 2,976,347

Patented Mar. 21, 1961

2,976,347

TELEGRAPH SWITCHING SYSTEM

Charles R. Fisher, Jr., Rochester, and Frank A. Morris, Fishers, N.Y., assignors to General Dynamics Corporation, Rochester, N.Y., a corporation of Delaware Filed Jan. 18, 1957, Ser. No. 634,973

70 Claims. (Cl. 178—2)

This invention relates to a data handling system and, more particularly, to a new and improved telegraph switching system.

In existing data relaying and handling systems of the type used in a telegraph network, lengths of a sensible medium, such as a paper tape, are used in reperforating equipment to provide intermediate data storage at switching points or between data originating offices and terminating offices. The use of an expendable storage medium, such as a perforated tape, is somewhat costly from the viewpoints of material cost and handling time and usually requires the provision of an essentially mechanical mechanism, such as a perforator. Because of the high operating speeds utilized, these mechanical components require precision construction, are difficult to maintain without skilled personnel, and involve a rather large capital expenditure. In addition, it often is not possible to fully realize either the high speed operation or the reduction of installation space afforded by electronic techniques when mechanical links are interposed in the system.

Accordingly, one object of the present invention is to provide a new and improved data handling system.

Another object is to provide a data handling system including a reuseable storage medium.

Another object is the provision of a system of the type described above having new and improved data recording means.

A still further object is the provision of a system of the type described above having new and improved data transmitting means.

A still further object is to provide a new and improved automatic data switching system.

Another object is to provide a telegraph switching system having electronic receiving and transmitting commutators including a reusable magnetic medium.

Another object is to provide an improved commutator or distributor construction.

A still further object involves the provision of a data handling system having means for inserting a common or repetitive message in each of a plurality of different messages.

Another object is to provide new and improved electronic switching apparatus for a message handling network.

Other objects and advantages of the present invention will become apparent from the ensuing description of an illustrative embodiment thereof in the course of which reference is made to the accompanying drawings in which:

Figs. 1 and 2 form a block diagram of a data handling and transmitting system embodying the present invention;

Figs. 3 to 5, inclusive, illustrate the details of a line marker circuit shown in conjunction with certain components of the data transmitting system;

Figs. 6 and 7 form a schematic diagram illustrating the details of a line lockout and marker allotter circuit;

Figure 1:
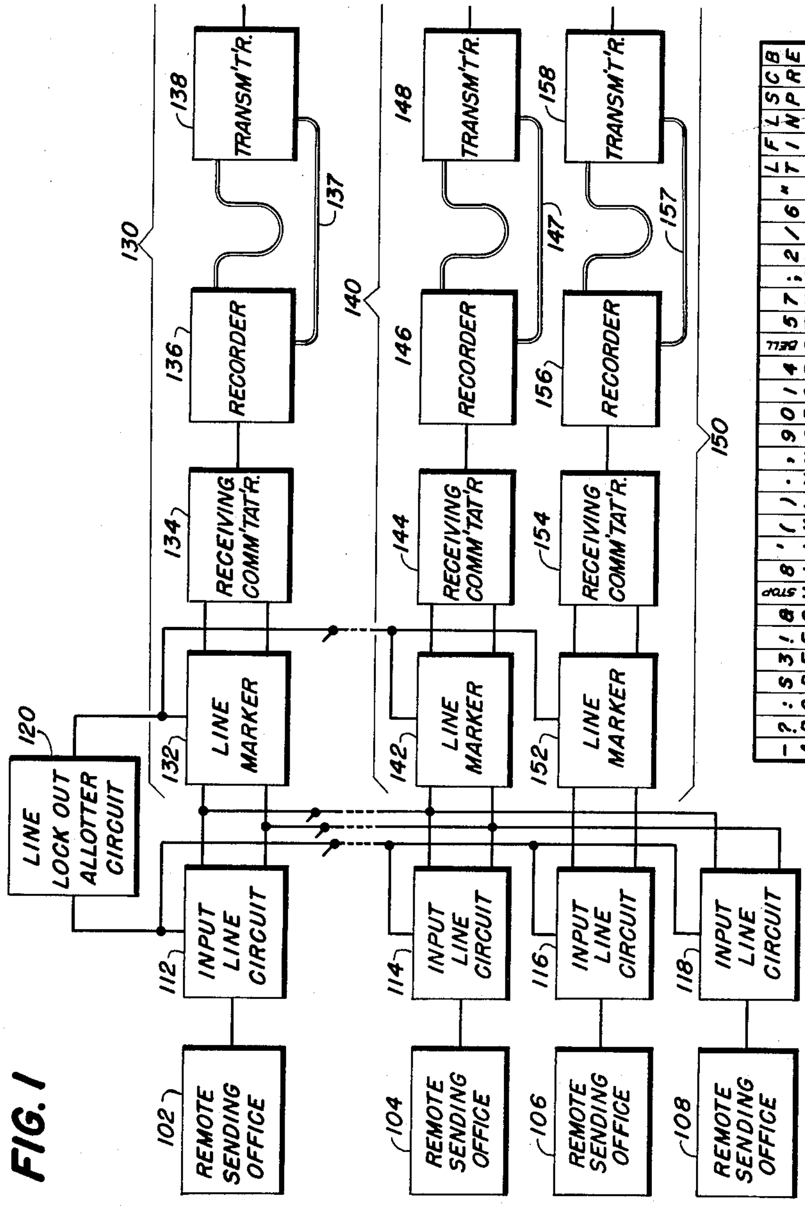
Figure 31:
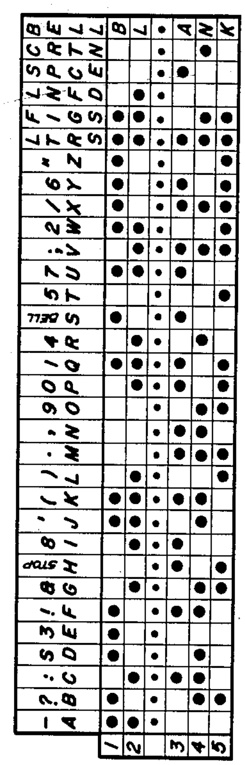
Figure 2:
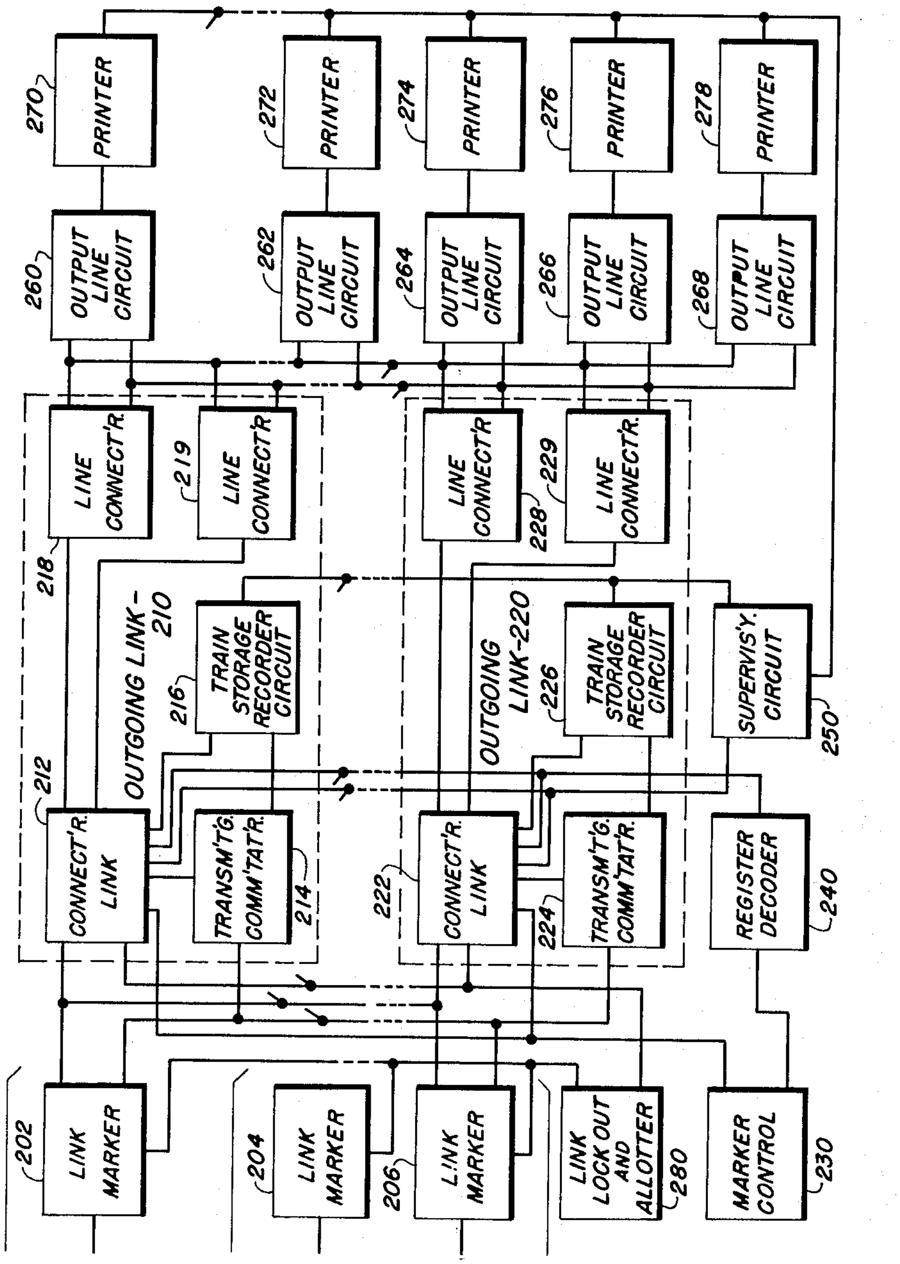
Figure 3:
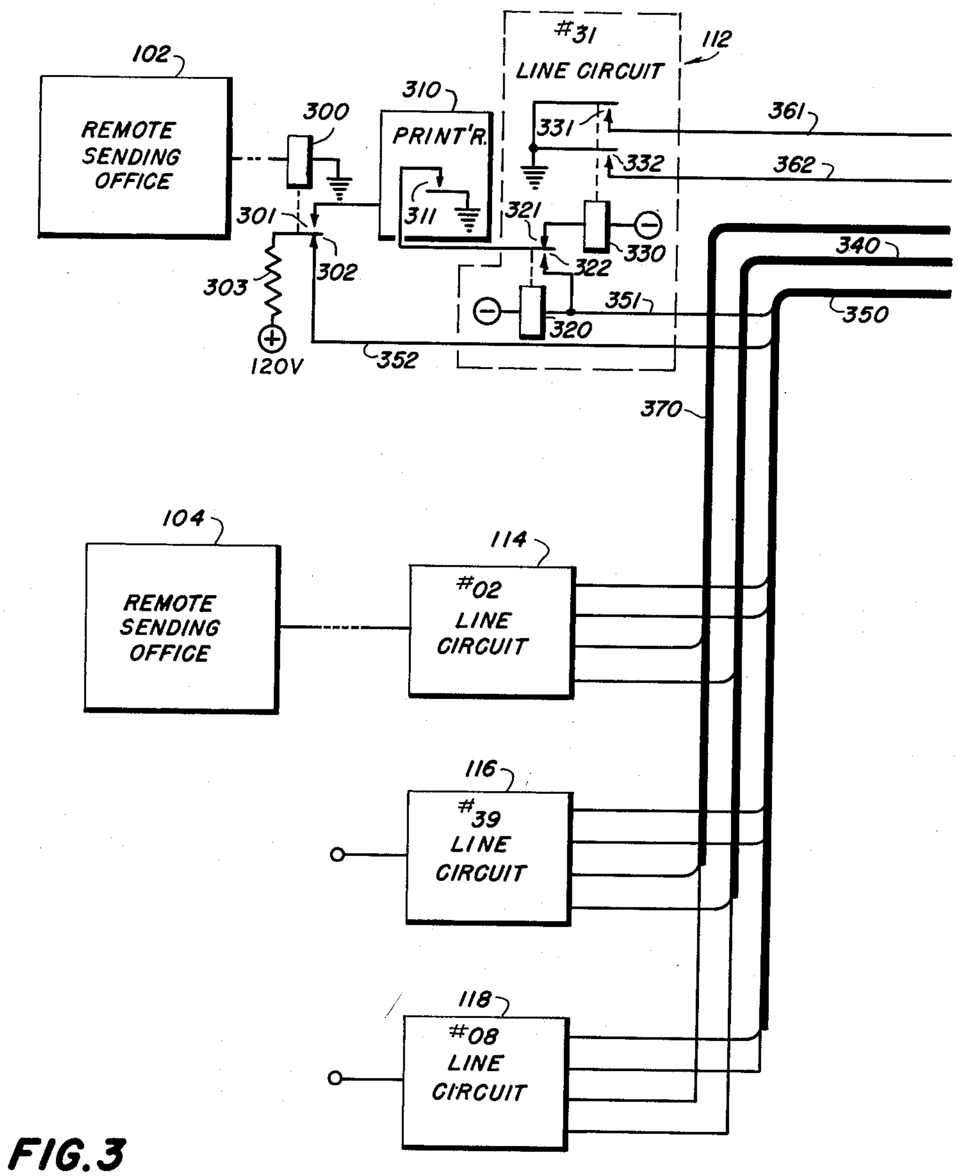
Figure 4:
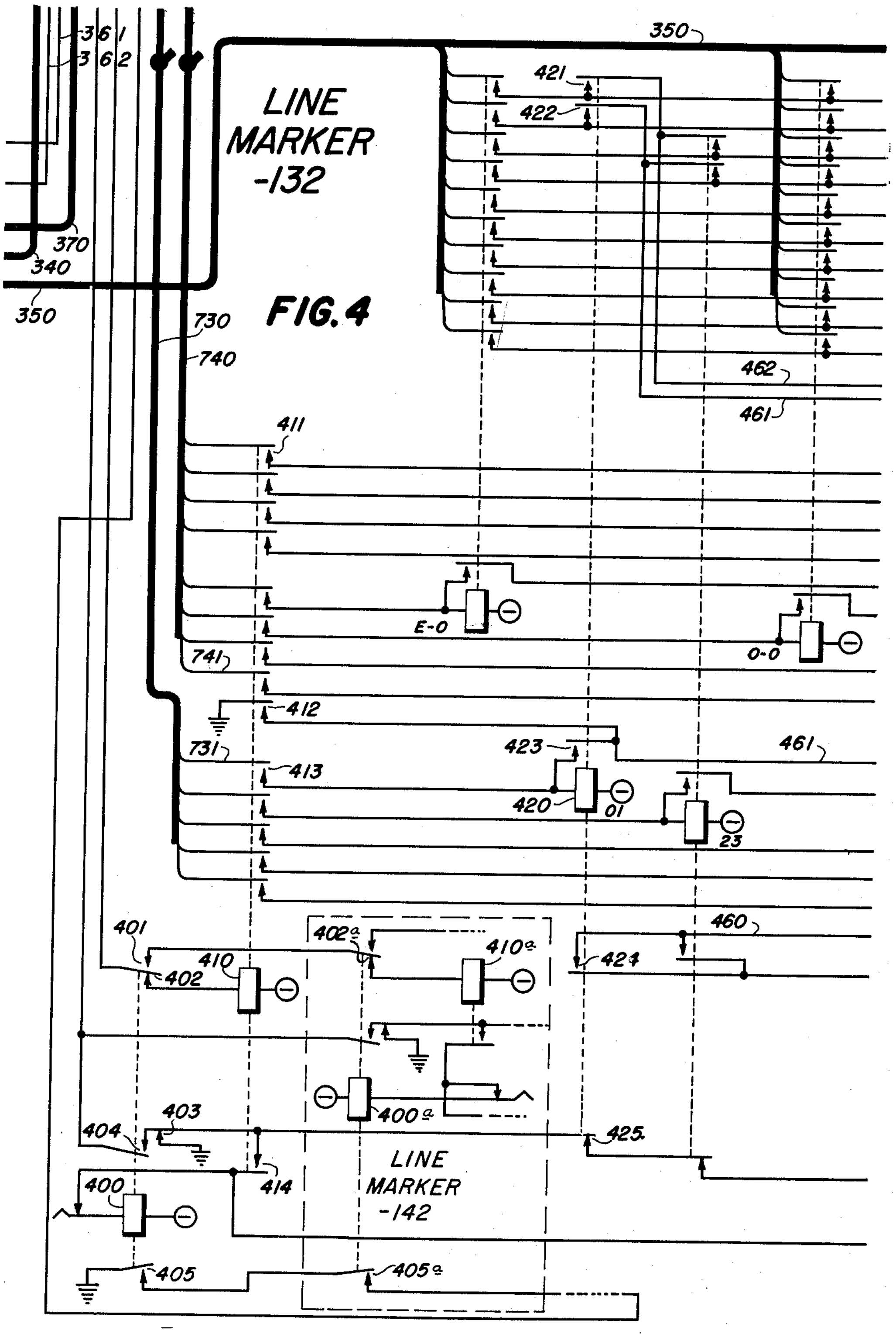
Figure 5:
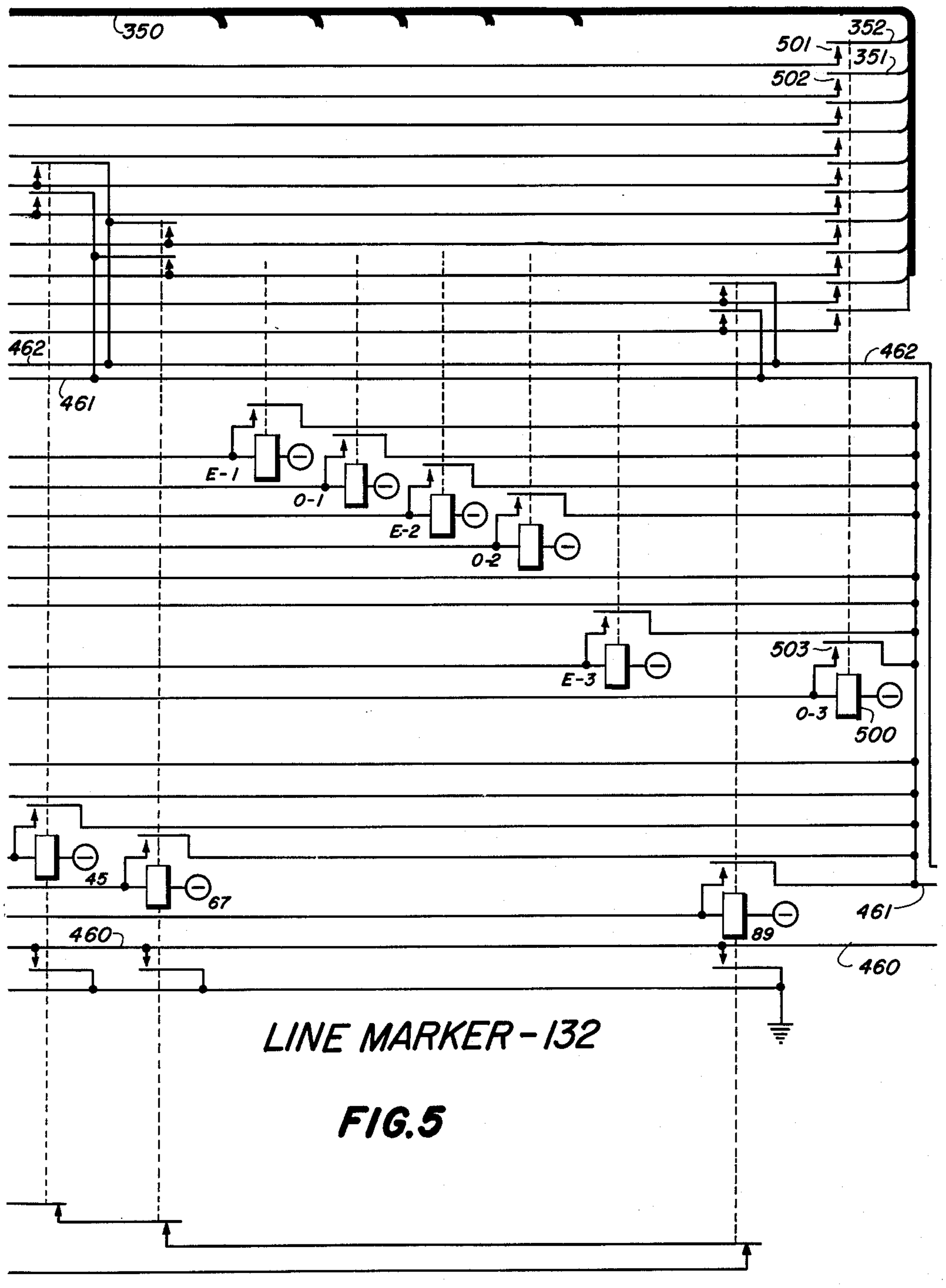
Figure 6:
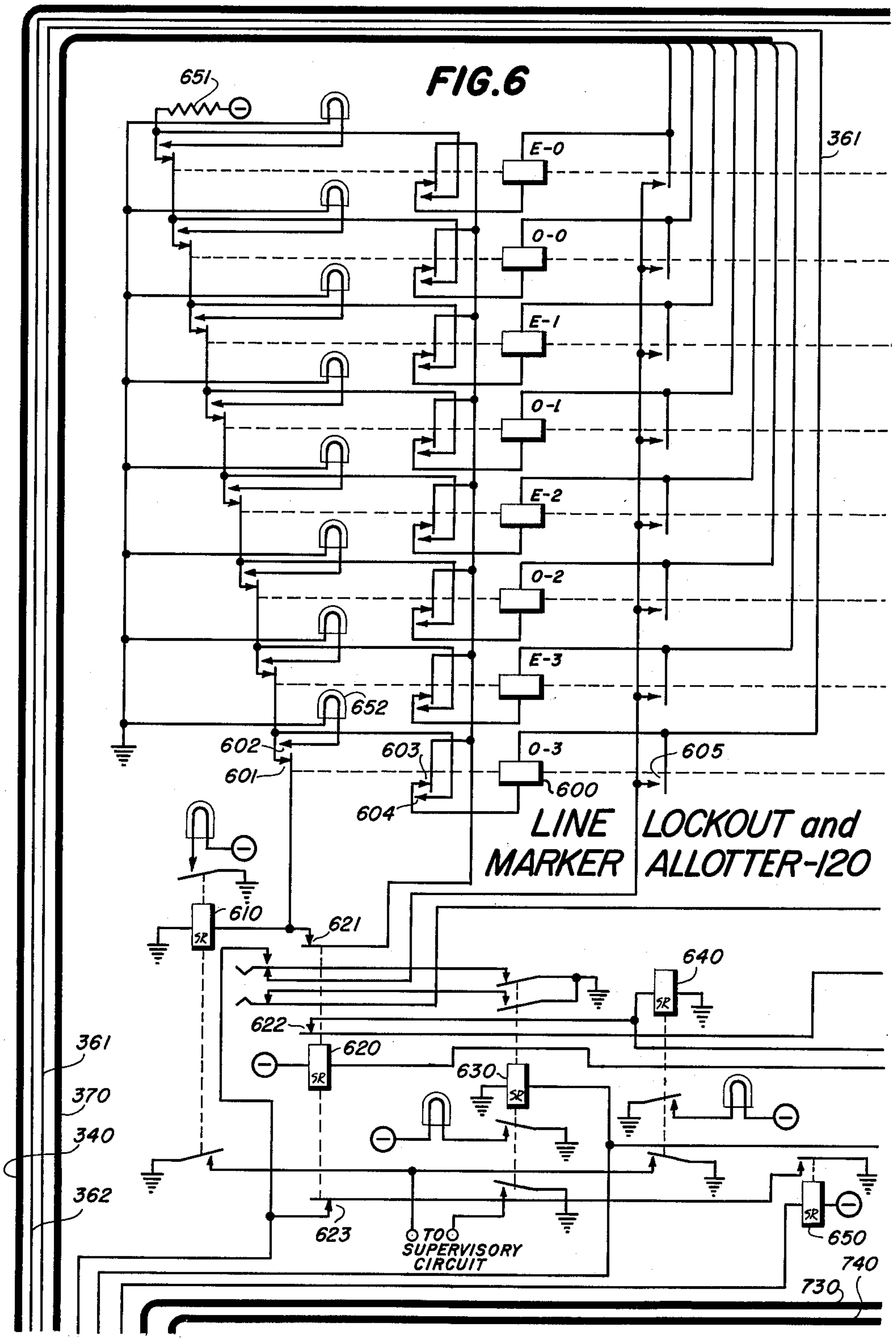
Figure 7:
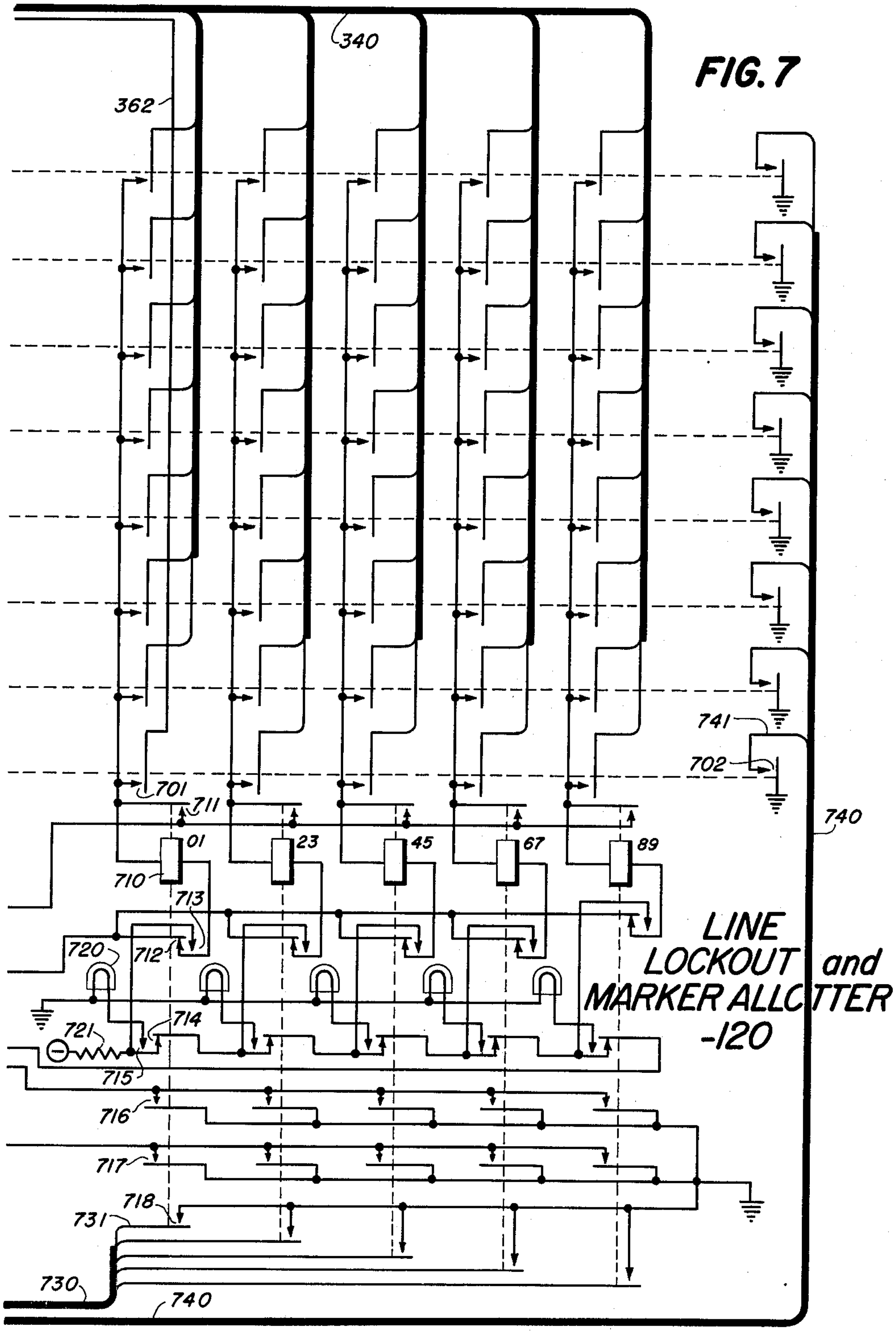
Figure 8:
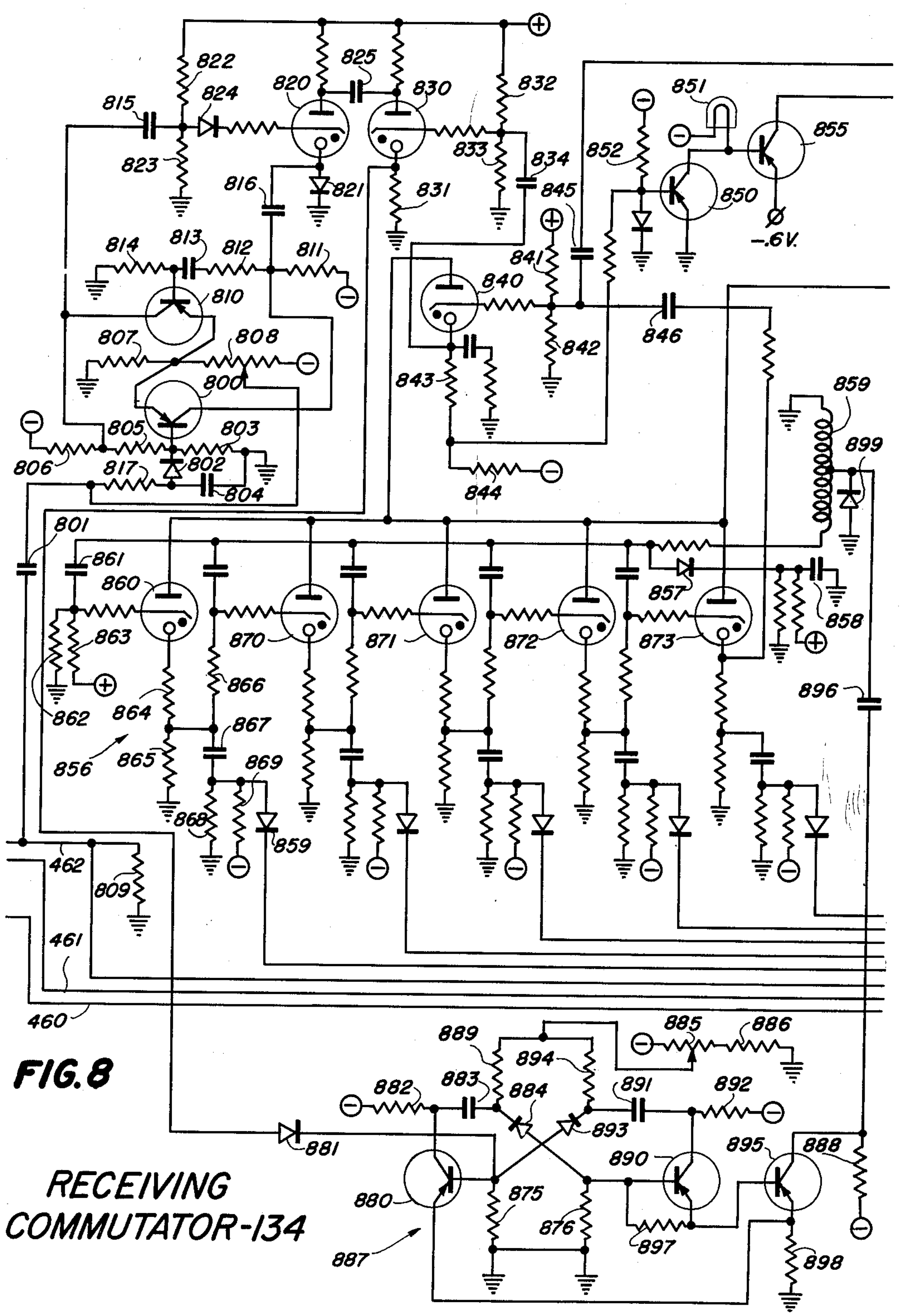
Fig. 8 is a schematic circuit diagram of a receiving commutator.
Figure 15:
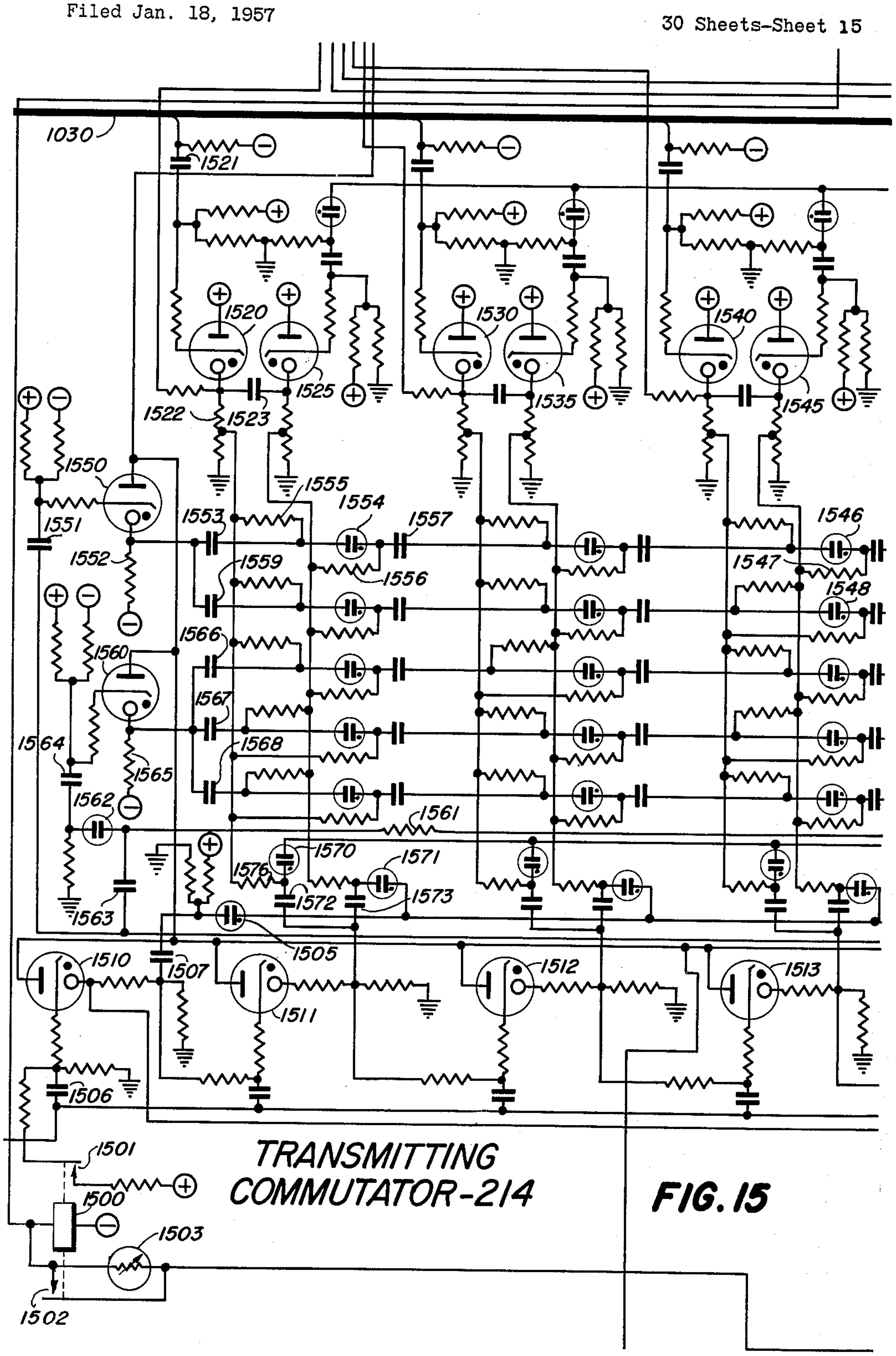
Figure 16:
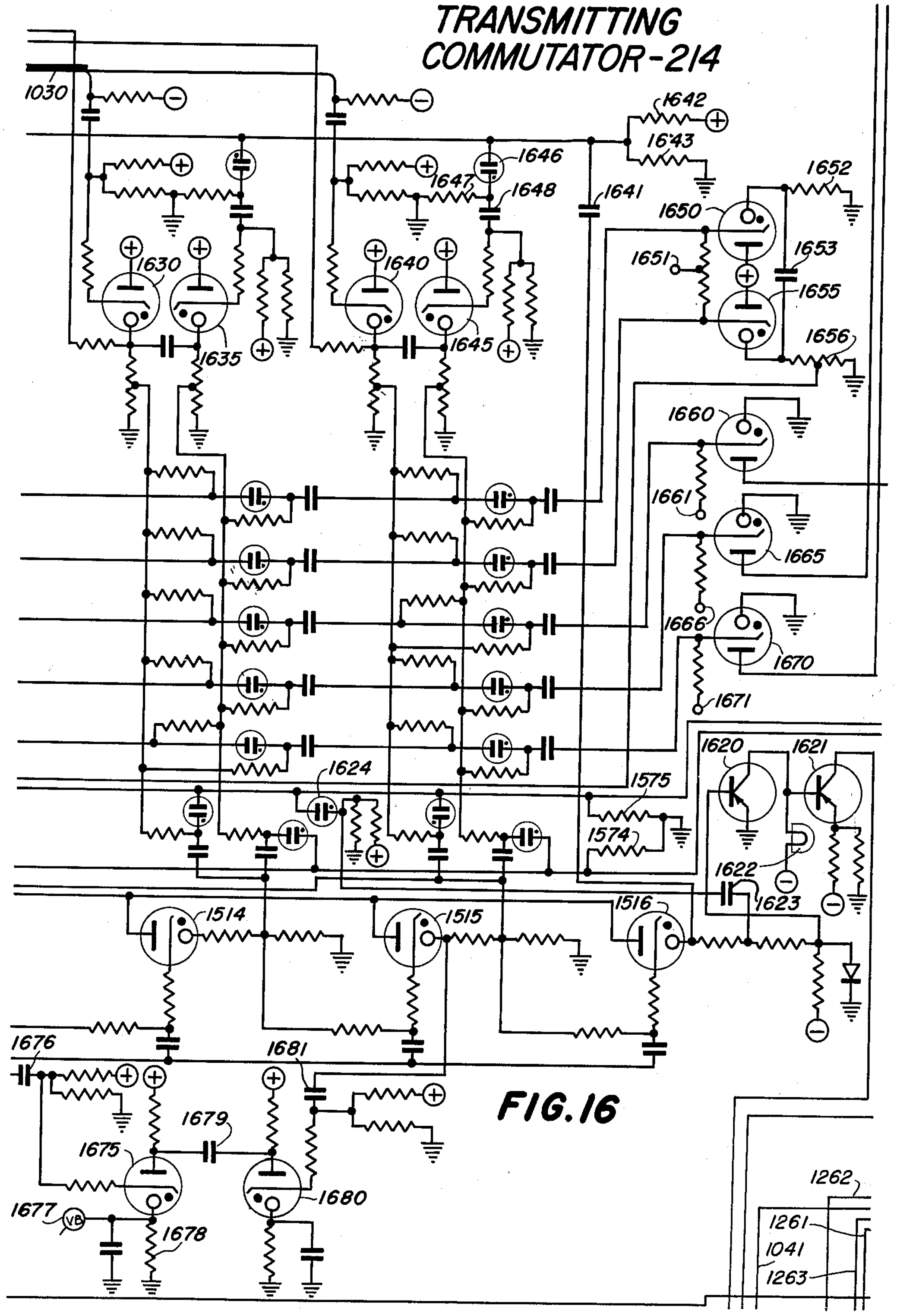
Figure 17:
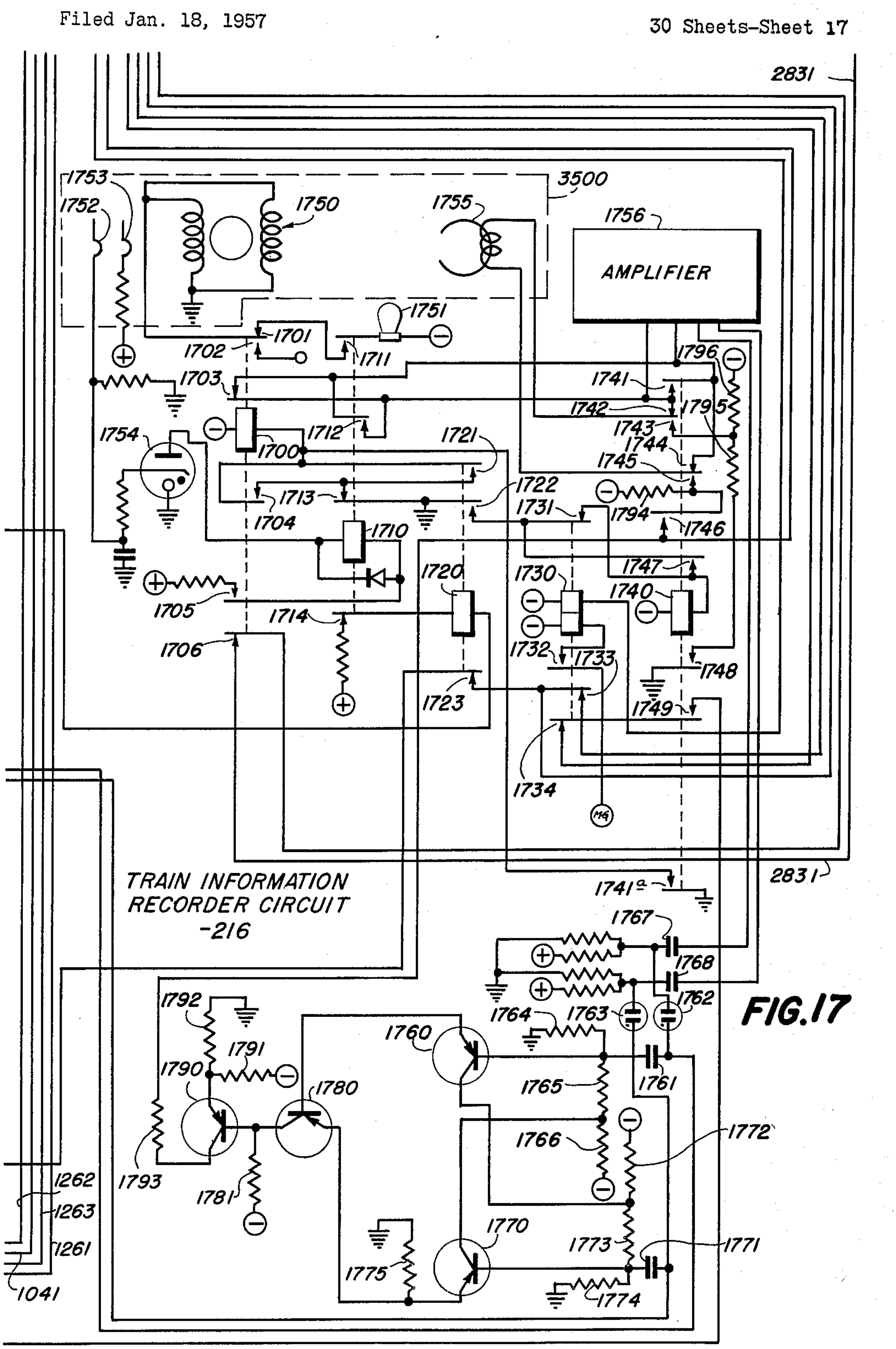
Figure 18:
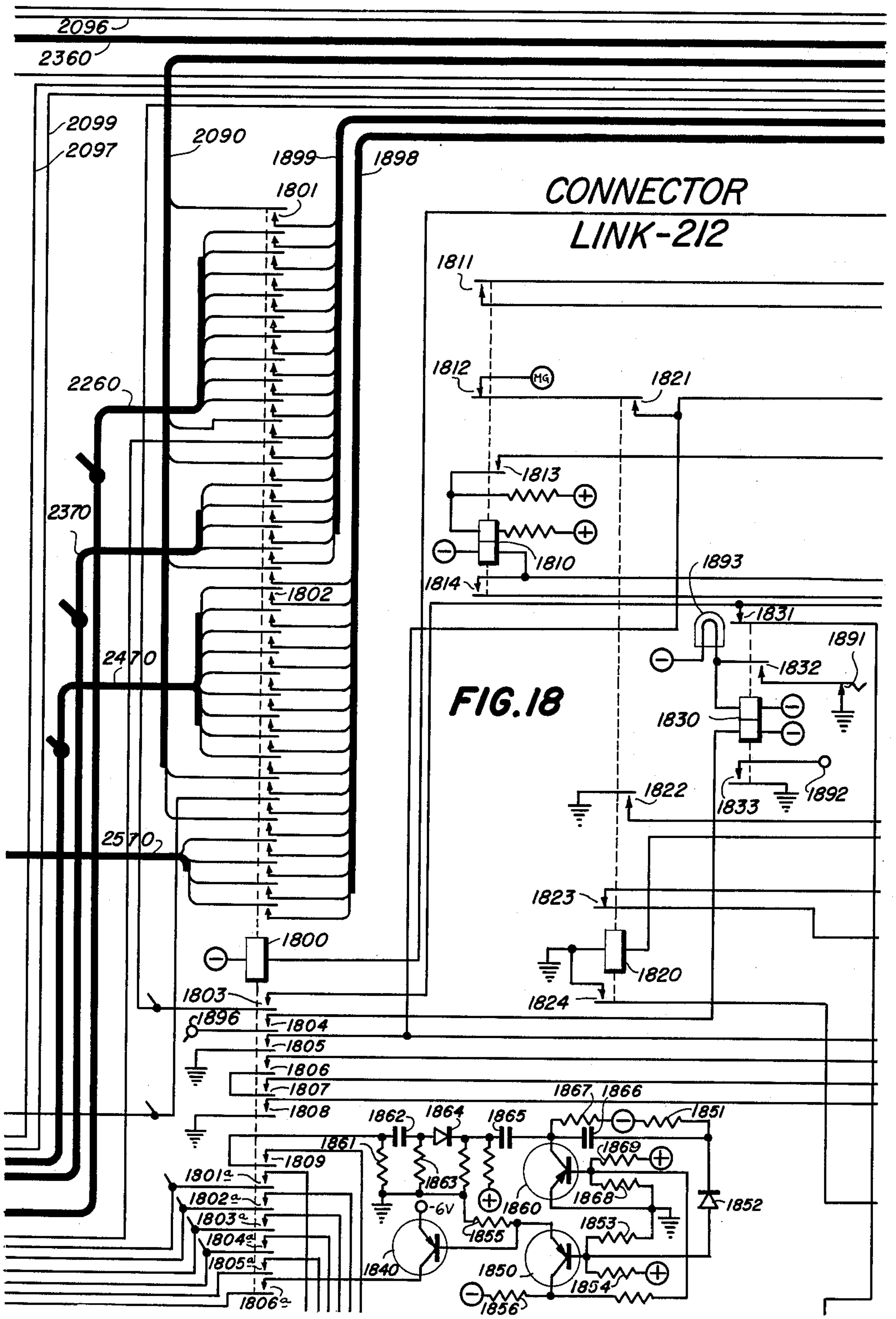
Figure 19:
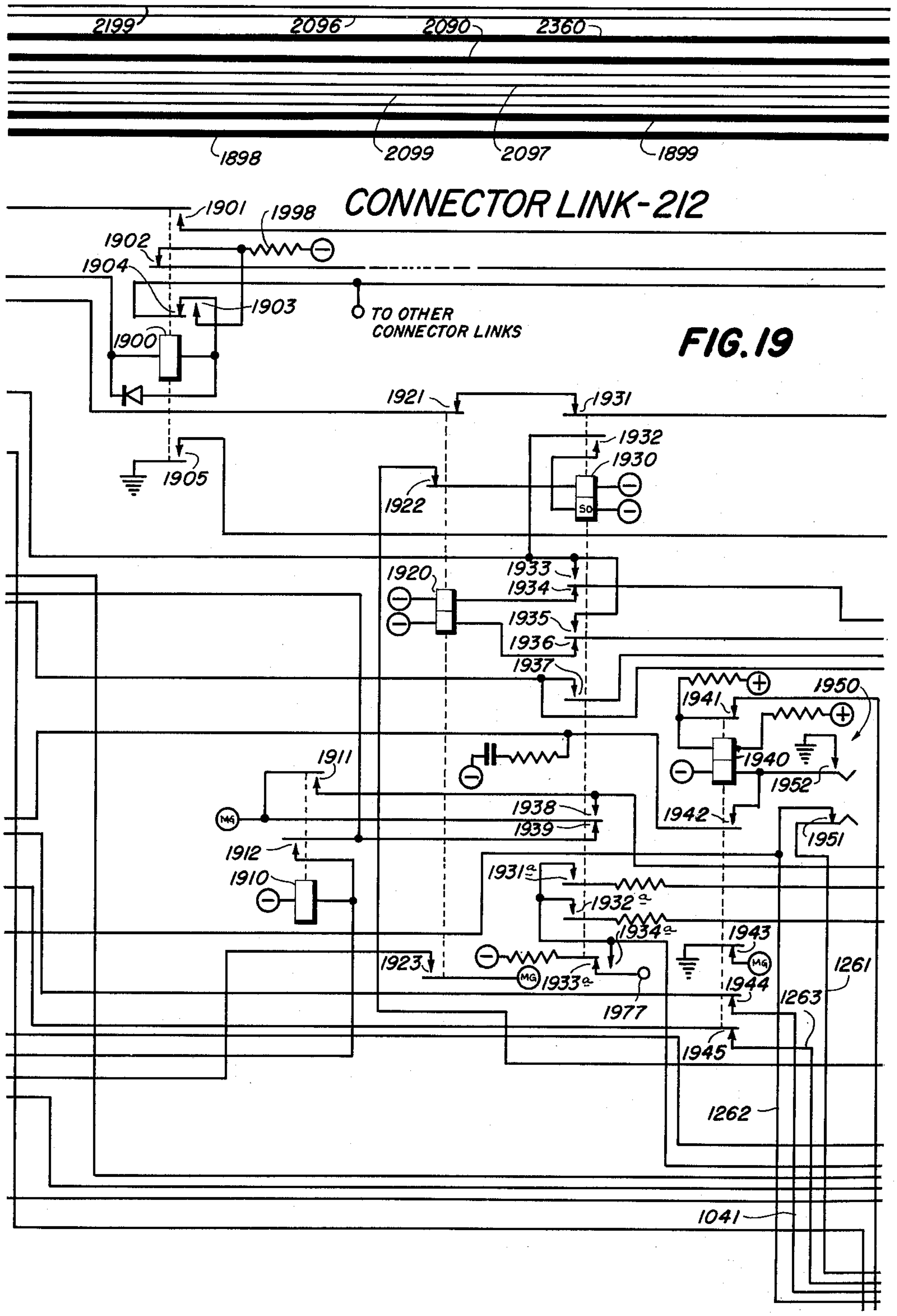
Figure 20:
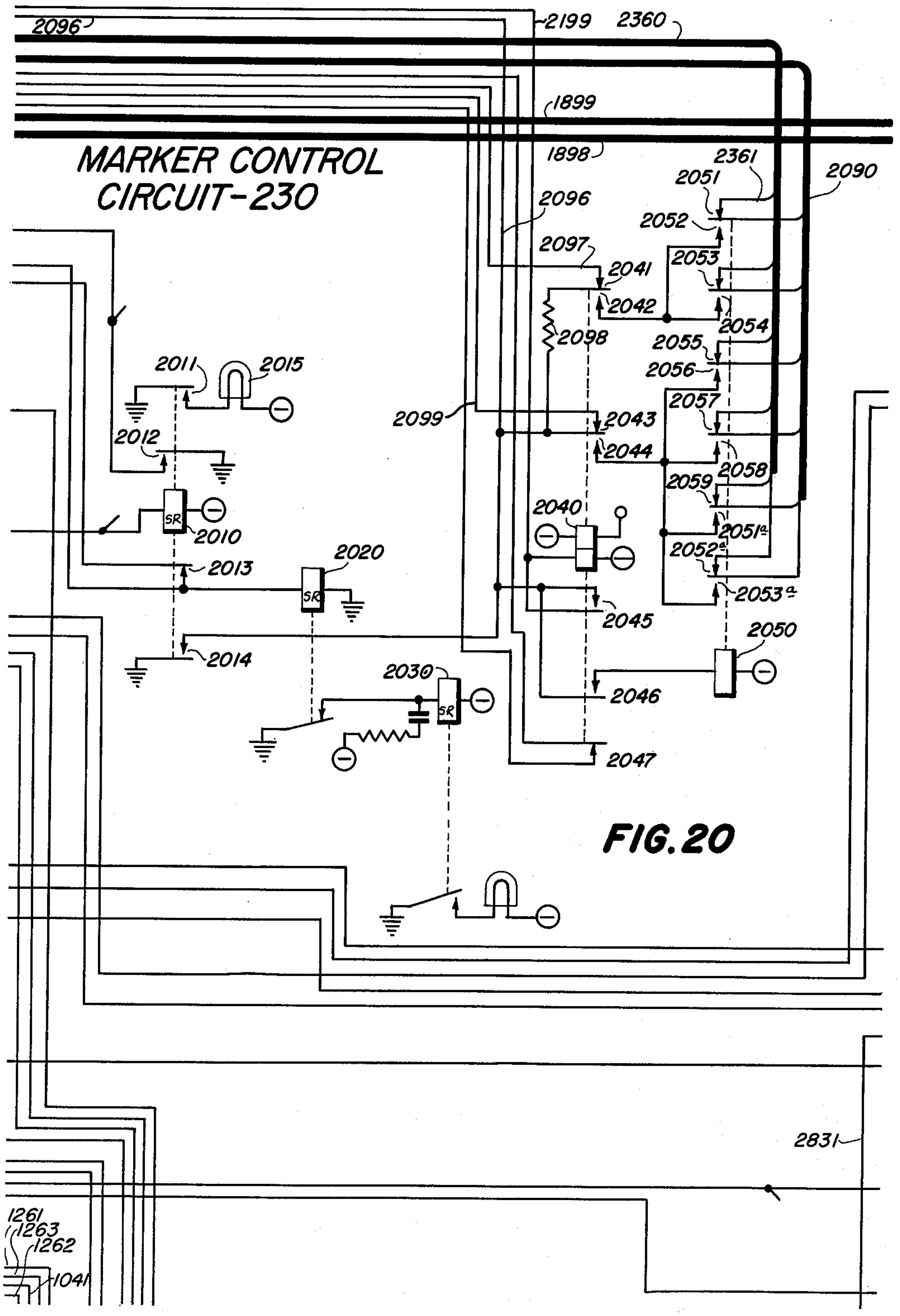
Figure 21:
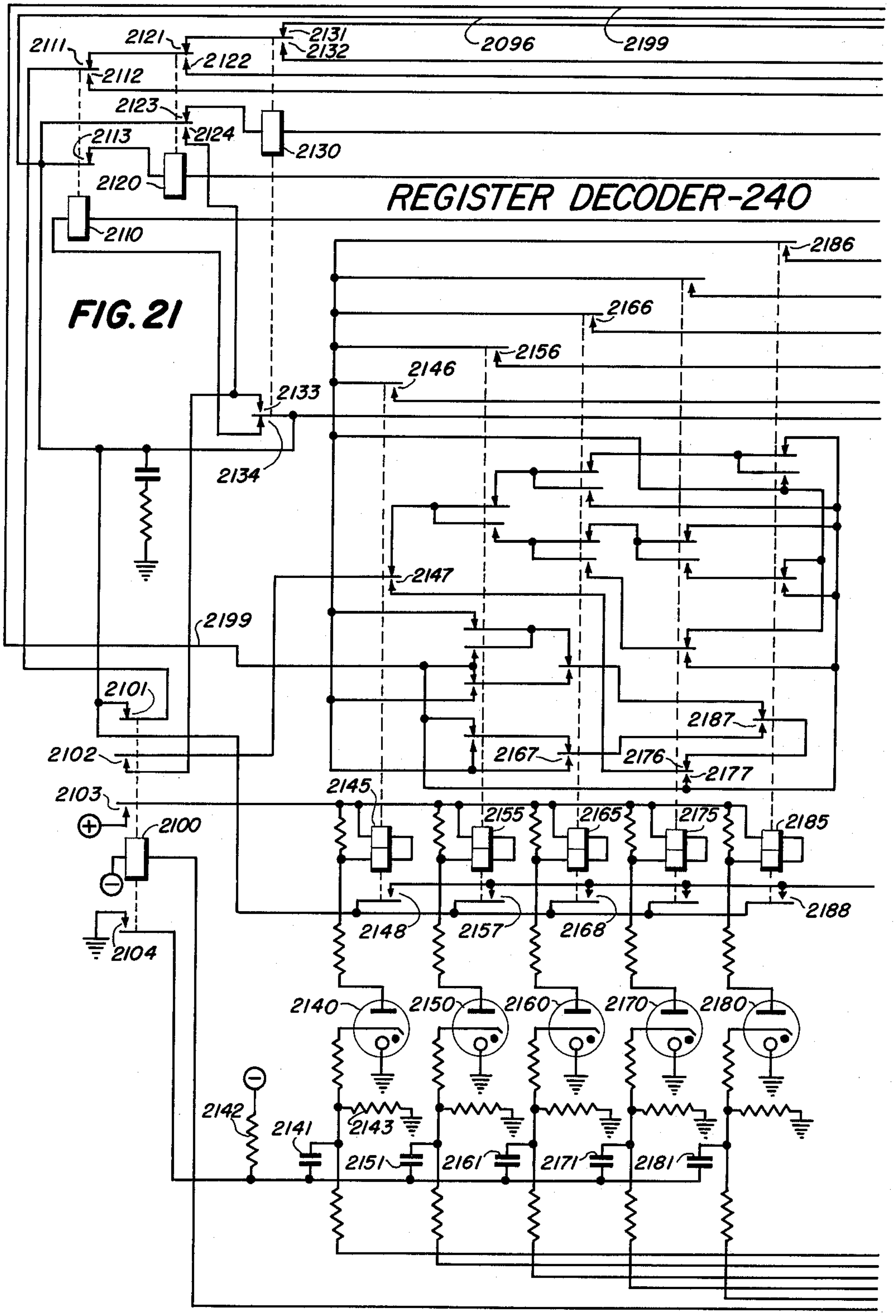
Figure 22:
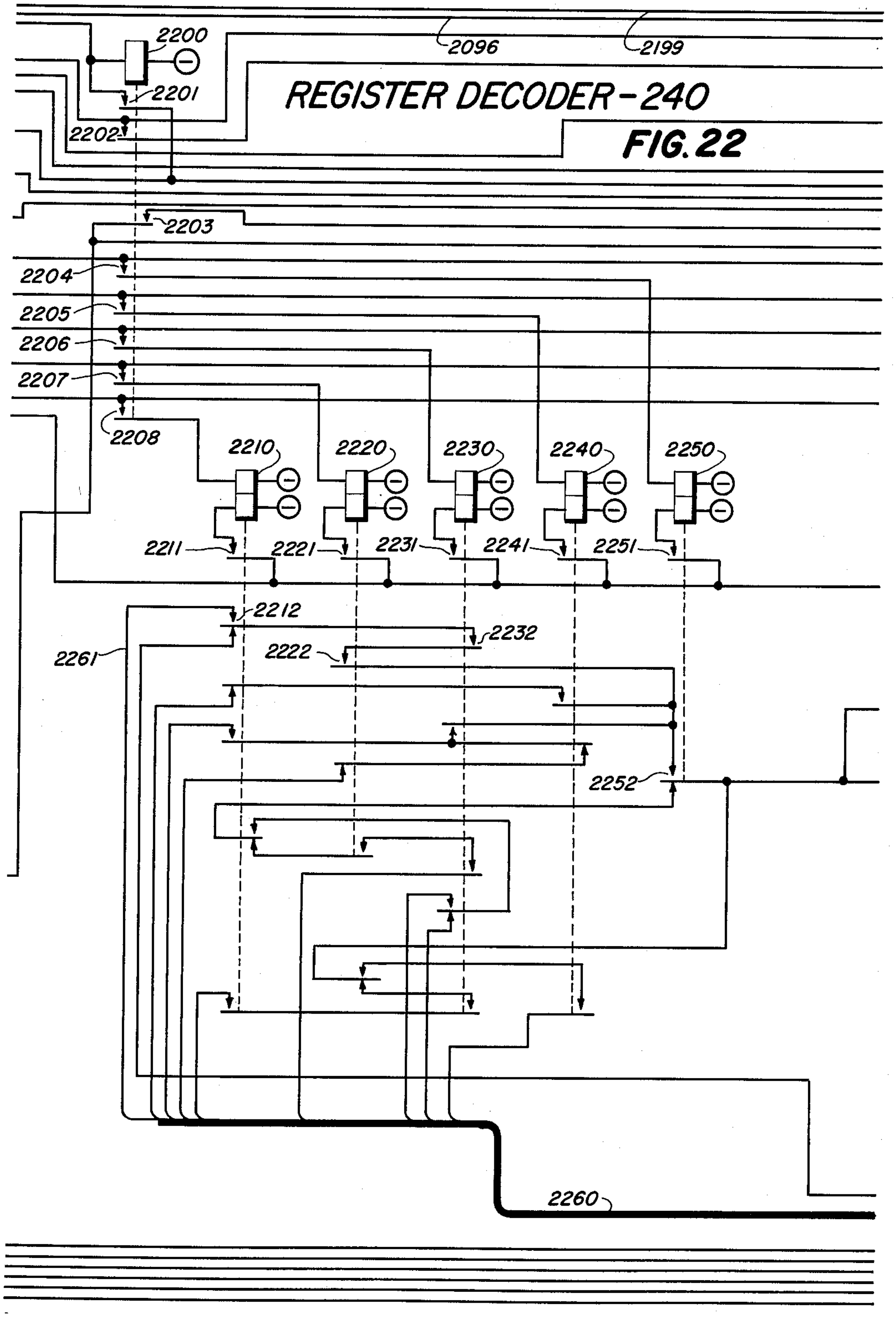
Figure 23:
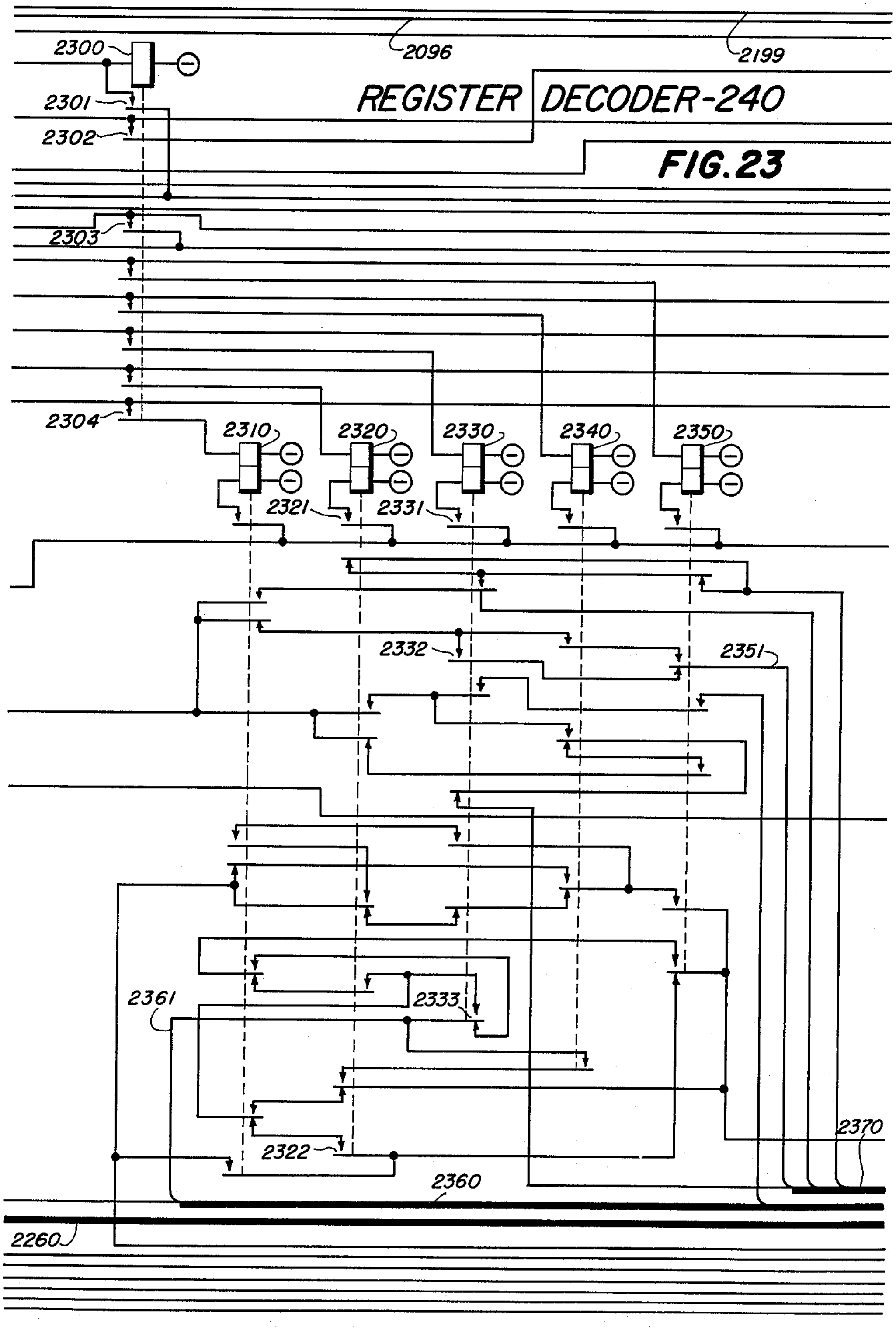
Figure 24:
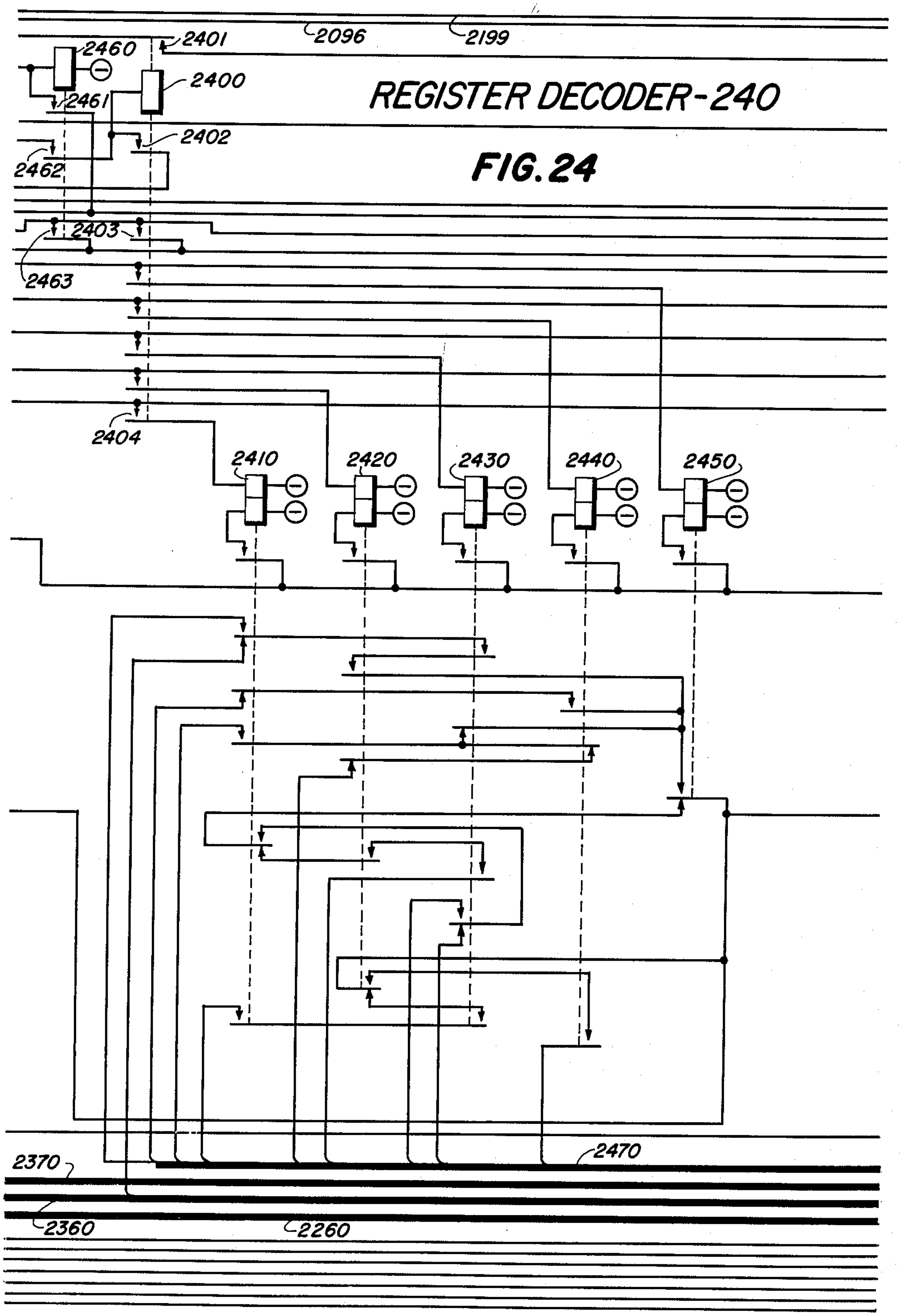
Figure 25:
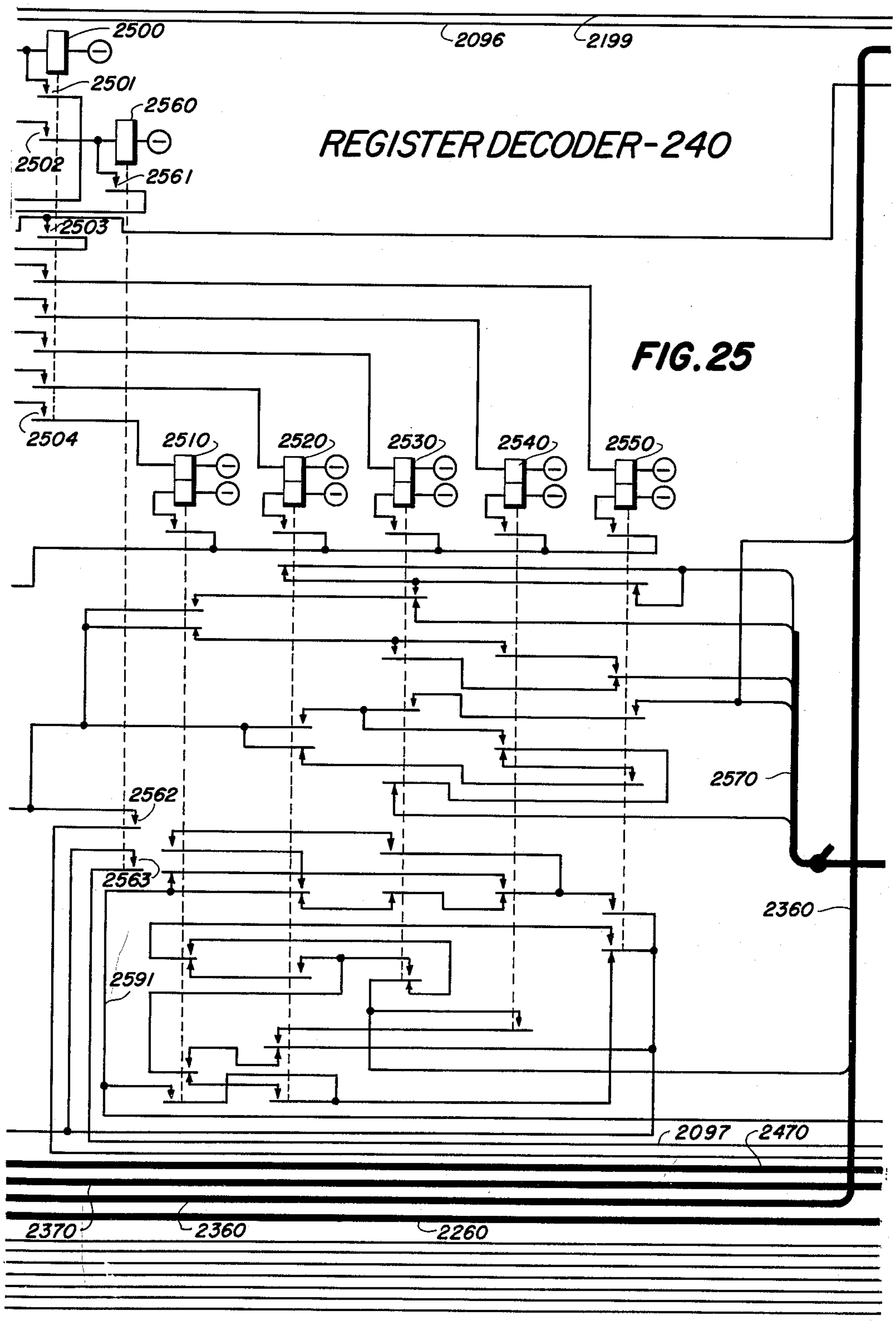
Figure 26:
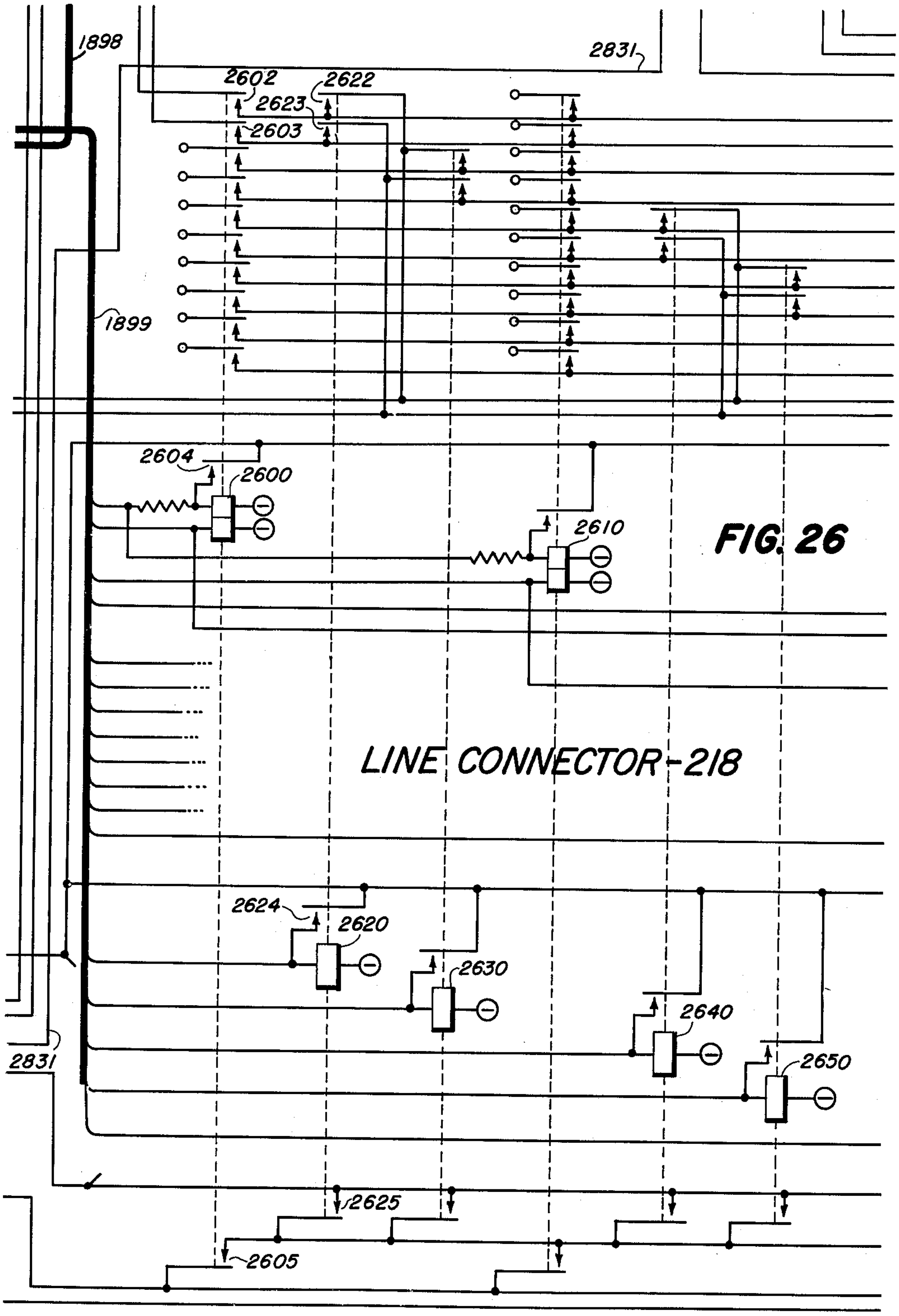
Figure 27:
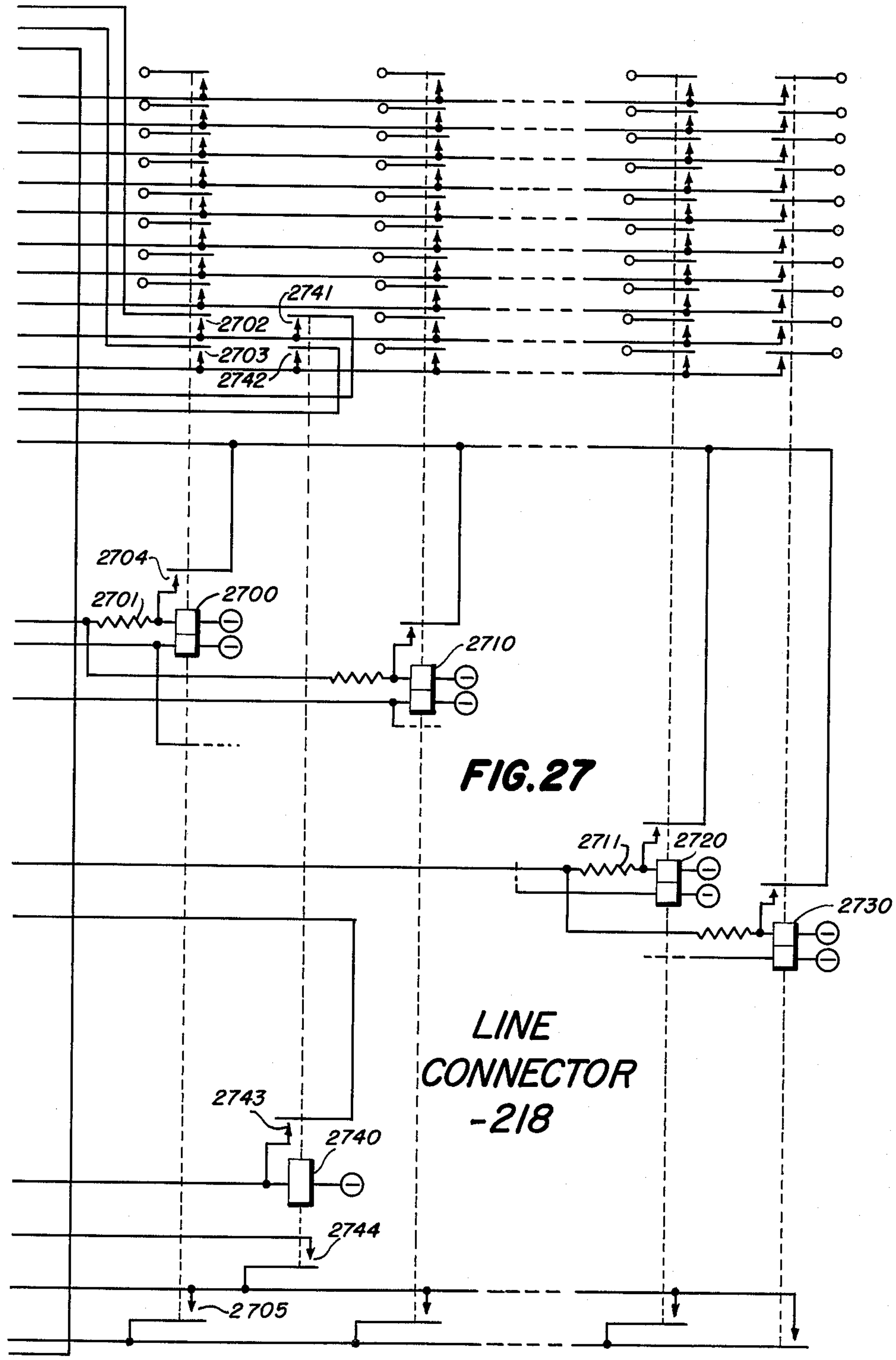
Figure 28:
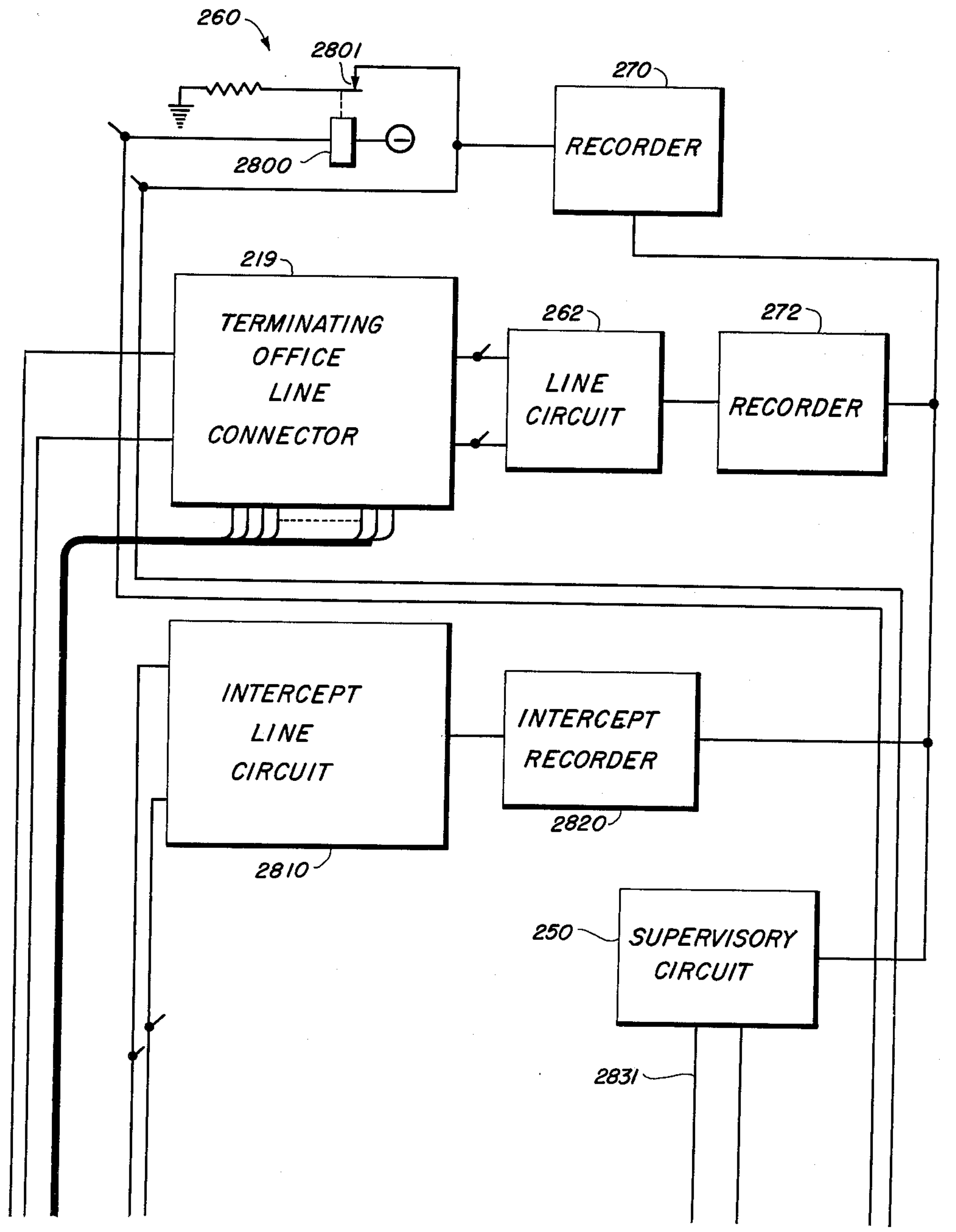
Figure 35:
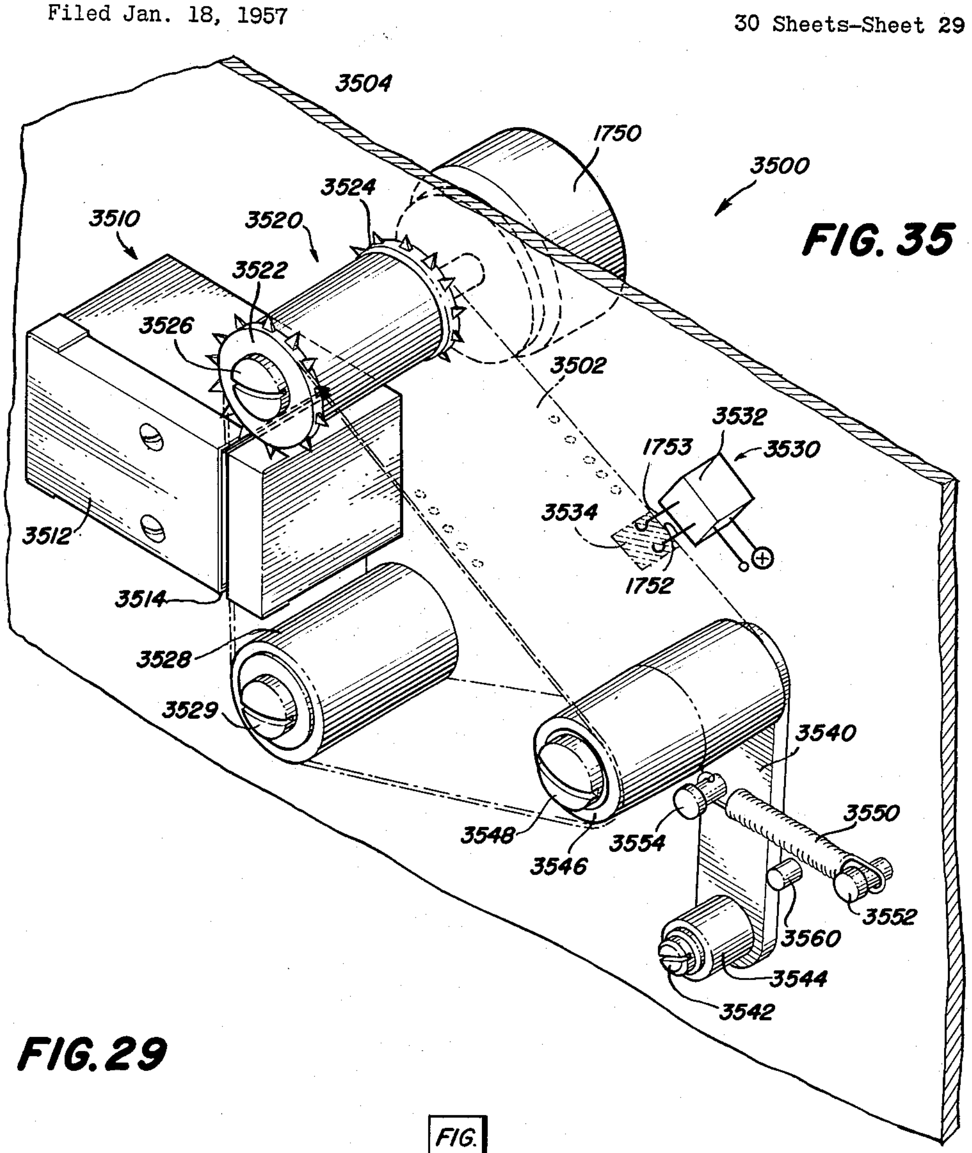
Figure 29:
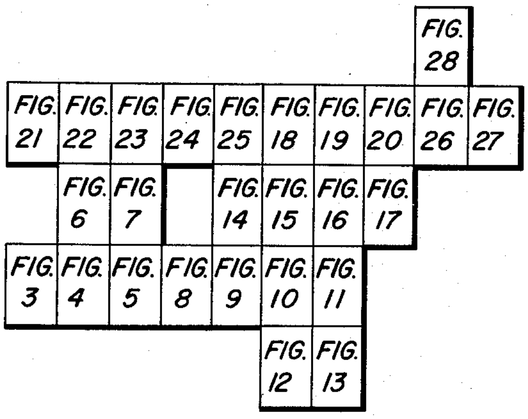
Figure 30:
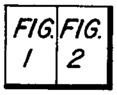
Figure 32:
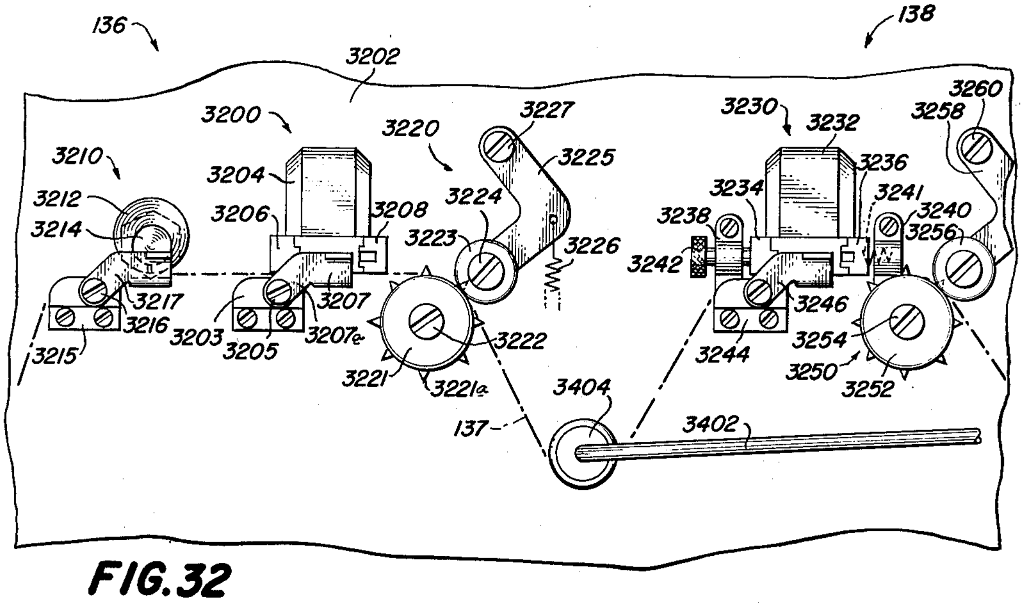
Figures 33, 34:
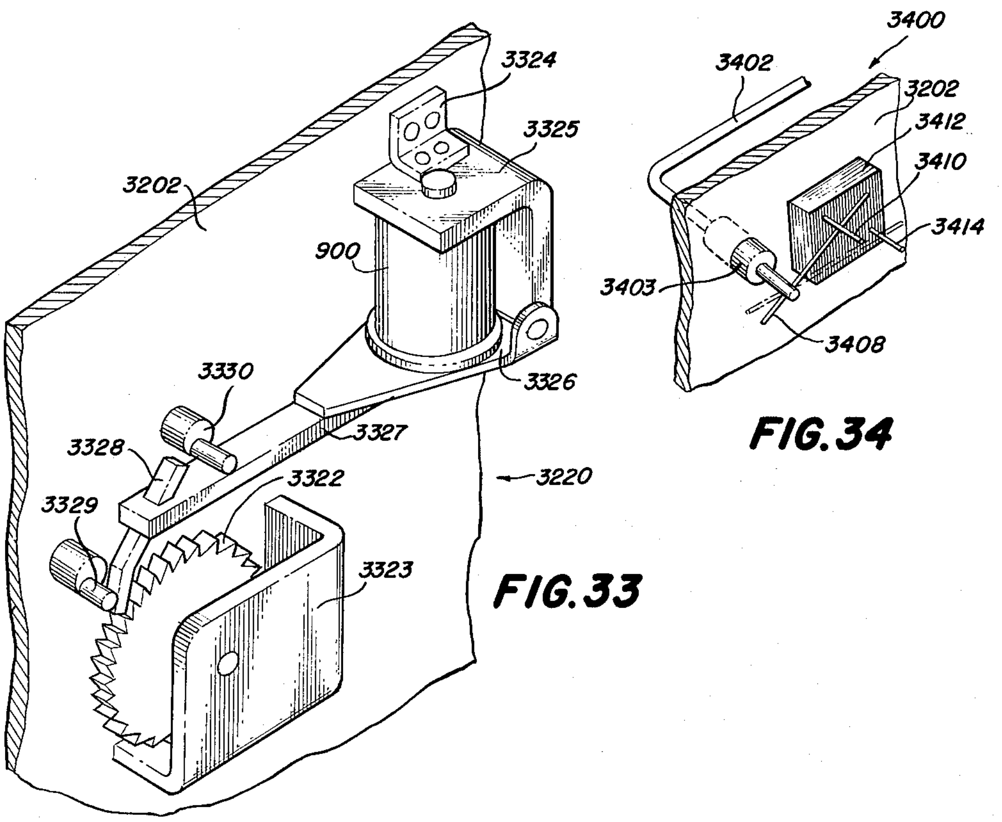

Figs. 15 and 15 form a schematic circuit diagram of a transmitting commutator;

Fig. 17 illustrates a train information recorder circuit;

Figs. 18 and 19 illustrate the details of a connector link;

Fig. 20 is a circuit diagram of a common marker control circuit;

Figs. 21 to 25, inclusive, illustrate the details of a common register recoder;

Figs. 26 to 28, inclusive, illustrate the details of a line connector in conjunction with certain recording components in the data handling system;

Fig. 29 is a block diagram disclosing the manner in which Figs. 3–28 are positioned adjacent each other to form a complete circuit diagram of a data handling and transmitting system forming an embodiment of the present invention;

Fig. 30 discloses the manner in which Figs. 1 and 2 are positioned adjacent each other to form a complete block diagram showing of the general components of this invention;

Fig. 31 is a table showing the components of the Baudot code;

Fig. 32 is a fragmentary elevational view of a recorder-transmitter unit using a magnetic storage medium;

Fig. 33 is a fragmentary perspective view of a step-by-step drive mechanism for the recorder-transmitter unit;

Fig. 34 is an enlarged fragmentary perspective view of a switching device controlled by the length of the magnetic medium disposed between the recording and transmitting components of the unit shown in Fig. 32; and Fig. 35 is a perspective view of a continuous drive recorder unit using a magnetic data storing medium.

Referring now to Figs. 1 and 2 of the drawings, the data handling system disclosed therein comprises data storing and switching equipment at a local office which receives and stores messages or data to be processed from a plurality of remote sending offices. A portion of this stored data is utilized to selectively extend data transmitting paths to a plurality of recorders or printers located in the local office to permit the stored messages or data to be transmitted to the selected printers and recorders without manual intervention. Although this system is of general applicability and is useful in data processing systems of many different types, the system shown in detail in Figs. 3–28 comprises a telegraph switching system which is particularly adapted for processing train or wheel report data comprising a plurality of different or individual messages to each of which a common or repetitive message is added so that the printed record of each of the messages includes the variable message portion plus an item of information which is common to all of a particular group of messages transmitted from a given remote office. In the particular system disclosed, the individual or distinct messages each relate to the contents and identification of a freight car together with its consignee and consignor, and the common or repetitive message, which is added to each of the individual messages, comprises information relating to the train of which the freight car is a part.

The telegraph network shown schematically in Figs. 1 and 2 of the drawings includes a plurality of remote sending offices 102, 104, 106, and 108 in scattered geographical locations. Each of these remote sending offices includes conventional data transmitting equipment capable of sending code combinations in accordance with the data or information which is to be transmitted. These sending instrumentalities may be either manually actuated or controlled by sensible record forms such as tapes or cards. When information such as that pertaining to the composition of a freight train is to be transmitted from one of the remote sending offices, a seizure signal or code is transmitted over an outgoing line circuit to an input line circuit individual thereto in the local office, such as one of a plurality of input line circuits 112, 114, 116, and 118.

Assuming that the message or train report is to be transmitted from the remote sending office 102, the input line circuit 112 is seized to place a line lockout and allotter circuit 120 in operation. The circuit 120 assigns an idle one of a plurality of incoming links 130, 140, and 150 to the input line circuit 112 to receive the data transmitted from the remote sending office 102. Assuming that the incoming link 130 is idle and is in a condition to be allotted by the circuit 120, the circuit 120 supplies signals to a line marker 132 in the link 130 representing the assigned numerical designation of the input line circuit 112, thereby operating the line marker 132 to cut through the input line circuit 112 to a receiving commutator 134 forming a portion of the link 130. Incident to the interconnection of the receiving commutator 134 with the input line circuit 112, the line circuit 112 is operated to cut through the signaling path from the remote sending office 102 to the input of the receiving commutator 134.

In addition to conditioning the receiving commutator 134 for receiving transmitted messages or items of information, the operation of the line marker 132 operates a link marker 202, which terminates the incoming link 130, so that a link lockout and allotter circuit 280 is placed in operation to associate one of a plurality of outgoing links 210 and 220 with the seized incoming link 130. Assuming that the outgoing link 210 is idle and in a condition to be allotted by the circuit 280, this link, which includes a conector link 212, a pair of line connectors 218 and 219, a train storage recorder circuit 216, and a transmitting commutator 214, is cut through a transmitter 138 in the incoming link 130 through the link marker 202. This conditions the outgoing link 210 for operation under the control of information received from the remote sending office 102 and transmitted through the incoming link 130.

Referring back to the receiving commutator 134, in response to cutting the input of the commutator 134 through to the signaling path extending to the remote sending office 102, this commutator is conditioned to receive transmitted data and to supply it to a recorder 136 for storage on an endless length or closed loop of magnetic film or tape 137. If the transmitted information is provided in the Baudot code, which comprises five information bits preceded by a start pulse and followed by a stop pulse, the recorder 136 comprises five recording or transducing heads disposed adjacent transversely spaced portions of the magnetic tape or film 137. The selective energization of the recording heads in the recorder 136 is conjointly controlled by a counting chain of five electronic devices in the receiving commutator 134 and the mark or space pulse condition on the signaling path. A permanent magnet erase is provided adjacent the recording heads to remove previously recorded information.

More specifically, incident to initiating transmission at the remote sending office 102, a series of letter shift codes is transmitted at the office 102 following the seizure code. The start pulse preceding each of these code combinations is applied to a range selector in the receiving commutator 134, which is utilized to initiate operation of a transistorized multivibrator under the control of a start tube forming one tube of a binary pair. Rendering the multivibrator operative supplies pulses to the five discharge tubes forming the counting chain to sequentialy fire each of these discharge devices. The cathode of each of the discharge devices is connected to a gate circuit which is also connected to one side of one of the five recording heads in the recorder 136. The other sides of the five recording heads are connected in common to the signaling path so that, when the first tube in the counting chain is fired, the head for recording the first information bit in the five bit Baudot code is selectively energized or not energized under the control of the associated gate circuit and in accordance with the marking or spacing condition on the signaling path. In a similar manner, the remaining four tubes or discharge devices in the chain are sequentially rendered conductive to momentarily render each of the four remaining transducing heads effective to record a pulse in accordance with the mark or space condition on the signaling path. When the last tube in the chain is fired, a stop tube which forms a binary pair with the start tube is rendered conductive to terminate operation of the multivibrator and to pulse a transistorized amplifier circuit so that a step-by-step drive mechanism in the recorder 136 is rendered effective to advance the magnetic film or tape 137 a single step. In this manner, the letters shift code combinations are recorded on the magnetic tape 137.

The first message to be transmitted at the remote sending office 102 is the common or repetitive message which is to be recorded in conjunction with each of the following individual messages transmitted from the office 102. To provide a control signal or code indicating the fact that the following information comprises the repetitive or common message portion, the operator at the remote sending office 102 sends a figure shift code followed by the character "F" which are recorded on the magnetic tape 137 by the recorder 136 under the control of the receiving commutator 134, as described above. The common message is then transmitted and recorded on the magnetic film 137, and a figure shift code followed by the character "G," forming a control signal, are transmitted to indicate both that the transmission of the repetitive message has been completed and that the next data received comprises the switching codes or signals forming the address portion of the first individual message. This control signal is also recorded on the magnetic film 137.

In the particular application for which the system of the present invention is adapted, the transmitted individual messages pertain to freight car contents and identification together with a designation of the origin and termination of the car. This information is usually supplied not only to the district sales office in which the consignment originated but also the district sales office in which the consignee is located. Accordingly, two identical printed records of the message are necessary. To provide these two identical records, the next data transmitted at the sending station 102 and recorded on the film 137 is two plural digit switch codes separated by a slash or diagonal. These two switch codes are subsequently used to establish two output signaling paths which concurrently receive the same message. It should be understood that a larger or smaller number of switch codes comprising a fewer or greater number of digits obviously can be used in accordance with the environment in which the system is to be utilized. Following the transmission of the switch codes, one or more control codes of the message such as line feed and carriage return may be transmitted from the station 102.

Following the switch codes and the control codes, the transmission of the first individual message including data pertaining to the freight car is initiated at the remote sending office 102. To provide a means for inserting the common or repetitive message at some point during the recording of each of the individual messages, a figure shift code followed by the character "F," comprising a control signal, is then transmitted. This code is utilized during recording operations to interrupt transmission of the body of the message and to insert the common message. Following the transmission of this control signal, the remainder of the first individual message is transmitted from the office 102.

At the end of the message, another control signal consisting of a figure shift code combination and the character "G" are transmitted from the office 102 to indicate that the next information transmitted comprises a second message which is to be routed to different recording instrumentalities. This transmission continues until such time as the entire wheel or train report has been transmitted and stored on the magnetic film 137. To signify the completion of the transmission of this information, a control signal consisting of a figure shift code combination followed by a character "H" is transmitted and stored on the film 137. This information is utilized during the recording operation to terminate the seizure of the seized outgoing link 210 and to restore this link to its normal condition. Further, this control signal also releases the line circuit 112 and the line marker 132 to free the link 130 for receiving other data.

The other incoming links 140 and 150, which include line markers 142 and 152, receiving commutators 144 and 154, recorders 146 and 156, transmitters 148 and 158, and link markers 204 and 206, operate in the same manner as described above in conjunction with the incoming link 130 to store data from a connected one of the sending offices 102, 104, 106, and 108. By the provision of a plurality of identical links 130, 140, and 150, data from a plurality of sending stations can be simultaneously received and stored in the local office. The plurality of links 130, 140, and 150 are assigned to transmitting stations in the order in which seizure signals are transmitted under the control of the line lockout and allotter circuit 120.

As described above, incident to the seizure of the incoming link 130, the outgoing link 210 is seized and associated with the link 130 through the link marker 202 so that the transmitting commutator 214 is connected to the transmitter 138. The transmitter 138 comprises five reproducing or transducing heads disposed adjacent transversely spaced portions of the magnetic film 137 which reproduce the signals recorded thereon by the recorder 136. The transmitting commutator 214 includes five binary pairs, each of which is controlled by one of the transducing heads so as to effectively store a mark or space condition in accordance with the presence or absence of a signal on the related channel of the magnetic film 137. To provide a means for converting the static marking and spacing conditions provided by the binary pairs into output signals, a counting chain driven by a continuously operative multivibrator is provided in which the multivibrator output normally is ineffective to drive the counting chain. The counting chain together with a plurality of neon diode gates selectively controlled by the static marking or spacing conditions afforded by the binary pairs provide mark and space pulses which are sequentially supplied to an output signaling conductor. The transmitting commutator 214, in addition to the pulsing arrangement, includes a plurality of neon diode gating arrangements for recognizing the figure shift "F," figure shift "G," and figure shift "H" codes or control signals for providing control functions in the outgoing link 210.

When the link marker 202 has been cut through to the outgoing link 210, and when a control arrangement operated by the presence or absence of a supply loop of magnetic film between the recorder 136 and the transmitter 138 has been operated to indicate the presence of an adequate supply loop, the continuously operative multivibrator associated with the transmitting commutator 214 is rendered effective to operate the counting chain in the commutator 214. This counting chain, incident to each cycle of operation thereof, returns a signal to the transmitter 138 to advance the magnetic tape 137 a single step. The arrangement of the sprocket drive arrangement and the transducing heads in the transmitter 138 is such that, in a rest position, the recorded information is disposed adjacent the transducing heads so that, during operation of the step drive, the recorded bits of information on the magnetic film 137 are swept by gaps of the transducing heads to induce voltages which are transmitted through the link marker 202 to the transmitting commutator 214 for storage in the binary pairs.

The first significant item of information stored on the magnetic film 137 is the control signal including the figure shift code and the character "F." In response to receiving this sequence of information, the transmitting commutator 214 places the train storage recorder circuit 216 in operation to receive and store the next items of information transmitted by the transmitter 138, comprising the common or repetitive train information. This information is recorded on a loop of magnetic film or tape in a continuous drive type of magnetic tape recorder included in the train storage recorder circuit 216. The transfer of this information from the magnetic film 137 to the magnetic tape of the train storage recorder permits this information subsequently to be inserted into the individual messages or car reports as they are recorded. In response to the transmission of the control signal including figure shift "G" following the repetitive message, the transmitting commutator 214 renders the train storage recorder circuit 216 ineffective to receive additional information and, together with a marker control circuit 230, operates the connector link 212 so that the transmitting commuator 214 is now cut through to a register decoder 240 which is common to all of the links 210 and 220.

The next data stored on the magnetic film 137 is the two groups of plural digit switch codes representing the two printers or recorders which are to receive the first message stored on the magnetic film 137. The previously completed path for placing the transmitting commutator 214 in operation is opened at this time, and a path is prepared extending to the register decoder 240 for controlling subsequent operation of the commutator 214. The register decoder 240 now controls the advance of the magnetic film 137 so that the switch code characters are transmitted to the register decoder 240 and stored therein to establish marking paths representing the printers which are to be seized for use in recording the items of information comprising the first message. When all of the necessary switch code information is stored in the register decoder 240, the connector link 212 and the register decoder 240 selectively operate the line connectors 218 and 219 so that connections are established through two of a plurality of output line circuits 260, 262, 264, 266, and 268 to two of a plurality of printers 270, 272, 274, 276, and 278 in accordance with the switch codes stored in the register decoder 240.

In the event that one or both of the printers which are to be seized test busy, the connector link 212 and the line connectors 218 and 219 await the release of the busy printer. When the connection has been completed to the desired printers, the register decoder 240 is cleared and restored to a normal condition in which it is capable of being utilized by other outgoing links in establishing connections. In the event that improper switch codes are received, the register decoder 240 and the marker control circuit 230 establish a connection to an intercept printer. The completion of the selection of the desired recording instrumentalities interrupts the start part extending to the register decoder 240 and restores the normal start path for the transmitting commutator 214 so that the magnetic film 137 is now advanced under the control of the transmitting commutator 214 which converts the magnetically recorded information into a series of mark and space condintions on a signaling line extending to both of the seized printers, thereby operating these printers to record the first individual message stored on the film 137.

At the point in the first message at which the common or repetitive train information is to be transmitted to the two seized printers, the control signal comprising the figure shift code and the character "F" is again transmitted from the magnetic film 137 to the transmitting commutator 214 and utilized therein to interrupt the operation of the commutator 214 and to arrest further movement of the magnetic film 137. This code also operates the train storage recorder circuit 216 so that the items of information stored in the train information recorder are transmitted through the connector link 212 and the line connectors 218 and 219 to the seized printers. When the repetitive information has been recorded, a control arrangement actuated by contacts carried on the endless loop of magnetic tape in the train storage recorder renders this recorder inoperative and again returns a start signal to the transmitting commutator 214 so that operation thereof under the control of the multivibrator is initiated. During this continuing operation, the remainder of the items of information pertaining to the first individual message stored on the magnetic film 137 is transmitted to the seized printers.

The transmission of the message information to the first pair of seized printers is terminated in response to the transmission of the control signal including the figure shift code and "G." The receipt of this information by the transmitting commutator 214 causes the release of the line connectors 218 and 219 and, accordingly, the release of the seized printers. This information also calls in the register decoder 240 and terminates normal operation of the transmitting commutator 214 so that, as described above, the transmitter 138 is again operated under the control of the register decoder 240 to transmit the group of switch code digits representing the next pair of printers which are to receive the second individual message. This operation continues until such time as all of the items of information stored on the magnetic film 137 have been transmitted.

The storage loop control arrangement which, as described above, insures the presence of an adequate supply loop of tape between the recorder 136 and the transmitter 138 normally functions to prevent operation of the transmitter 138 whenever the amount of tape in the supply loop goes below a predetermined minimum amount. However, to insure the transmission of the last items of information recorded on the magnetic film 137 following the termination of the operation of the recorder 136 at the end of message transmission, this control arrangement includes means for operating the step-by-step drive mechanism in the recorder 136 a single step in response to each cycle of operation of the transmitting commutator 214 and, accordingly, following each step of operation of the step-by-step drive mechanism in the transmitter 138. By this means, all of the items of information stored on the magnetic film 137 are transmitted through the outgoing link 210 to the proper recording instrumentality.

The cycle of operation is terminated by the transmission of a figure shift "H" control signal to the transmitting commutator 214. This particular combination of codes operates one of the neon lamp decoding arrangements in the commutator 214 so that the outgoing link 210 is released. Although the operation of the data receiving and the data transmitting components of the system of the present invention are separately described above, it is obvious that, following the provision of an adequate loop of tape between the recorder 136 and the transmitter 138, the transmitter 138 is placed in operation so that information is being stored on the magnetic tape 137 concurrently with the transmission of this information by the transmitter 138.

The system also includes a plurality of other outgoing links, such as the link 220 which comprises a connector link 222, a transmitting commutator 224, a train storage recorder circuit 226, and a pair of line connectors 228 and 229. These other outging links operate in the same maner described above in conjunction with the link 210 and are assigned to the incoming links 130, 140, and 150 under the control of the link lockout and allotter circuit 280 so that data, from a plurality of remote stations, can be simultaneously directed to selected ones of the recorders 270, 272, 274, 276, and 278.

*Recorder 136 and transmitter 138*

The recorder 136 (Figs. 32–34) is operated under the control of the receiving commutator 134 to store permutation code combinations in accordance with received signals on the magnetic film or tape 137, whereas the transmitter 138 is operated in accordance with signals stored on the magnetic film 137 to transmit signals to the transmitting commutator 214. In general, the recorder 136 and the transmitter 138 each comprise transducing head assemblies including a number of individual transducing heads equal to the number of code bits in the combination or permutation code used, and both of these transducing head assemblies are disposed adjacent spaced portions of the same magnetic storage medium which preferably comprises an endless or closed loop of an elongated flexible magnetic material, such as a magnetic film having a longitudinally extending row of sprocket holes adjacent each of its edges. To permit recording and transmitting operations to be performed independently of each other and at selected recording and transmitting speeds, the recorder 136 and the transmitter 138 are each provided with an independently operated step-by-step drive mechanism.

Referring now to Figs. 9 and 32–34 of the drawings, the recorder 136 comprises a transducing head assembly 3200, an erasing assembly 3210, and a step drive mechanism 3220, all of which are mounted on a base plate 3202. To provide a means for recording incoming signals on the magnetic film or tape 137 under the control of the receiving commutator 134, the transducing head assembly 3200 includes five separate and independent transducing heads 921, 922, 923, 924, and 925 (Fig. 9), each of which is provided with a separate energizing winding and all of which are disposed adjacent each other and held in a position with their recording gaps in transverse alignment relative to the width of the magnetic film 137 by a shielding receptacle 3204. The housing 3204 is slidably mounted on a pair of guide rails 3206 and 3208 which are secured to the base 3202. Since the individual transducing heads 921–925 are disposed with their gaps in transverse alignment relative to the width of the magnetic film 137, these five heads effectively define five separate information storage channels on the magnetic film 137 so that the selective energization of these heads provides a transversely aligned combinational code representation of a received item of information. It should be understood, however, in the event that other types of combinational codes are utilized, the number of transducing heads and, accordingly, the number of effective channels provided on the magnetic film 137 can be modified in accordance with the number of information bits utilized in the code. Further, although the transducing heads 921–925 are transversely aligned relative to the width of the magnetic film 137, these heads could be located in a staggered arrangement.

To provide a means for resiliently urging an intermediate portion of the loop of magnetic film or tape 137 against the gap defining portions of the transducing heads 921–925, a pressure pad assembly is provided comprising a bracket 3203 which is fixedly secured to the base plate 3202 and which supports a shaft or machine bolt 3205. A somewhat U-shaped lever 3207 having a pair of angularly offset leg portions 3207*a* pivotally mounted on the bolt 3205 receives a felt pad in its bight portion. The lever 3207 is resiliently biased for rotation in a counterclockwise direction so that the transducing head assembly 3204 is received within the U-shaped legs of the lever 3207 to permit the felt pad to press an intermediate portion of the magnetic film 137 into intimate engagement with the heads 921–925.

To provide a means for erasing the magnetic tape or film prior to movement of this film past the transducing head assembly 3200, the erasing means 3210 is provided. This erasing means includes a somewhat cylindrical permanent magnet 3212 which is mounted on a post or bolt 3214 carried on the base 3202. The permanent magnet 3212 is provided with an erasing gap which is located adjacent the path of movement of the magnetic film 137, thereby to provide a direct current erase for this film by saturating the magnetic material of the tape so that the elemental magnetic particles thereof are all disposed in a single polarity of alignment prior to advancing the magnetic medium to the transducing head assembly 3200. To provide a means for maintaining the magnetic film 137 adjacent the gap in the permanent magnet 3212, a pressure pad assembly including a supporting bracket 3215 carried on the base member 3202 is provided. A shaft 3216 secured to the bracket 3215 movably supports a somewhat U-shaped lever 3217 having a pad of felt or similar material carried in the bight portion thereof immediately adjacent the gap in the permanent magnet 3212. The lever 3217 is biased for rotation in a counterclockwise direction relative to the shaft 3216 so that the felt pad urges the magnetic film 137 into intimate engagement with the permanent magnet 3212 immediately adjacent the erase gap therein.

To provide a means for advancing the magnetic film 137 a single step relative to the transducing head assembly 3200 following the recording of each code combination thereon, the step-by-step drive mechanism 3220 is provided. This mechanism includes a sprocket wheel 3221 secured to a shaft 3222 which is rotatably mounted on the base 3202. The sprocket wheel 3221 includes two identical rings of sprocket teeth 3221*a* extending axially outward from the shaft 3222 immediately adjacent each edge of the sprocket wheel 3221 which are adapted to be received within the similarly disposed sprocket openings in the magnetic film 137. To maintain the film 137 in engagement with the sprocket wheel 3221, an idler roller 3223 is pivotally mounted on a lever 3225 by a shaft 3224. The idler roller 3223 has two axially spaced and peripherally extending rows of apertures therein corresponding to the spacing of the teeth 3221*a* on the sprocket wheel 3221, thereby to permit the periphery of the sprocket wheel 3221 and the periphery of the idler roller 3223 to directly engage opposite sides of the film 137. The idler roller 3223 is urged toward the sprocket wheel 3221 with the film 137 interposed therebetween by a tension spring 3226 which tends to pivot the lever 3225 in a clockwise direction about the axis of a bolt 3227 which pivotally mounts the lever 3225 on the base 3202.

To provide a means for rotating the sprocket wheel 3221 in fixed steps, a ratchet wheel 3322 is secured to a projecting portion of the shaft 3222 on the reverse side of the base plate 3202, this end of the shaft 3222 being mounted in a bracket 3323 carried on the base plate 3202. A motor magnet or solenoid 900 (Figs. 9 and 33) which is mounted on the base plate 3202 by a bracket 3324 includes a magnetic field structure comprising a somewhat L-shaped member 3325 to which is pivotally secured an armature 3326. An outer extremity of the armature 3326 carries an arm 3327 to which a pawl element 3328 is secured. The armature 3326 is suitably biased in a downward direction, as shown in Fig. 33, by resilient means (not shown) so that the lower end of the pawl 3328 normally engages one of the teeth of the ratchet wheel 3322. Downward movement of the ratchet element 3328 and, accordingly, of the armature 3326 is limited by an eccentric stop member 3329 which is rotatably mounted on the base 3202.

Figure 9:
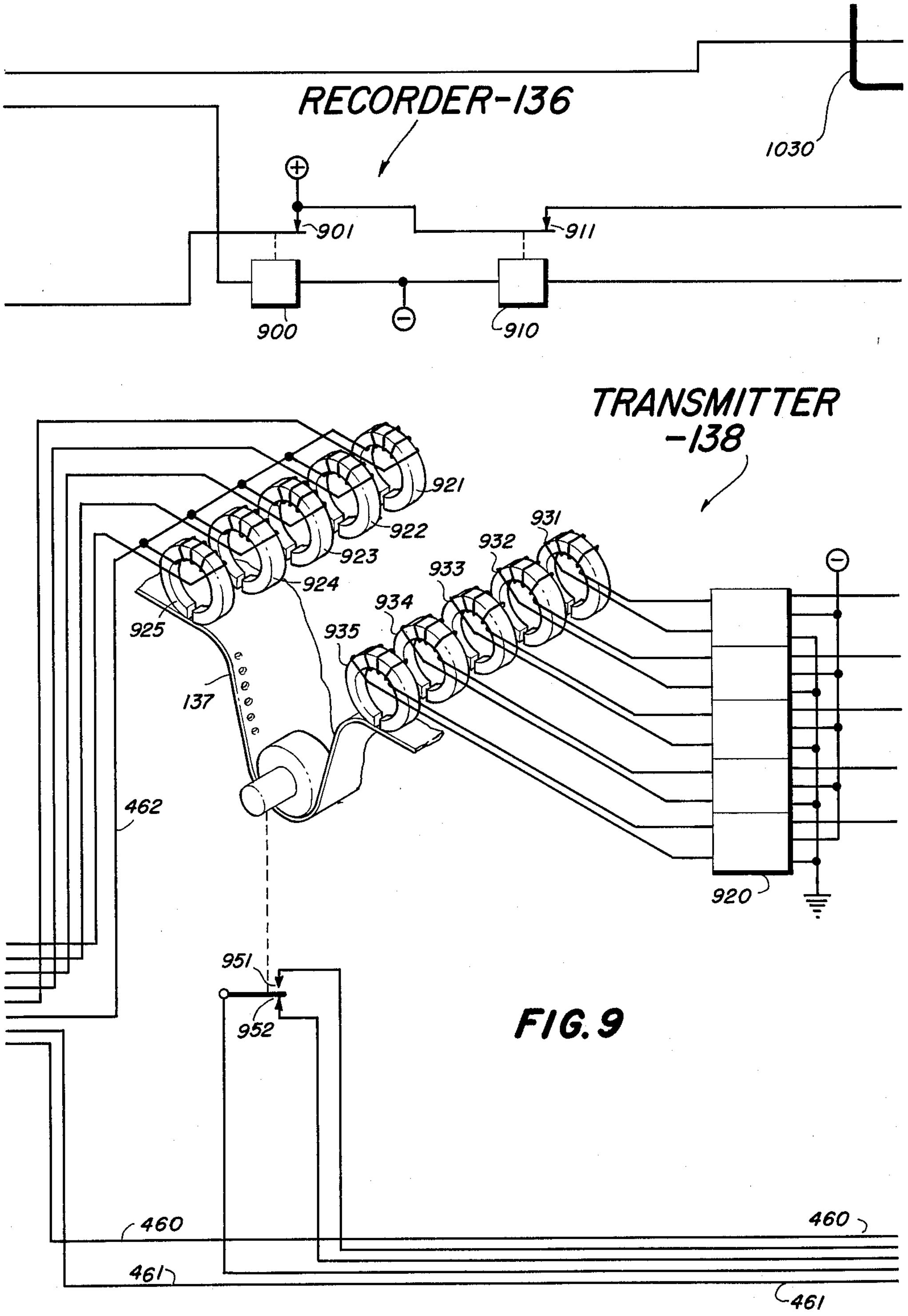
Fig. 9 is a schematic diagram of a recorder and a transmitter using a magnetic storage medium.
Figure 10:
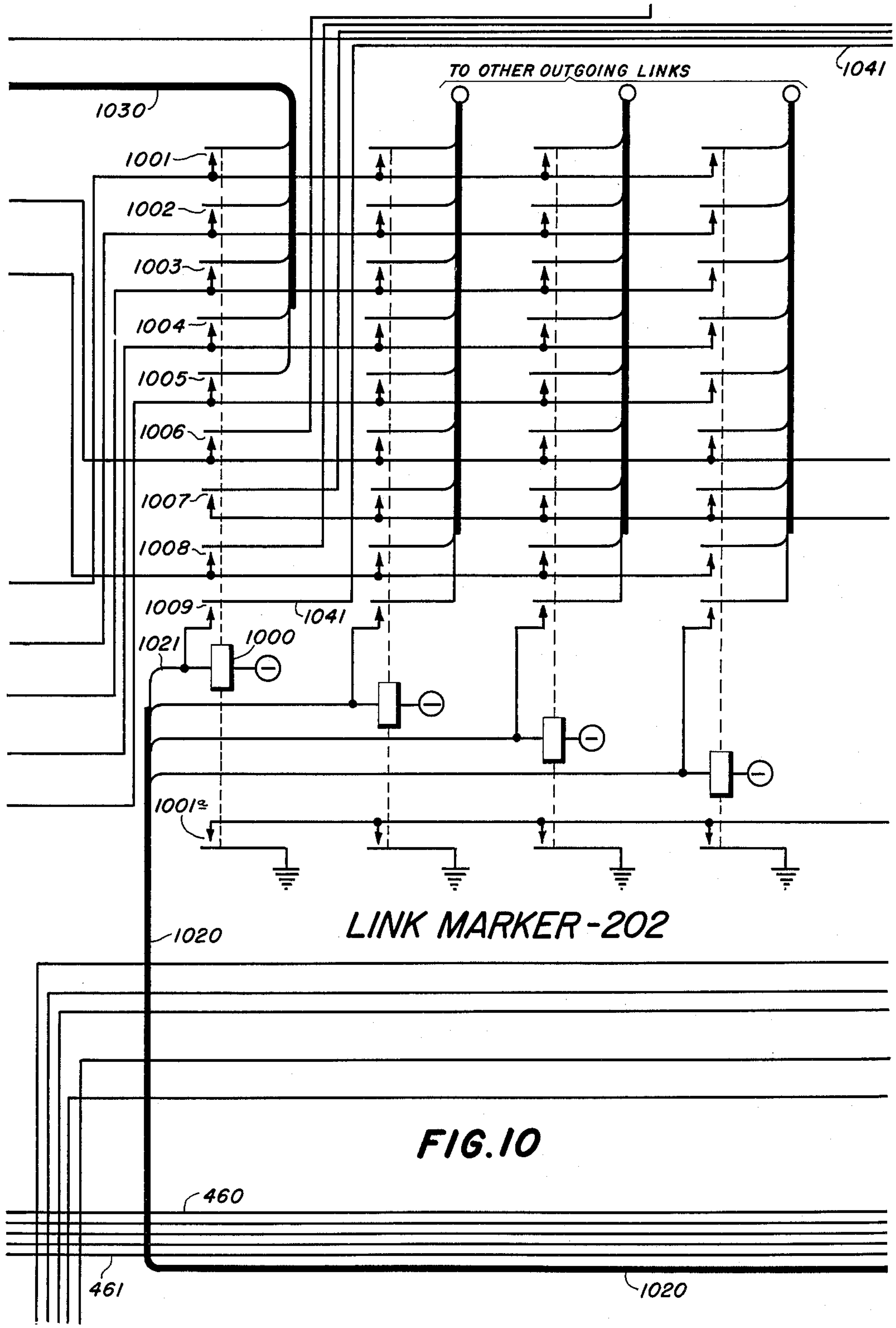
Figs. 10 and 11 illustrate the details of a link marker circuit.
Figure 11:
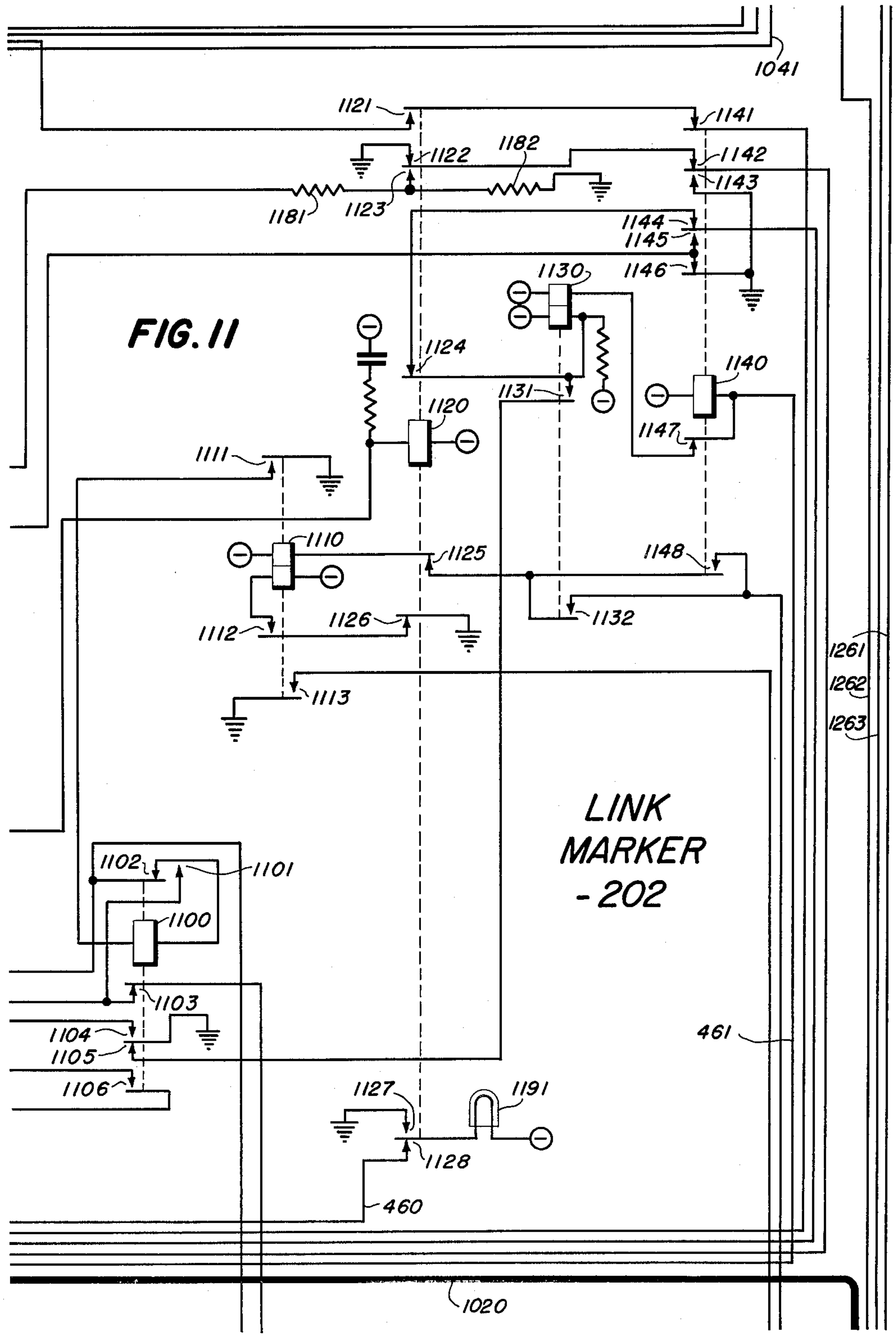
Figure 12:
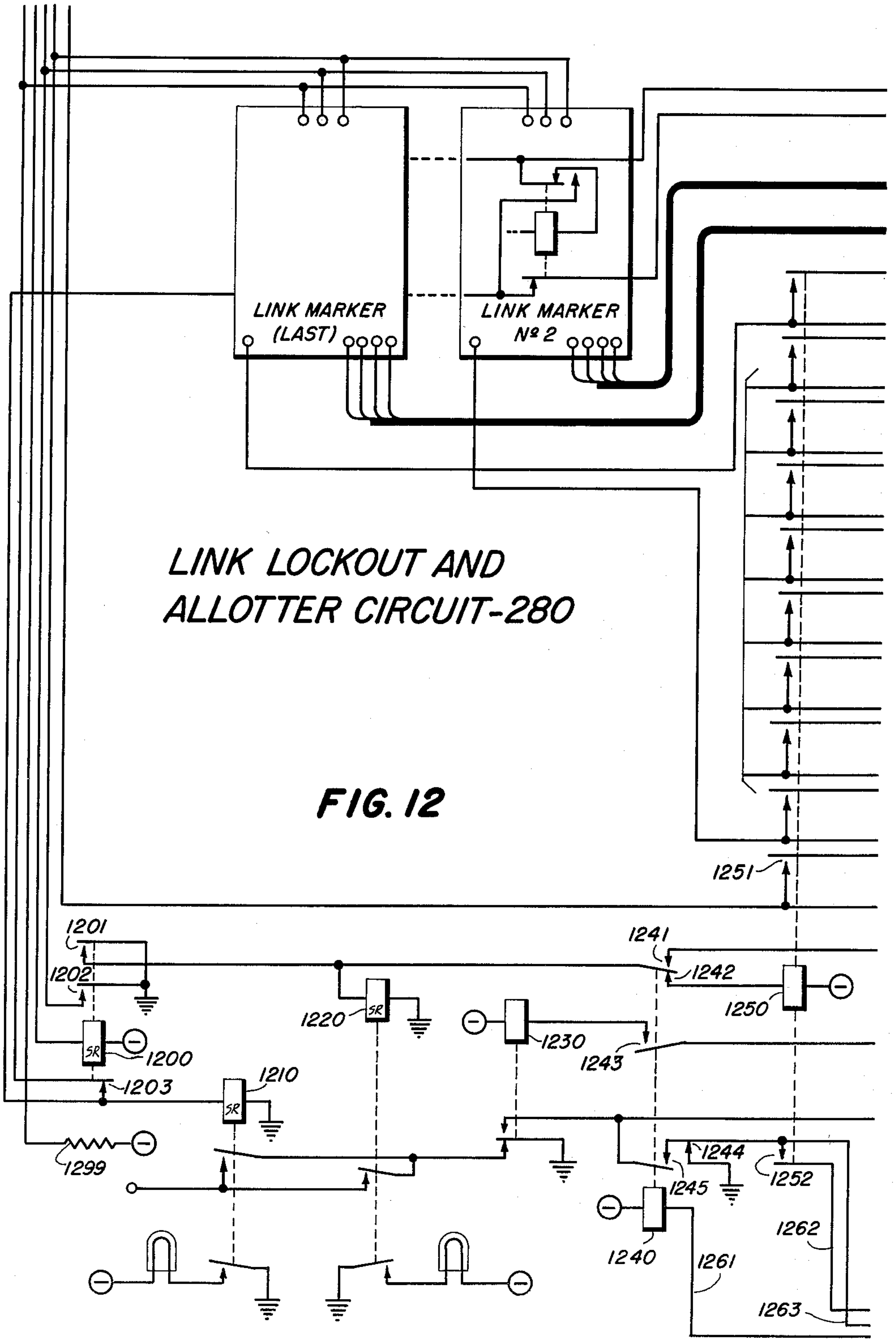
Figs. 12 and 13 illustrate the details of a link lockout and allotter circuit.
Figure 13:
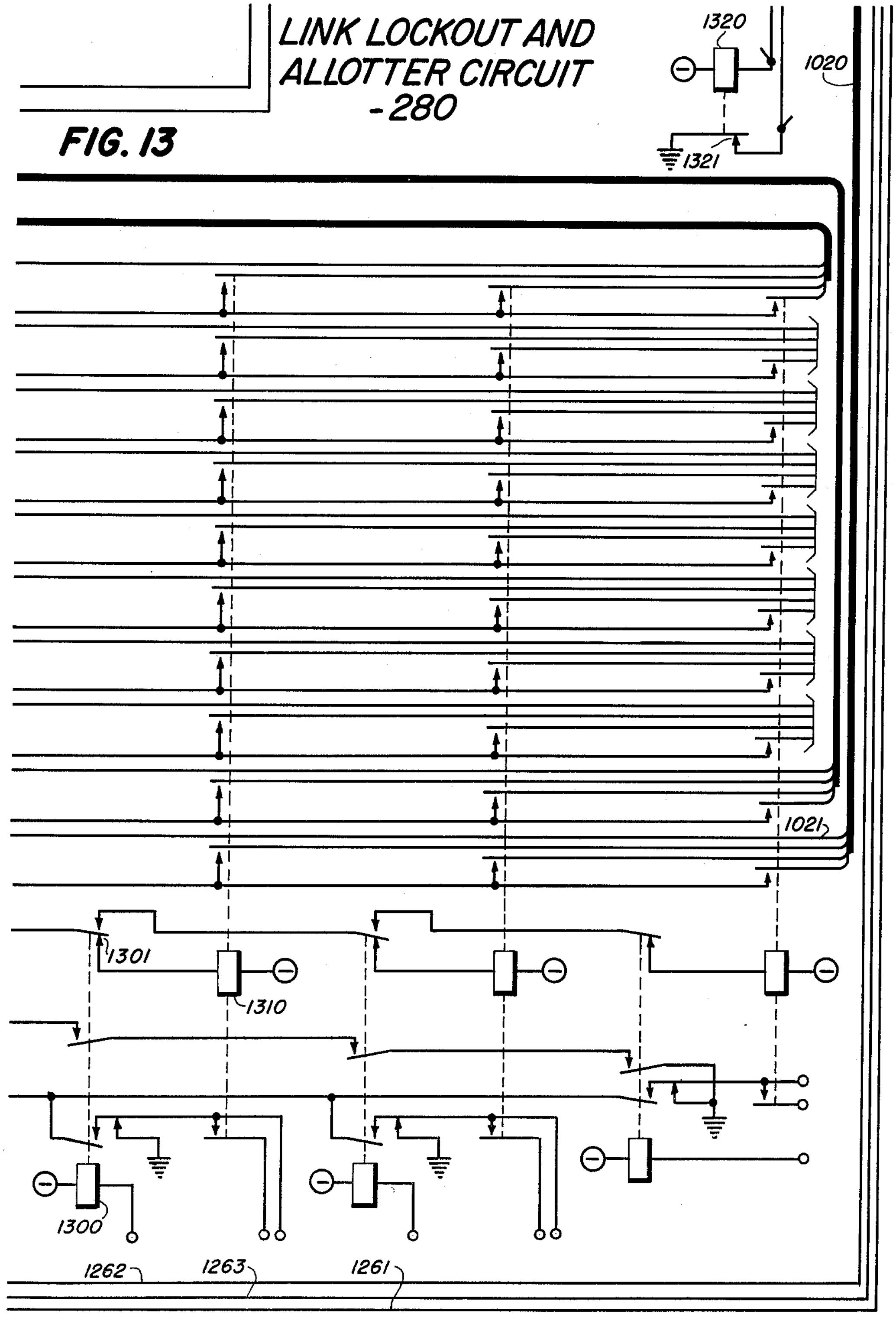
Figure 14:
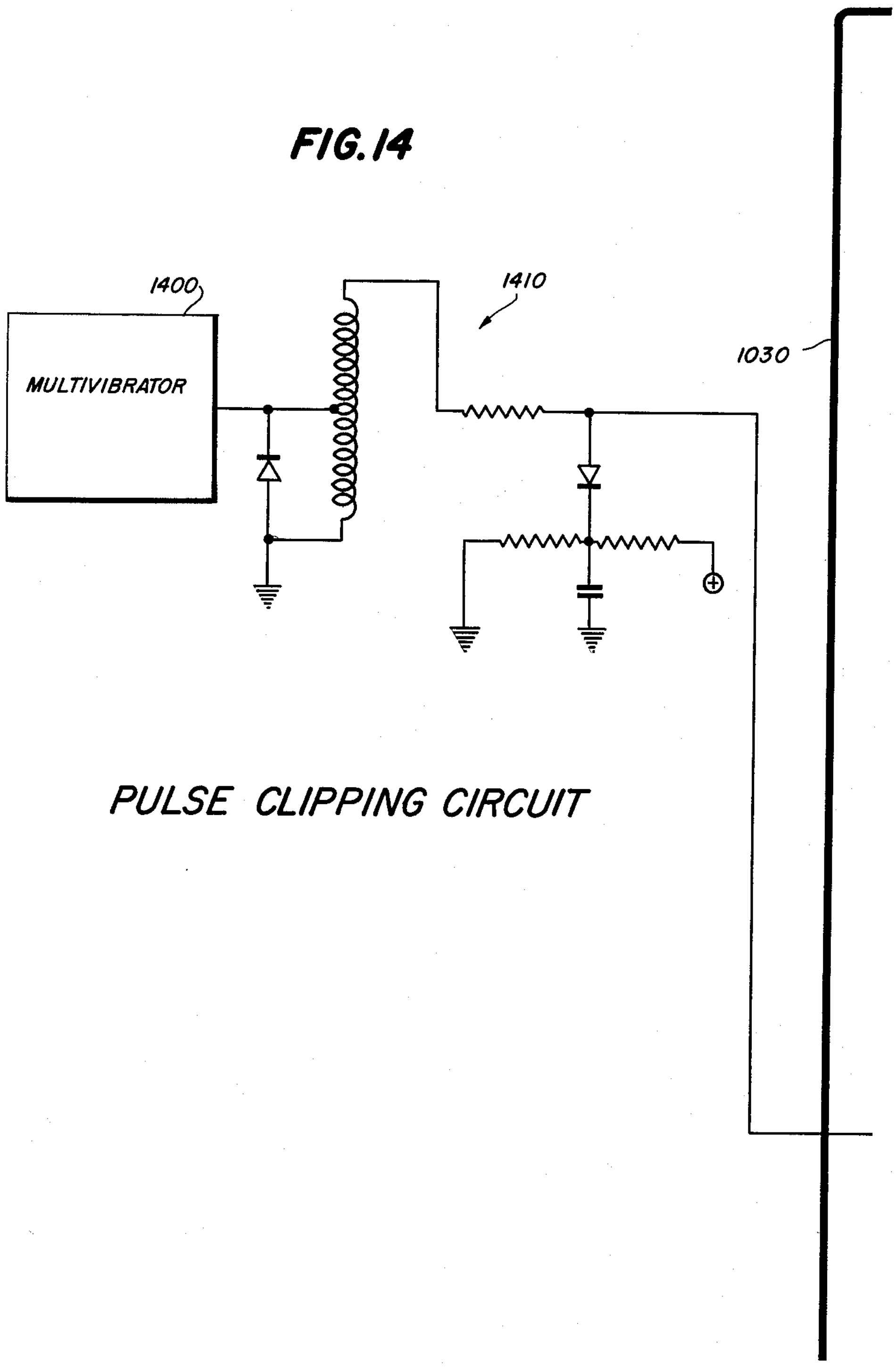
Fig. 14 illustrates a pulse clipping circuit.

When the solenoid or motor magnet 900 is energized, the armature 3326 is moved upwardly, as viewed in Fig. 33, against the action of the resilient biasing means so that an upper surface of the arm 3327 is moved into engagement with an eccentric stop 3330 which is rotatably mounted on the base 3202. Accordingly, when energization of the winding of the solenoid or motor magnet 900 is terminated, the resilient biasing means forces the pawl 3228 into engagement with one of the teeth of the ratchet wheel 3202, thereby causing counterclockwise rotation of the ratchet wheel 3222, as shown in Fig. 33, and clockwise rotation of the sprocket wheel 3221, as shown in Fig. 32. In this manner, the magnetic film 137 is advanced a single step in response to each energization of the motor magnet 900. In addition to controlling movement of the pawl and ratchet drive for the sprocket wheel 3221, the energization of the motor magnet or solenoid 900 opens a pair of interrupter contacts 901 (Fig. 9).

The transmitter 138 comprises a transducing head assembly 3230 and a step drive mechanism 3250, both of which are mounted on the base plate 3202 spaced from the recorder 136. The transducing head assembly 3230 receives the magnetic tape or film 137 on which data has been recorded by the transducing head assembly 3200 in the recorder 136 and operates to selectively provide output signals in accordance with this recorded data. As described above, the magnetic tape or film 137 is stationary during the interval in which the transducing heads forming the assembly 3200 are selectively energized under the control of the receiving commutator 134 in accordance with incoming signals. However, to reproduce these recorded signals, the transducing head assembly 3230 is positioned relative to the step-by-step drive mechanism 3250 so that the data recorded on the film 137 by the recorder 136 is moved past the gaps of the transducing heads in the assembly 3230 during the stepping operation. Therefore, the step drive mechanism 3250 and the transducing head assembly 3230 are so positioned on the base plate 3202 that the recorded information is positioned immediately adjacent the transducing heads in the assembly 3230 but not immediately beneath the gaps in these heads when the magnetic film 137 is in a rest position between step-by-step movements.

The assembly 3230 comprises five transducing heads 931, 932, 933, 934, and 935 (Fig. 9) which are positioned adjacent each other and retained in a position in which the gaps thereof are in transverse alignment relative to the width of the magnetic film 137 by a housing 3232 which is detachably mounted on a pair of guide rails 3234 and 3236. The step drive mechanism 3250 in the transmitter 138 is maintained in a fixed position relative to the supporting base plate 3202 and, accordingly, the transducing head assembly 3230 is adjustably mounted on the base 3202 to permit the gaps of the heads 931–935 to be properly disposed relative to the information recorded on the magnetic film 137 so that, upon operation of the drive mechanism 3250, the portions of the tape 137 having recorded information thereon are swept or moved past the gaps in these transducing heads.

More specifically, to movably mount the transducing head assembly 3230 on the base plate 3202, the guide rails 3234 and 3236 are movably mounted between a pair of brackets 3238 and 3240 which are secured to the base plate 3202. A coil spring 3241 is interposed between the bracket 3240 and the guide rail 3236, and an adjusting screw 3242 which is journaled in the bracket 3238 engages the guide rail 3234. Accordingly, by adjusting the threaded member 3242, the position of the transducing head assembly 3230 can be adjusted to the right or left, as shown in Fig. 32, to insure that the gaps in the transducing heads 931–935 are properly disposed relative to the information recorded on the magnetic film 137. Since the film 137 is advanced step-by-step by a sprocket drive providing a positive connection between the film 137 and the mechanism 3250, once the head assembly 3230 has been adjusted to a proper position, the heads 931–935 will remain in proper adjustment during continuing operation of the recorder 136 and the transmitter 138. To provide a means for maintaining the magnetic film 137 in engagement with the portions of the transducing heads 931–935 defining the gaps therein, a pressure pad assembly comprising a bracket 3244 and an arm 3246 carrying a felt pad is provided. This pressure pad assembly is similar to the pressure pad assemblies provided with the erase head 3210 and the transducing head assembly 3200 in the recorder 136.

The step drive mechanism 3250 provided in the transmitter 138 is identical to the step drive mechanism 3220 provided in the recorder 136 and includes a sprocket wheel 3252 secured to a shaft 3254 which is rotatably mounted on the base 3202 and which is driven by a ratchet and pawl mechanism actuated by a solenoid or motor magnet 910 (Fig. 9) which is identical to the motor magnet 900 in the step drive mechanism 3220. The motor magnet 910 also includes a pair of interrupter springs 911. To maintain the magnetic film 137 in engagement with the sprocket wheel 3252, the drive mechanism 3250 includes an idler roller 3256 rotatably mounted on a lever 3258 which is pivotally mounted on the base 3202 by a shaft 3260. The arm 3258 is biased by resilient means (not shown) in a clockwise direction to urge the idler roller 3256 toward the sprocket wheel 3252 with the magnetic film 137 interposed therebetween.

The recorder-reproducer unit comprising the recorder 136 and the transmitter 138 includes a sensing arrangement controlled by the amount of magnetic film or tape 137 disposed between the recorder 136 and the transmitter 138 for controlling some of the operations of the transmitter 138. Among other things, this slack tape control prevents operation of the step drive mechanism 3250 when insufficient tape is provided between the drive mechanisms 3220 and 3250 inasmuch as attempts by the drive means 3250 to advance the magnetic tape 137 at this time would break the tape. This tape sensing arrangement includes an insulating arm 3402 which is pivotally mounted on the base 3202 by a dielectric bushing 3403 and which rotatably supports at one end thereof a roller 3404. The roller 3404 is disposed between the step drive mechanism 3220 in the recorder 136 and the pressure pad assembly for the transducing head assembly 3230 in the transmitter 138 in the path of movement of the magnetic film 137 and is adapted to engage the upper surface of this tape. Accordingly, the arm 3402 is pivoted in a clockwise direction (Fig. 32) in response to a decreasing storage loop of tape between the recorder 136 and the transmitter 138 and is pivoted in a counterclockwise direction in response to an increase in the length of tape provided in the storage loop between the recorder 136 and the transmitter 138.

To provide an indication of the amount of tape in the storage loop, a flexible electrically conductive member 3408 is carried on one end of the arm 3402. When the arm 3402 is pivoted to a position indicating that an inadequate tape supply is provided between the recorder 136 and the transmitter 138 representing a tight tape condition, the flexible contact 3408 is moved into engagement with an electrically conductive contact 3410 carried on a dielectric block 3412 which is secured to the back side of the base plate 3202. Moving the contacts 3408 and 3410 into engagement completes a conductive circuit shown schematically in Fig. 9 of the drawings as a pair of contacts 951. Alternatively, when the supply of magnetic film or tape between the recorder 136 and the transmitter 138 increases to a predetermined amount, the arm 3402 is pivoted to move the contact 3408 out of engagement with the contact 3410 and into engagement with another contact 3414 carried on the dielectric plate 3412. This movement of the contacts 3408 and 3414 into engagement completes a connection shown schematically as a pair of contacts 952 in Fig. 9 of the drawings.

*Train information recorder 3500*

As set forth above, the train information recorder circuit 216 includes a train information recorder having a magnetic medium on which the common or repetitive message is stored incident to receiving a train report so that this common or repetitive message can then be played back or transmitted to each of the plurality of printers or recorders subsequently selected under the control of the transmitted switch codes representing the car originating and terminating offices. The train information recorder 3500 comprises a continuous drive mechanism 3520 for continuously advancing a closed loop of magnetic film 3502 relative to a transducing head assembly 3510 during recording and reproducing operations so that the train information data comprising the common message is both recorded on and reproduced from the medium 3502 in sequential signal form. The recorder 3500 further includes a tape sensing mechanism 3530 for providing signals in accordance with each complete cycle of movement of the magnetic film 3502.

The transducing head assembly 3510 includes a single record-reproduce transducing head 1755 (Fig. 17) which is mounted within a housing 3512 secured to a mounting or base plate 3504. The transducing gap of the head 1755 is disposed adjacent a guideway 3514 formed in the housing 3512 which is adapted to receive an intermediate length of the web of magnetic film 3502. Since data is supplied to the train information recorder 3500 in the form of a sequence of mark and space signals rather than simultaneously as a combinational code, only the single transducing head 1755 is required in the transducing head assembly 3510. In addition, the head 1755 is selectively energized to provide a bipolar type of recording on the magnetic film 3502 so that the train information recorder 3500 does not include a separate erasing means for removing previously recorded information from the film 3502.

The tape driving means 3520 includes a sprocket wheel 3522 including two rows of peripherally spaced teeth 3524 which are received within suitably formed sprocket openings in the film 3502. The sprocket wheel 3522 is secured to a shaft 3526 of a motor 1750 (Figs. 9 and 35) which is mounted on the base plate 3504. Accordingly, when the motor 1750 is energized, the magnetic tape 3502 is continuously advanced relative to the transducing head assembly 3510. An idler roller 3528 rotatably mounted on the base 3504 by a shaft 3529 is vertically aligned with the sprocket wheel 3522 so that the magnetic film 3502 is fed in a straight line through the guideway 3514 formed in the housing 3512 to the sprocket wheel 3522.

In order to provide tension on the loop of film or tape 3502 so as to maintain this film in driving engagement with the sprocket wheel 3522, a spring biased idler arrangement is provided including an arm 3540 which is pivotally mounted on the base plate 3504 by a machine bolt 3542, a spacer 3544 being interposed between the head of the bolt 3542 and an outer surface of the arm 3540. An idler roller 3546 is rotatably mounted on the free end of the arm 3540 by a bolt 3548, and the arm 3540 is biased in a clockwise direction by a tension spring 3550 which is connected between a pin 3552 carried on the base 3504 and a pin 3554 carried on the arm 3540. By biasing the arm 3540 in this clockwise direction, sufficient tension is supplied to the web of tape 3502 to maintain it in engagement with the sprocket wheel 3522 and the idler roller 3528. A stop pin 3560 carried on the base is normally spaced from the arm 3540 but serves to limit movement of this arm when the loop of tape 3502 is removed.

Since the loop of magnetic film or tape 3502 is to be advanced through a complete cycle of revolution during both the recording of the train information thereon and the transmission of this information, the train information recorder 3500 includes the control arrangement 3530 for providing a signal in response to the completion of each cycle of revolution of the magnetic film 3502. This arrangement comprises a pair of wipers 1752 and 1753 (Figs. 17 and 35) which are carried on a dielectric block 3532 mounted on the base plate 3504. The wiper 1753 is connected to B+ potential, and the wiper 1752 is connected to a control circuit in the train information recorder circuit 216. The outer surface of the magnetic tape or film 3502 is provided with a conductive element 3534, such as a conductive foil or tape, which, when moved into simultaneous engagement with wipers 1752 and 1753, completes a circuit for extending B+ potential from the wiper 1753 to the wiper 1752. This control potential, upon being forwarded to the train information recorder circuit 216 from the wiper 1752, advises this control circuit that a particular point on the magnetic tape 3502 has been reached, and this information is utilized thereby to remove the energization from the motor 1750. The magnetic film 3502, however, moves sufficiently beyond the sensing wipers 1752 and 1753 prior to the termination of its movement so as to insure that the conductive circuit between the wipers 1752 and 1753 is opened when this tape is in a rest position. Accordingly, when the motor 1750 is next energized, movement of the conductive portion 3534 into engagement with the wipers 1752 and 1753 advises the control circuit 216 that another cycle of revolution of the magnetic tape 3502 has been completed and thereby provides information that the common or repetitive message has been completely transmitted.

Although the train information recorder 3500 has been shown as including a magnetic film driven by a sprocket wheel, numerous other magnetic storage devices, such as magnetic disk or drum or a conventional magnetic tape driven by a capstan and pinch roller type of drive, could be used. Further, the control arrangement 3530 could comprise a sensing arrangement selectively controlled by a perforation in the film 3502.

*Recording incoming data on the magnetic tape 137*

When transmission is initiated from the remote sending office 102 to provide data for storage on the magnetic tape 137 in the link 130, the line circuit 112 places the line lockout and marker allotter 120 in operation so that an idle line marker, such as the line marker 132, cuts through the connection from the line circuit 112 to the input of the receiving commutator 134. This conditions the commutator 134 for controlling the operation of the recorder 136 to record received data on the magnetic film or tape 137. Following the completion of the data transmission pertaining to a single train report, a figure shift "H" is transmitted by the sending office 102 to release the line circuit 112, the seized link marker 132, and the receiving commutator 134.

As described above, when transmission of a train report or message is initiated at the remote sending office 102, a figure shift "F" is transmitted over the signaling line to operate a receiving relay or magnet 300 so that a plurality of pairs of contacts 301 and 302 are intermittently opened and closed in accordance with the transmitted codes to selectively supply positive battery through a series resistor 303 to either a monitoring printer 310 or to a signaling conductor 352 which extends to the associated input line circuit 112. In response to the receipt of mark pulses, the relay 300 closes the contacts 301 to supply positive battery to the printer 310, and, in response to the receipt of space pulses, the relay 300 closes the contacts 302 to supply positive battery to the signaling lead 352. When the first figure shift "F" code signal group is received by the printer 310, a function control means therein closes a pair of contacts 311 to supply ground over a pair of normally closed contacts 321 to the operating winding of a relay 330, thereby operating this relay to close a plurality of contacts 331 and 332. The operation of the relay 330 marks the line circuit 112, which is arbitrarily designated as number thirty-one, as requiring the association of a link, such as the link 130. The selective application of positive battery to the conductor 352 during the transmission of figure shift "F" to the receiving printer 310 performs no useful function inasmuch as this conductor is not extended to a recording instrument at this time.

The closure of the contacts 331 applies ground to a conductor 361 extending to the lockout and allotter circuit 120 to represent that the value of the tens digit of the arbitrary designation of the line circuit is "3" and that the units digit associated therewith is odd. In a similar manner, the line circuits 114, 116, and 118, upon seizure, selectively provide marking ground on conductors extending over a cable 370 to the circuit 120 to provide information relating to the value of the tens digit and the odd or even character of the units digit of the individual designation of each of these line circuits. The closure of the contacts 332 applies ground to a conductor 362 which extends to the circuit 120 to indicate that the value of the units digit of the designation of the line circuit 112, i.e. "1," is either "0" or "1." In a similar manner, the line circuits 114, 116, and 118 provide similar information by applying marking ground to conductors extending to the circuit 112 over a cable 340 upon seizure.

The line lockout and mark allotter circuit 120 is one of the many types well known in the art and, accordingly, a detailed description thereof is not set forth herein. However, a brief description of the operation of this circuit on a typical call is given insofar as it is necessary to a clear understanding of the present invention. The application of ground to the conductor 361 completes an operating circuit for a relay 600, representing an odd units digit and a tens digit "3," which extends from grounded battery through a resistance 651 and a plurality of normally closed contacts including a plurality of contacts 601, 621, and 603. The operation of the relay 600 closes a plurality of contacts 602, 604, 605, 701, and 702 and opens the contacts 601 and 603.

The closure of the contacts 604 and the opening of the contacts 603, which form a make-before-break contact arrangement, complete a holding circuit for the relay 600 extending to grounded battery through the resistance 651 and interrupt the above described operating circuit for the relay 600, respectively. The closure of the contacts 602 illuminates a lamp 652 to indicate the operation of the relay 600, and the opening of the contacts 601 interrupts the above described operating circuit for the relay 600 and also interrupts an operating circuit for an alarm relay 610. However, this relay is slow-to-release and does not release at this time. The closure of the contacts 605 prepares an additional holding circuit for the relay 600. The closure of the contacts 702 applies ground to a conductor 741 which extends through a cable 740 to the line marker 132. The application of ground to the conductor 741 provides information to the line marker 132 that the seized line circuit 112 is designated by a tens digit "3" which is associated with an odd units digit.

The closure of the contacts 701 interconnects the operating winding of a relay 710 with the grounded conductor 362, thereby completing an operating circuit for this relay which extends to grounded battery through a plurality of normally closed contacts 712 and 622, a plurality of normally closed contacts controlled by a plurality of relays similar to the relay 710, a pair of normally closed contacts 714, and a resistor 721. The operation of the relay 710 closes a plurality of contacts 711, 713, 715, 716, 717, and 718 and opens the contacts 712 and 714. The closure of the contacts 713 and the opening of the contacts 712, which form a make-before-break contact arrangement, complete a holding circuit for the relay 710 extending directly to grounded battery through the resistance 721 and open the above described operating circuit for the relay 710, respectively. The closure of the contacts 711 prepares another holding circuit for the relay 710, and the closure of the contacts 715 energizes a lamp 720 to provide an indication that the relay 710 has been operated. The opening of the contacts 714, which form a make-before-break contact arrangement with the contacts 715, interrupts an additional point in the operating circuit for the relay 710 and also interrupts the operating circuit for a normally operated and slow-to-release alarm relay 640, which does not release at this time. The closure of the contacts 718 applies ground to a conductor 731 which extends through a cable 730 to the line marker circuit 132 to provide this circuit with information indicating that the units digit of the seized line circuit 112 is either "0" or "1."

The closure of the contacts 716 completes an obvious operating circuit for a relay 620 so that this relay operates to open the contacts 621 and 622 and a pair of contacts 623. The opening of the contacts 621 interrupts an additional point in the preliminary operating circuit for the plurality of relays similar to the relay 600 and thus prevents additional operation of the line lockout and marker allotter circuit 120 until such time as the operation of the line marker 132 has been completed. In a similar manner, the opening of the contacts 622 prevents the operation of any of the relays similar to the relay 710 until such time as the line marker 132 has cut through the line circuit 112 to the receiving commutator 134.

The closure of the contacts 717 applies direct ground to the operating winding of a normally operated slow-to-release relay 630 and to the operating winding of a relay 410 in the line marker 132 through a pair of normally closed contacts 402, thereby operating the relay 410 to close a plurality of contacts 412 and 414, to close a group of contacts 411, and to close a group of contacts 413. The closure of the contacts 412 provides a source of holding ground for the line marker 132. The closure of the contacts 414 provides holding ground to a normally operated relay 400 from a pair of normally closed contacts 403. The closure of the group of contacts 411 interconnects the conductors in the cable 740, representing the value of the tens digits of the seized line circuit 112, with the operating windings of a plurality of tens digit relays in the line marker 132. As described above, the conductor 741 is supplied with ground at the closed contacts 702, and, accordingly, the closure of the group of contacts 411 completes an obvious operating circuit for a relay 500 so that this relay operates to close a plurality of contacts 501, 502, and 503. The closure of the contacts 503 completes an obvious holding circuit for the relay 500 extending to ground at the closed contacts 412.

The closure of the group of contacts 413 interconnects the conductors in the cable 730, representing units digit information, with the operating winding of a plurality of units digits relays in the line marker circuit 132. Since the conductor 731 is provided with ground at the closed contacts 718, the closure of the group of contacts 413 completes an obvious operating circuit for a relay 420 so that this relay operates to close a plurality of contacts 421, 422, 423, and 424 and to open a pair of contacts 425. The closure of the contacts 423 completes an obvious holding circuit for the relay 420. The opening of the contacts 425 opens the normally completed operating circuit for the relay 400, but this relay remains operated over the above described holding circuit.

To provide an indication that the incoming link 130 has been seized, the closure of the contacts 424 applies ground to a conductor 460 which is extended through a pair of normally closed contacts 1128 in the link marker 202 to illuminate a lamp 1191. To initiate the operation of the link marker 202 as an incident to the seizure of the incoming link 130 by the above operation of the line marker 132, the closure of the contacts 412 also extends ground over the conductor 461 to the link marker 202.

The closure of the contacts 421 and 422 and of the contacts 501 and 502 cuts through the signaling conductor 352 and another conductor 351 of the seized line circuit 112, which extend to the line marker 132 through a cable 350, to the grounded holding conductor 461 in the line marker circuit 132 and to a signaling lead 462 which extends to the input of the receiving commutator 134, thereby interconnecting the remote sending office 102 with the input of the receiving commutator 134 to condition this commutator for receiving items of information transmitted from the remote sending office 102. The interconnection of the conductors 351 and 461 extends the ground provided at the closed contacts 412 to the operating winding of a relay 320 in the line circuit 112 so that this relay operates to open the contacts 321 and to close a pair of contacts 322. The closure of the contacts 322 provides holding ground for the relay 320 and also for the operated relays 420 and 500 in the line marker circuit 132 so that these relay components remain operated for so long as the function contacts 311 in the monitoring printer 310 remain closed.

The opening of the contacts 321 interrupts the above described operating circuit for the relay 330 so that this relay releases to open the contacts 331 and 332 to remove ground from the conductors 361 and 362. Removing ground from these conductors releases the relays 600 and 710 in the line lockout and marker allotter circuit 120 so that these relays restore the contacts controlled thereby to their normal condition. Incident to this restoration, ground is removed from the conductors 731 and 741, but the relays 420 and 500 remain operated over the above described holding circuit extending to ground at either of the pairs of closed contacts 412 or 311.

The opening of the contacts 602 terminates the energization of the lamp 652, and the concurrent closure of the contacts 601 again completes the operating circuit for the alarm relay 610 so that this relay remains operated. The opening of the contacts 715 terminates the energization of the lamp 720, and the concurrent closure of the contacts 714 completes the operating circuit for the alarm relay 640 so that this slow-to-release relay does not release. The opening of the contacts 716 interrupts the operating circuit for the relay 620 so that, after the slow-to-release interval thereof, this relay releases. The opening of the contacts 717 removes the ground shunt from the alarm relay 630, which has remained operated due to the slow-to-release characteristic thereof.

The opening of the contacts 717, however, also interrupts the above described operating circuit for the relay 410 so that this relay releases to restore the contacts controlled thereby to their normal condition. The opening of the contacts 412 interrupts the above described holding circuit for the relays 420 and 500, but these relays remain operated over the ground provided at the closed contacts 311. The opening of the contacts 412 further removes the ground applied to the link marker circuit 202 to initiate the operation thereof, but ground is maintained on the conductor 461 by the closed contacts 311. The opening of the groups of contacts 411 and 413 interrupts an additional point in the operating circuits for the relays 420 and 500.

The opening of the contacts 414, however, opens the holding circuit for the relay 400 so that this relay releases to close a plurality of contacts 401, 404, and 405 and to open the contacts 402 and 403. The opening of the contacts 403 interrupts an additional point in the holding circuit for the relay 400, and the opening of the contacts 402 both interrupts an additional point in the operating circuit for the relay 410 and opens the operating circuit for the slow-to-release relay 630. The closure of the contacts 404 prepares an operating circuit for the relay 400 controlled by a reset relay 650 in the line lockout and marker allotter circuit 120, which circuit is interrupted at the open contacts 425. The closure of the contacts 405 prepares an operating circuit for the reset relay 650 in the line lockout and marker allotter circuit 120, but this operating circuit is a series circuit extending through all of the line markers with which the common allotter circuit 120 is associated, and, accordingly, this circuit is interrupted at a pair of contacts 405a controlled by a relay 400a in the line marker 142 which is the next line marker in the group of markers controlled by the line lockout and marker allotter circuit 120.

The closure of the contacts 401 completes another operating circuit for the alarm relay 630 in the line lockout and marker allotter circuit 120 which extends from ground through the operating winding of this relay and thence to grounded battery through the closed contacts 401 and 402a and the operating winding of a relay 410a in the line marker 142. The completion of this circuit within the slow-to-release interval of the relay 630 prevents the release of the relay 630 and conditions the line marker 142 for operation in the manner described above when the line lockout and marker allotter circuit 120 is next placed in operation. In this manner, following the operation of the line marker circuit 132 to extend the line circuit 112 to the input of the receiving commutator 134 in the incoming link 130, the line marker circuit 142 is conditioned for operation by the line lockout and marker allotter circuit 120 in response to the next seizure of one of the plurality of line circuits 114, 116, or 118.

The receiving commutator 134 (Fig. 8) is now conditioned to receive information transmitted from the remote sending office 102 and to use this information to operate the recorder 136 (Fig. 9) so that the information is recorded on the magnetic film 137. In general, the receiving commutator 134 utilizes a counting chain 856 driven by a multivibrator 887 for sequentially rendering each of the five transducing heads 921–925 in the recorder 136 responsive to the signals applied to the incoming line 352 and includes means for rendering the multivibrator 887 effective in response to the receipt of a start pulse and ineffective in response to a single cycle of operation of the counting circuit 856. Further, the termination of the cycle of operation of the counting circuit 856 operates the step-by-step drive mechanism actuated by the motor magnet 900 to advance the magnetic film or tape 137 a single step following the recording of a complete code combination. In order to permit the plurality of recording heads 921–925 to be rendered effective at a particular point in each of the transmitted code bits, the receiving commutator 134 includes a range selection circuit.

More specifically, the range selection circuit comprises a pair of transistors 800 and 810 connected as an electronic switch having a single stable state in which the transistor 800 is normally conducting and the transistor 810 is cut off. To maintain the transistor 800 normally conductive, a voltage divider including a plurality of resistances 803, 805, and 806 connected between negative battery of fifty volts and ground provides the base electrode of the transistor 800 with a somewhat negative potential. The emitter electrode of the transistor 800 is connected to a voltage divider including a pair of resistances 807 and 808 connected between negative battery and ground to be provided with a negative potential which is positive with respect to the base electrode of the transistor 800. These potentials maintain the transistor 800 normally conductive to provide a flow of base and collector current through the resistance 807 to supply a small negative potential which is applied to the emitter electrode of the transistor 810. The base electrode of the transistor 810 is connected to ground through a resistance 814 which normally maintains the base electrode of the transistor 810 positive with respect to the emitter electrode thereof so as normally to hold the transistor 810 in a cutoff condition.

When a space or start signal of positive battery is applied to the conductor 462 from the signaling lead 352, a positive pulse is developed across a resistance 817 which is coupled through a fairly large condenser 801, a series resistor 817, and a rectifier 802 to the base electrode of the transistor 800, thereby driving the base electrode positive with respect to the emitter electrode and cutting off the transistor 800. Cutting off the transistor 800 decreases the flow of collector current through the transistor 800 and a series resistor 811 to provide a negative pulse which is simultaneously coupled through a condenser 816 to the cathode of a gaseous discharge start tube 820 and through a series resistor 812 and a coupling condenser 813 to the base electrode of the transistor 810. The application of a negative potential to the base electrode of the transistor 810 renders this transistor conductive so that collector current flows through the resistor 806 to provide a positive pulse which is coupled through a condenser 815 and a rectifier 824 to the control electrode of the start tube 820. This control electrode is provided with a proper operating bias by a voltage divider including a pair of resistances 822 and 823 connected between a B+ potential of approximately one hundred and fifty volts and ground.

The simultaneous application of the negative going potential to the cathode of the tube 820, which is blocked from ground by a suitably poled rectifier 821 in the cathode circuit, and the positive pulse to the control electrode of the start tube 820 renders this tube conductive so that a negative potential is applied by an anode coupling condenser 825 to the anode of a normally conductive stop tube 830. This negative voltage extinguishes the stop tube 830 to render the multivibrator 887 effective, thereby to initiate a cycle of recording operation of the receiving commutator 134.

Referring back to the range selection circuit, the positive potential provided across the resistor 806 in response to rendering the transistor 810 conductive momentarily increases the postive potential applied to the base electrode of the transistor 800 so as to aid in maintaining this transistor in a cutoff condition. After a time interval primarily determined by the time constant of the resistor 812 and the condenser 813, the negative potential applied to the base electrode of the transistor 810 becomes dissipated so that this transistor returns to a cutoff condition to reduce the potential drop across the resistor 806. The reduction of this potential drop together with the dissipation of the positive pulse supplied through the condenser 801 again renders the base electrode of the transistor 800 negative with respect to the emitter electrode thereof so that the transistor 800 again begins to conduct.

As set forth above, the range selector is utilized to provide a means for selecting a desired point in the duration of each of the code bits at which each of the recording heads 921–925 is to be rendered responsive to the signals applied to the conductor 462. This selection is accomplished by providing a time delay between the application of the positive pulse to the condenser 801 and the time at which the base electrode of the transistor 800 is driven enough positive relative to its emitter to cut the transistor 800 off. To accomplish this, the resistor 808 is provided with an adjustable tap which is connected to one side of a condenser 804 through the series resistor 817, the other side of the condenser 804 being connected to ground. Accordingly, the condenser 804 is normally charged to a negative potential dependent upon the adjustment of the tap on the resistor 808 to provide a negative potential at one terminal of the rectifier 802. The other terminal of this rectifier is connected substantially to ground due to conduction in the emitter circuit of the transistor 800.

The coupling condenser 801 is of a relatively large magnitude so that the positive going potential provided by connecting positive battery to the signaling conductor 462 is substantially instantaneously coupled to the condenser 804 to cause this condenser to charge in a positive direction or to discharge the negative potential thereon. After a time delay determined by the magnitude of the normal negative charge on the condenser 804, the terminal of the rectifier 802 connected thereto becomes positive with respect to the terminal of this rectifier which is connected to the base electrode of the transistor 800 and, at this time, the rectifier 802 conducts to drive this base electrode positive with respect to its emitter, thereby cutting off the transistor 800 as described above. The time delay between the application of the start pulse through the condenser 801 and the time at which the transistor 800 is rendered substantially nonconductive is adjusted by varying the position of the tap on the resistor 803. Moving the tap toward the battery connection serves to increase the time delay.

As set forth above, rendering the transistor 800 nonconductive and rendering the transistor 810 conductive fires the start tube 820 to extinguish the stop tube 830, thereby to initiate operation of the multivibrator 887. Since this multivibrator drives the counting chain 856 to render the transducing heads 921–925 in the recorder 136 sequentially effective, the provision of an adjustable time delay between the positive going front of the start pulse and the starting of the multivibrator 887 permits the heads 921–925 to be rendered responsive to only selected increments of the transmitted code bits.

The information transmitted from the remote sending office 102 is in the form of a convention five bit Baudot permutation or combinational code, and, accordingly, to record this type of coded information, the recorder 136 includes the five transducing heads 921, 922, 923, 924, and 925 which are disposed adjacent transversely spaced portions of the magnetic film or tape 137. One side of the operating windings of each of these heads is connected to the signaling conductor 462, and the other sides of the energizing windings for these heads are each connected to one of a plurality of gaseous discharge tubes 860, 870, 871, 872, and 873 forming the counting chain 856. This counting chain is advanced step-by-step under the control of the multivibrator 887 to momentarily render each of the heads 921–925 effective to record a mark signal on the magnetic tape 137 in accordance with the signaling condition on the conductor 462. Space signals are represented by an absence of a recording on the film 137.

To drive the counting chain including the tubes 860, 870, 871, 872, and 873, the multivibrator 887 is provided which comprises a pair of transistors 880 and 890 and a drive tube 895 controlled thereby. In the normal condition of the multivibrator 887, the transistor 890 and the output drive transistor 895 are conducting, and the transistor 880 is cutoff by the normally conducting stop tube 830. As described above, the stop tube 830 is normally conducting so that a positive voltage drop is produced across a cathode resistor 831. This positive potential biases a rectifier 881 in its forward direction so that current flows through a resistor 875 connected to the base electrode of the transistor 880, thereby providing a positive voltage on the base electrode of the transistor 880 which maintains this transistor cutoff.

To place the multivibrator 887 in operation, the positive pulse representing the start signal operates the range selector circuit, as described above, to render the start tube 820 conductive and to extinguish the stop tube 830. The removal of the voltage drop across the resistor 875 renders the base electrode of the transistor 880 negative with respect to its emitter so that the transistor 880 begins to conduct to provide a voltage drop across a resistor 882 in its collector circuit. In the normal off condition of the multivibrator 887, the point of common connection of a coupling condenser 883 and a rectifier 884 is maintained at a slightly negative potential so that, when a drop is produced across the resistor 882, this common point is driven positive to block the rectifier 884. When the rectifier 884 is blocked, the base electrode of the normally conducting transistor 890 goes to approximately ground potential to cut off the transistor 890. Cutting off current flow through the transistor 890 produces a negative voltage swing across a resistor 892 which is coupled through a condenser 891 and a rectifier 893 to the base electrode of the transistor 880, thereby to assist the current buildup therein.

When the rectifier 884 is biased in a reverse direction at the initiation of conduction in the transistor 880, the condenser 883 begins to charge toward a negative voltage determined by a voltage divider including a pair of resistors 885 and 886 over a circuit including a series resistor 889 and the conductive path including the collector of the transistor 880. When this condenser charges sufficiently in a negative direction or dissipates the positive swing in voltage provided by rendering the transistor 880 conductive, the rectifier 884 is again biased in a forward direction so that current flows from the voltage divider including the resistors 885 and 886 through the resistors 889 and 876 to provide a negative potential on the base electrode of the transistor 890. During the interval in which the transistor 890 is cut off, the coupling condenser 891 charges to a negative potential which maintains the rectifier 893 in a conductive condition, but, when a negative potential is again produced across the resistor 876, the transistor 890 begins to conduct and provides a positive voltage swing which is effective at the junction of the rectifier 893 and the condenser 891 to block the rectifier 893 so that the base electrode of the now conducting transistor 880 goes to approximately ground potential, thereby to cut off the transistor 880.

Cutting off the transistor 880 produces a negative voltage swing across the resistor 882 which is transmitted through the condenser 883 and the conducting rectifier 884 to the base electrode of the transistor 890, thereby to aid the current buildup in this transistor. In the manner described above, the condenser 891 now begins to charge in a negative direction due to the potential provided by the voltage divider through a resistor 894 so that, after a selected time interval largely determined by the magnitude of the resistor 894 and of the condenser 891, the rectifier 893 is again biased in a forward direction to cause the transistor 880 to cut off, thereby to cause the transistor 890 to become conductive. This cyclic operation of the transistors 880 and 990 continues until such time as the stop tube 830 is again rendered conductive to hold the transistor 880 in a nonconducting condition.

To provide a means for deriving an output signal from the multivibrator 887, the transistor 895 is provided. The base electrode of the transistor 895 is normally supplied with the negative potential across the base resistor 876 of the transistor 890 through the normally conductive base emitter path thereof and a shunting resistance 897. The emitter electrode of the transistor 895 is connected to ground through a small resistor 898 so that the base electrode of this transistor is normally negative with respect to the emitter and, accordingly, the transistor 895 is normally conducting. In this conductive state, the emitter of the transistor 895 carries the collector and base current of the transistor 890 and the collector current of the transistor 895. When the transistor 880 is rendered conductive to block the rectifier 884, the base electrode of the transistor 890 and, by virtue of the resistance 897, of the transistor 895 is biased in a positive direction toward ground. The flow of emitter current in the conductive transistor 880 provides a negative potential drop across the resistor 898 so that the base electrode of the transistor 895 becomes positive with respect to its emitter electrode, and current flow through the transistor 895 is terminated. The interruption of collector current flow to the emitter of the transistor 895 produces a negatively directed potential swing across a resistor 888.

When the transistor 880 is again cut off and the transistor 890 is rendered conductive, as described above, the negative potential across the resistor 876 is applied to the base electrode of the transistor 895 so that this transistor again conducts to provide a positively directed voltage swing at its collector electrode due to the potential drop across the resistor 888. In this manner, an alternating output signal is delivered by the drive transistor 895 to a coupling condenser 896. It should be noted that, since the emitter of the transistor 895 carries the current from both of the transistors 890 and 895, a gain is realized in the coupling of the multivibrator 887 to the drive tube 895.

The positive and negative alternations or signals provided by the multivibrator 887 are coupled to a pulse clipping circuit by the condenser 896. A rectifier 899 which is connected to one terminal of the coupling condenser 896 conducts the negative alternations of the signal to ground so that only the positive going peaks are applied to a transformer winding 859, which is connected as an autotransformer. The excitation of the transformer 859 by the positive going voltages produces fairly large voltage swings, at the peaks of which ringing is induced. To clip the upper portion of the positive going signals so as to provide pulses having flat tops, a rectifier 857 is provided. This rectifier is normally biased to around sixty volts by a voltage divider. When the amplitude of the positive pulses provided by the transformer 859 exceeds the sixty volt bias, the rectifier 857 conducts to charge a condenser 858, thus removing the peak portions of the positive waves to supply operating pulses of a suitable waveform for operating the counting chain 856.

The pulses from the clipping circuit are applied by a common pulsing lead to the control electrodes of all of the tubes 860, 870, 871, 872, and 873 forming the counting chain 856. Since the first transmitted bit in each code combination is the start pulse which fires the start tube 820 and extinguishes the stop tube 830, the multivibrator 887 delivers the first operating pulse to the counting chain 856 during the transmission of the first intelligence code bit and at a time determined by the adjustment of the range selector. To render the first tube 860 in the counting chain 856 responsive to the first pulse from the multivibrator 887, the control electrode of this tube is provided with a fixed bias from a voltage divider including a pair of resistances 862 and 863 connected between B+ potential and ground. When the first pulse is transmitted through the clipping circuit from the multivibrator 887, the tube 860 is rendered conductive to produce a voltage drop across a pair of cathode resistances 864 and 865. The positive potential provided at the junction of the resistors 864 and 865 is applied through a resistor 866 to the control electrode of the second tube 870 in the counting chain 856.

To provide a means for rendering the first bit recording or transducing head 921 in the recorder 136 responsive to the signaling condition on the conductor 462, the positive pulse produced at the cathode of the tube 860 is coupled through a condenser 867 to one terminal of a rectifier 859, the other terminal of which is connected to one side of the winding of the head 921. The rectifier 859 is normally biased in a reverse direction by a voltage divider including a pair of resistances 868 and 869 connected between negative battery and ground so that conduction through the head 921 is normally blocked. However, when a positive pulse is supplied by the condenser 867, the reverse direction bias for the rectifier 859 is overcome to render the head 921 responsive to the signals applied to the conductor 462. As set forth above, if the transmitted code bit is a space signal, positive battery is connected to the conductor 462. This positive battery is extended through the winding of the transducing head 921 to the rectifier 859. The application of a positive potential to both of the terminals of the rectifier 859 blocks conduction therethrough and thus prevents a flow of current through the winding of the head 921. Accordingly, when a space signal is transmitted, a signal is not recorded on the magnetic film 137 by the transducing head 921. Alternatively, if the signal transmitted from the remote sending office 102 is a mark pulse, which comprises an open circuit on the conductor 462, the common side of the transducing head 921 is connected to ground through the resistor 809, and the application of the positive potential to the rectifier 859 through the coupling condenser 867 provides a momentary surge of current through the winding of the transducing head 921, thereby to record a mark pulse on the magnetic tape 137.

When the next positive pulse is delivered by the multivibrator 887 to the counting chain 856, the tube 870 is rendered conductive inasmuch as an enabling bias is provided to the control electrode thereof from the cathode circuit of the fired tube 860. Firing the tube 870 provides an enabling bias for the next tube 871 in the counting chain and also provides a positive pulse which is transmitted to the rectifier in the cathode circuit of the tube 870 to render the head 922 responsive to the signaling condition on the conductor 462. In a similar manner, the tubes 871, 872, and 873 are sequentially rendered conductive to control the recording of mark or space information by the transducing heads 923, 924, and 925.

In addition to controlling the recording of information by the transducing head 925, firing the tube 873 couples a positive pulse through a condenser 846 to the control electrode of a gaseous discharge tube 840. This electrode is provided with a fixed bias by a voltage divider including a pair of resistances 841 and 842 so that the pulse from the counting chain 856 fires the tube 840. Firing the tube 840 produces a positive signal across a pair of resistors 843 and 844 which is coupled through a condenser 834 to the control electrode of the stop tube 830 to fire this tube. The control electrode of the stop tube 830 is provided with a fixed bias by a voltage divider including a pair of resistances 832 and 833. Firing the tube 830 produces a negative voltage swing at the anode thereof which is coupled through the condenser 825 to extinguish the start tube 820. Further, firing the tube 830 produces current flow through the base resistor 875 for the transistor 880 in the multivibrator 887, thereby arresting operation of the multivibrator 887 until such time as the stop tube 830 is again extinguished.

The control tube 840 also provides a means for energizing the motor magnet 900 in the recorder 136 to advance the magnetic film 137 a single step following the recording of each code combination. More specifically, the cathode of the tube 840 is returned to negative battery through the resistors 843 and 844. In the normally nonconductive condition of the tube 840, the negative battery connected to the resistance 844 together with the negative battery connected to a resistance 852 maintains a power transistor 850 in a conductive condition so that a voltage drop is produced across a ballast lamp 851 in its collector circuit. However, when the tube 840 is rendered conductive, a more positive potential is supplied to the base electrode of the transistor 850 to render this transistor nonconductive, thereby to produce a negative voltage swing at its collector electrode due to the termination of current flow through the ballast lamp 851. This negatively directed voltage swing drives the base electrode of a power transistor 850 negative with respect to its emitter electrode, which is connected to a fixed negative potential, so that the normally nonconductive transistor 855 conducts to operate the motor magnet 900.

Operation of the motor magnet 900 conditions the step-by-step advancing mechanism for moving the magnetic film 137 a single step relative to the heads 921–925 and also opens a pair of contacts 901. Opening the contacts 901 removes B+ potential from the tubes 840, 860, 870, 871, 872, and 873 so that these tubes are extinguished in preparation for the next cycle of operation of the receiving commutator 134. Extinguishing the tube 840 removes the positive potential from the base electrode of the transistor 850 so that this transistor is rendered conductive to render the transistor 855 nonconductive. Cutting off the transistor 855 terminates the energization of the motor magnet 900 so that the contacts 901 are closed to again supply B+ potential to the receiving commutator 134. Further, the release of the motor magnet 900 advances the magnetic film 137 a single step, as described above, so that the code combination which has just been recorded on the film 137 is displaced from the gaps of the transducing heads 921–925.

When the next start pulse is received from the remote sending office 102, the range selector again renders the start tube 820 conductive and extinguishes the stop tube 830 so that the multivibrator 887 again operates the counting chain through a single cycle of operation during which the next item of information or code combination is stored on the magnetic film or tape 137 in the recorder 136 by the transducing heads 921–925 in the manner described in detail above.

In a typical train report, the information transmitted from the remote sending office 102 which is recorded on the magnetic film 137 by the recorder 136 under the control of the receiving commutator 134 comprises the following:

(1) A group of successive codes comprising letter shift and figure shift "F" which is utilized to initiate the transfer of the repetitive information or message from the magnetic film 137 to the train storage recorder 3500.

(2) The text of the repetitive message, such as the train designation and departure date.

(3) A pair of codes representing figure shift "G" which is used both to interrupt the transfer of the common or repetitive message from the magnetic film 137 to the train storage recorder 3500 and to call in the register decoder 240 for receiving switch code combinations.

(4) A two digit switch code separated by a slash or diagonal code from another two digit switch code which is followed by a control or function code, such as one representing a carriage return or line feed operation. In an illustrative car report or message in which the recorders to be seized are designated "18" and "07," code combinations representing the following are transmitted—18/07FS.

(5) A portion of the first car report or message comprising such data as the designation of a freight car and its contents.

(6) Two code combinations representing figure shift "F" which is utilized to call in the train storage recorder 3500 to repeat the common or repetitive message to the selected recorders designated "18" and "07," for instance.

(7) The remainder of the first car report or message which may include the consignee and consignor together with the destination city and state, and the origin city and state.

(8) A pair of code combinations representing figure shift "G" which releases the two previously seized recorders designated "18" and "07" and again calls in the register decoder 240 to prepare two other recorders for receiving the information pertaining to the next car report.

(9) Data comprising a series of car reports or messages including the items listed in 4, 5, 6, and 7 above.

(10) Two code combinations representing figure shift "H" which is utilized to signify the end of transmission of a train report from the remote station and which operates to release the outgoing link.

As described above, the end of the train report or complete message is signified by the transmission of codes representing figure shift "H." This figure shift "H" combination is repeated by the receiving relay 300 so that it is stored on the magnetic film 137 by the receiving commutator 134 to provide an end of message indication on the magnetic film 137. However, the receiving relay 300 also operates the printer 310 in accordance with the figure shift "H" combination so that the contacts 311 are opened to remove ground from the holding circuit including the connected conductors 351 and 461. The removal of ground from the conductor 351 releases the cutoff relay 320 to open the contacts 322 and to close the contacts 321, thereby permitting the line circuit to again be seized by operating the relay 330. The removal of ground from these conductors also releases the operated relays 420 and 500 in the line marker 132 to disconnect the conductors 461 and 462 from the conductors 351 and 352, thereby opening the connection between the receiving relay 300 and the receiving commutator 134 to permit it to be associated with another line circuit by the line marker 132. The removal of ground from the conductors 351 and 461 also removes the seizure ground forwarded to the link marker 202 in the incoming link 130, but the marker 202 remains operated until all of the data stored on the film 137 has been transmitted. In releasing, the relay 420 removes ground from the conductor 460, thereby to prevent the lamp 1191 in the link marker 202 from being energized under the control of the line marker 132. The above operations complete the restoration of the line circuit 112, the line marker 132, and the commutator 134 to a normal condition.

The link 130 now has data stored therein which is transmitted to selected recorders as described in detail below. This transmission of the stored data takes place concurrently with the above described recording operations although the data recording is completed prior to the completion of the retransmission thereof. Since the components 132 and 134 are released prior to the completion of the retransmission of the received data, these components can be seized and again used to control the storage of data on the film 137 under the control of any one of the line circuits 112, 114, 116, and 118 so that, with short messages, it is possible to have portions of two or more train reports or messages stored on the film 137.

*Recording the stored information*

During a data recording operation, the signals previously stored on the magnetic film 137 by the recorder 136 are reproduced by the transmitter 138 and transmitted through one of a plurality of outgoing links, similar to the links 210 and 220, to a pair of printers or recorders, such as the printers 270, 272, 274, 276, and 278. To initiate the transmitting or readout operation, the line marker of a seized incoming link, such as the marker 202 in the link 130, places the link lockout and allotter circuit 280 in operation so that an idle link, such as the link 210 is seized. Thereafter, the common train information is transmitted to the train storage recorder 3500 by the train storage recorder circuit 216 in the seized link 210, and the register decoder 240 is seized to receive the first group of stored switch codes for selectively operating the connector link 212 and the line connectors 218 and 219 to establish a connection from the transmitting commutator 214 to the selected pair of printers. Thereafter, the first message is transmitted from the transmitter 138 through the commutator 214 to the seized printers in conjunction with the common or repetitive message stored in the train storage recorder 3500. Following the completion of the transmission of the first car report or message in the train report, the line connectors 218 and 219 are released and the register decoder 240 is again seized to receive the second group of switch codes. In this manner all of the items of information stored on the magnetic film 137 are transmitted to the printers.

As described above, when the line marker 132 connects the receiving commutator 134 to the receiving relay 300, ground is applied to the conductor 461. This ground is extended to the link marker 202 (Figs. 10 and 11) to initiate the operation of this circuit and the lockout and allotter circuit 280 which associate the transmitter 138 in the seized incoming link 130 with an idle one of the plurality of outgoing links, such as the links 210 and 220. More specifically, the ground applied to the conductor 461 completes obvious operating circuits for a pair of relays 1130 and 1140. The operation of the relay 1130 closes a plurality of contacts 1131 and 1132. The closure of the contacts 1131 completes a holding circuit for the relay 1130 extending to a pair of closed and grounded contacts 1105. In operating, the relay 1140 closes a plurality of contacts 1143, 1145, and 1148 and opens a plurality of contacts 1141, 1142, 1144, 1146, and 1147. The opening of the contacts 1147 interrupts the above described operating circuit for the relay 1130, but this relay remains operated over the above described holding circuit. The opening of the contacts 1141 interrupts a circuit controlled by the tight tape contacts 951 in the transmitter 138, and the closure of the contacts 1145 prepares a circuit controlled by the loose tape contacts 952. The closure of the contacts 1143 extends ground to the common contact of the tight and loose tape contact arrangements shown in Fig. 9.

The closure of the contacts 1148, together with the closure of the contacts 1132, completes an operating circuit for a relay 1110 which extends to ground at a pair of normally closed contacts 1321 controlled by a relay 1320 in the link lockout and allotter circuit 280 (Figs. 12 and 13), which circuit extends through a pair of normally closed contacts 1125. The operation of the relay 1110 closes a plurality of contacts 1111, 1112, and 1113. The closure of the contacts 1112 completes a holding circuit for the relay 1110 extending to ground at a pair of normally closed contacts 1126. The closure of the contacts 1113 applies ground to the operating winding of the relay 1320, thereby operating this relay to open the contacts 1321 to remove ground from the above described operating circuit for the relay 1110. However, the relay does not release at this time due to the prior completion of the holding circuit therefor.

The closure of the contacts 1111 completes an operating circuit for a relay 1100 extending from ground through the closed contacts 1111, a winding of the relay 1100, a plurality of normally closed contacts 1102 and 1203, and a plurality of normally closed contacts in each of the plurality of line markers similar to a pair of contacts 1103 in the marker 202 to battery through a resistance 1299. The operation of the relay 1100 closes a plurality of contacts 1101, 1104, and 1106 and opens the contacts 1102, 1103, and 1105. The operations of the contacts 1101 and 1102, which form a make-before-break contact arrangement, complete a holding circuit for the relay 1100 extending directly to negative battery at the resistance 1299 and interrupt the above described operating circuit for the relay 1100. The opening of the contacts 1103 interrupts the above described series circuit extending through all of the link markers to prevent the operation of any other link markers during the interval in which the link marker 202 is being utilized to associate the incoming link 130 with an idle outgoing link. The opening of this series circuit also interrupts the normally completed operating circuit for a slow-to-release relay 1210 in the allotter circuit 280. The opening of the contacts 1105 interrupts the holding circuit for the relay 1130 so that this relay releases.

The closure of the contacts 1104 completes an obvious operating circuit for a slow-to-release guard relay 1200 in the link lockout and allotter circuit 280, which is of a type well known in the field of telephony. In operating, the relay 1200 closes a plurality of contacts 1201 and 1202 and opens the contacts 1203. The opening of the contacts 1203 interrupts an additional point in the common battery circuit for the link markers, thereby to prevent their operation during operation of the link marker 202. The closure of the contacts 1201 applies a ground shunt to the operating winding of a slow-to-release allotter alarm relay 1220, but this relay does not release at this time. Further, the closure of the contacts 1201 completes an obvious operating circuit for a relay 1250 extending through a pair of normally closed contacts 1242. The operation of the relay 1250 closes a plurality of contacts similar to a pair of contacts 1251 and also closes a pair of contacts 1252.

The closure of the contacts 1252 completes a holding circuit for a normally operated relay 1240 to maintain this relay in an operated condition. More specifically, the relay 1240 is normally maintained operated over a circuit controlled by the connector link 212 in the outgoing link 210. This circuit extends from battery through the winding of the relay 1240, a conductor 1261, a pair of normally closed contacts 1951 on a release key in the connector link 212, a plurality of normally closed contacts 1823 and 1945, a conductor 1263, and thence to ground through a pair of closed contacts 1244. A holding circuit for the relay 1240 is completed by the closure of the contacts 1252 inasmuch as the ground provided at the contacts 1244 is extended over a conductor 1262 directly to the contacts 1251 on the release key in the connector link 212.

The closure of the contacts 1251 and the prior closure of the contacts 1202 extend ground through the closed contacts 1106 on the relay 1100 in the link marker 202 to a conductor 1021 which extends over a cable 1020 to the operating winding of a relay 1000 in the link marker 202 which is individual to the outgoing link 210. The operation of the relay 1000, in closing a plurality of contacts 1001–1009 and 1001*a*, connects the output of the incoming link 130 to the outgoing link 210. The closure of the contacts 1009 prepares a holding circuit for the relay 1000 extending over a conductor 1041 and a pair of normally closed contacts 1944 to ground through the operating winding of a relay 1820 in the connector link. The relay 1820 is not operated at this time due to the ground shunt around the operating winding therefor provided by the ground on the conductor 1021.

The closure of the contacts 1001–1005 interconnects the output of a plural unit amplifier 920 in the transmitter 138 controlled by the transducing heads 931–935 with the input to the transmitting commutator 214 individual to the outgoing link 210 through a cable 1030. The closure of the contacts 1008 prepares an operating circuit for the motor magnet 910 in the transmitter 138, and the closure of the contacts 1006 extend B+ potential from the transmitter 138 to the transmitting commutator 214. The closure of the contacts 1007 prepares a circuit controlled by the loose tape contacts 952 for extending start ground to the train storage recorder circuit 216 in the outgoing link 210.

The closure of the contacts 1001*a* completes an obvious operating circuit for a relay 1120 so that this relay operates to close a plurality of contacts 1121, 1123, and 1127 and to open a plurality of contacts 1122, 1124, 1125, 1126, and 1128. The opening of the contacts 1128 terminates the energization of the lamp 1191 by the ground applied to the conductor 460 by the line marker 132, and the concurrent closure of the contacts 1127 energizes the lamp 1191. The opening of the contacts 1126 interrupts the holding circuit for the relay 1110 so that this relay releases to open the contacts 1111, 1112, and 1113. The opening of the contacts 1113 releases the relay 1320 in the link lockout and allotter circuit 280, and the opening of the contacts 1111 interrupts the above described holding circuit for the lockout relay 1100 in the link marker 202 so that this relay releases to restore the contacts controlled thereby to their normal condition.

In releasing, the relay 1100 closes the contacts 1103 to again complete the energizing circuit for the marker alarm relay 1210, which, in being slow-to-release, has not released at this time. The opening of the contacts 1104 interrupts the above described operating circuit for the guard relay 1200 which, in being slow-to-release, does not release at this time. The opening of the contacts 1106 interrupts the circuit for applying operating ground to the winding of the relay 1000, but this relay remains operated over the above described holding circuit. However, the removal of ground from the conductor 1021 completes the operating circuit for the relay 1820 so that this relay operates in series with the relay 1000 to close a plurality of contacts 1821, 1822, and 1824, and to open the contacts 1823. The opening of the contacts 1823 interrupts the above described operating circuit for the first link relay 1250 in the link lockout and allotter circuit 280, but this relay remains operated over the holding circuit provided at the closed contacts 1252. The closure of the contacts 1822 prepares a holding circuit for a release relay 1940 in the connector link 212.

After its slow-to-release interval, the relay 1200 releases to open the contacts 1201 and 1202 and to close the contacts 1203. The closure of the contacts 1203 completes the operating battery circuit for the plurality of link markers associated with the link lockout and allotter circuit 280 and thus places these line markers in condition for operation. The opening of the contacts 1201 removes the ground shunt around the winding of the allotter alarm relay 1220, which remains operated at this time due to its slow-to-release characteristic. However, the opening of the contacts 1201 also interrupts the operating circuit for the first link relay 1250 so that this relay releases to open the group of contacts 1251 and the contacts 1252. The opening of the contacts 1252 interrupts the holding circuit for the relay 1240 so that this relay releases to close a plurality of contacts 1241, 1243, and 1245, and to open the contacts 1242 and 1244. The opening of the contacts 1244 interrupts the operating circuit for the relay 1240 at an additional point, and the closure of the contacts 1245 prepares a circuit controlled by a reset relay 1230 for again operating the relay 1240 when all of the links controlled by the link lockout and allotter circuit 280 have been allotted. The closure of the contacts 1243 prepares an operating circuit for the reset relay 1230, and the opening of the contacts 1242 opens an additional point in the operating circuit for the first link relay 1250 and also interrupts the holding circuit for the allotter alarm relay 1220 which, in being slow-to-release, does not release at this time. The closure of the contacts 1241 completes a holding circuit for the allotter alarm relay 1220 extending through the closed contacts 1241, a pair of normally closed contacts 1301 controlled by a normally operated relay 1300, and the operating winding of a second link relay 1310 to battery. The closure of the contacts 1241 also prepares a circuit for operating the second link relay 1310 from direct ground when the link lockout and allotter circuit 280 is next operated in the manner described above.

Referring back to the operation of the relay 1820, the closure of the contacts 1824 extends ground to the supervisory circuit 250 (Fig. 8) so that a control circuit therein energizes the motors in all of the printers or recorders, such as the recorders 270 and 272, to place these recorders in an operative condition. When all of the recorders have been placed in operation, the supervisory circuit 250 applies ground to a conductor 2831, and this ground is extended through a plurality of normally closed contacts 1706, 1931, and 1921 to a pair of normally open contacts 1811. This partially prepared circuit is utilized to initiate operation of the connector link 212 under the control of the marker control circuit 230 to seize the common register decoder 240 when connections are to be established through the line connectors 218 and 219 in the outgoing link 210 to a pair of printers or recorders.

Following the seizure of the outgoing link 210 including the connector link 212, the transmitting commutator 214, the train storage recorder circuit 216, and the line connectors 218 and 219, the transmitter 138 is placed in operation to transmit the items of information stored on the magnetic tape 137 as soon as a sufficient loop of information bearing tape is provided between the recorder 136 and the transmitter 138. This loose or tight tape condition is detected by the contacts 951 and 952 controlled by the loop sensing arrangement illustrated in Figs. 32 and 34. So long as a tight tape condition exists between the plurality of recording heads 921–925 and the plurality of transmitting heads 931–935, the tight tape contacts 951 remain closed, and a data transmitting operation cannot be initiated.

However, when a supply loop of film 137 having data stored thereon is provided between the recorder 136 and the transmitter 138, the contacts 951 are opened and the contacts 952 are closed to complete a direct operating circuit for a start relay 1500 in the transmitting commutator 214 (Figs. 15 and 16), thereby to initiate operation of the transmitter 138. This circuit extends from ground through a plurality of closed contacts 1143, 952, 1145, 1007, 1723, 1733, and 1831 to the operating winding of the relay 1500. The operation of the start relay 1500 closes a plurality of contacts 1501 and 1502. The closure of the contacts 1501 connects B+ potential across a voltage divider connected to the control electrode of a start pulse tube 1510 in a counting chain including a plurality of other gaseous discharge tubes 1511, 1512, 1513, 1514, and 1515, representing the five bits of the Baudot code, and a stop tube 1516. These tubes are connected to form a seven element counting chain of the same general type as that provided by the tubes 860, 870, 871, 872, and 873 in the receiving commutator 134. The control electrodes of these tubes are capacitively coupled in common to the output of a pulse clipping circuit 1410 which is identical with the similarly designated circuit in the receiving commutator 134. The circuit 1410 is supplied with pulses from a continuously operative multivibrator 1400. Accordingly, following the closure of the contacts 1501 to provide an enabling bias for the tube 1510, the first pulse supplied by the pulse clipping circuit 1410 and the multivibrator 1400 is coupled through a condenser 1506 to fire the tube 1510. Firing this tube provides a potential drop in its cathode circuit to supply an enabling bias for the second tube 1511 in the counting chain. In a similar manner, the pulses applied by the multivibrator 1400 to the counting chain including the tubes 1510–1516 sequentially renders each of these tubes conductive.

Since the data stored on the magnetic film 137 is spaced from the reproducing heads 931–935, the magnetic film 137 must be advanced before combinational code data can be transmitted to the transmitting commutator 214. Accordingly, a transistorized drive circuit for the motor magnet 910 in the transmitter 138 is provided controlled by the stop tube 1516 in the transmitting commutator 214. More specifically, the base electrode of a transistor 1620 is normally connected to negative battery through a portion of the cathode resistance of the stop tube 1516 to maintain the base electrode negative with respect to the grounded emitter of the transistor 1620, thereby holding this transistor in a conductive condition. However, when the tube 1516 is fired under the control of the multivibrator 1400 and the preceding tube 1515 in the counting chain, a positive voltage drop is produced across the cathode resistance of the tube 1516 to render the base electrode of the transistor 1620 positive with respect to its emitter so that this transistor is cut off. The termination of collector current flow in the transistor 1620 through a ballast lamp 1622 applies a more negative bias to the base electrode of a transistor 1621, the emitter electrode of which is supplied with a fixed negative bias. The magnitude of the negative potential supplied to the base electrode of the transistor 1621 is greater than that applied to the emitter electrode so that the transistor 1621 now conducts to provide a current flow through the operating winding of the motor magnet 910 over a circuit including the closed contacts 1008. The energization of the motor magnet 910 opens the interrupter contacts 911 so that B+ is removed from the counting tubes 1510–1516, thereby extinguishing these tubes. Extinguishing the tube 1516 returns the base electrode of the transistor 1620 to a negative potential so that the transistor 1620 begins to conduct and conduction in the transistor 1621 is cut off to release the motor magnet 910. The release of the motor magnet 910 closes the contacts 911 to again apply B+ potential to the gaseous discharge tubes in the transmitting commutator 214 and also releases the step drive mechanism so that the magnetic tape 137 is advanced a single step relative to the reproducing heads 931–935.

This intermittent operation continues until such time as the first item of information recorded on the magnetic film 137 has been advanced to a position adjacent the transducing heads 931–935. The counting chain then advances through another cycle of operation in which the motor magnet 910 is momentarily energized and released to sweep the first recorded code combination past the transducing heads 931–935 so that the amplifier 920 selectively transmits positive impulses over the circuits including the contacts 1001–1005 and the cable 1030 to the transmitting commutator 214 in accordance with those of the five channels on the magnetic film 137 in which mark pulse information has been recorded. This information is stored in five binary tube pairs in the transmitting commutator 214.

More specifically, the transducing heads 931–935 control the storage of information in a plurality of binary pairs including gaseous discharge devices 1520 and 1525, 1530 and 1535, 1540 and 1545, 1630 and 1635, and 1640 and 1645, respectively. The storage in these binary pairs is such that the space tubes 1525, 1535, 1545, 1635, and 1645 are normally in a conductive condition representing a space signal, and the associated mark tubes 1520, 1530, 1540, 1630, and 1640 are selectively fired in response to sensing recorded pulses in the related channels on the magnetic tape 137 representing mark signals. As an example, assuming that a mark pulse is sensed by the transducing head 931, a positive pulse in coupled through a condenser 1521 to the control electrode of the mark tube 1520, which control electrode is provided with an enabling bias by a voltage divider connected between B+ and ground. The application of a positive pulse through the coupling condenser 1521 fires the tube 1520 so that a positive voltage drop is produced across a cathode resistor 1522. This positive voltage drop, together with the positive potential across a normally charged condenser 1523, elevates the cathode potential of the space tube 1525 so that conduction in the normally conductive space tube 1525 no longer can be maintained, and, accordingly, the tube 1525 is extinguished. When the tube 1525 is extinguished, the condenser 1523 charges to a voltage equal to the drop across the cathode resistor 1522 in the cathode circuit of the mark tube 1520. In a similar manner, and simultaneously with the operation of the first binary pair controlled by the transducing head 931, the remaining binary pair are selectively transferred to marking conditions if pulses are sensed by the heads 932–935 on the remaining related channels of the magnetic film 137.

At the end of each cycle of operation of the counting chain, all of the binary pairs are restored to a spacing condition under the control of the stop tube 1516. Firing the tube 1516 couples a positive pulse through a condenser 1641 to a plurality of blocking diodes associated with the control electrodes of the space tubes 1525, 1535, 1545, 1635, and 1645. These diodes are similar to a neon lamp 1646 associated with the control electrode of the space tube 1645. One side of all of the neon lamps is connected to ground through a resistor similar to a resistor 1647, and the other side of all of the neon lamps is connected to a positive potential provided by a voltage divider including a pair of resistances 1642 and 1643 connected between B+ and ground. Accordingly, when a positive pulse is coupled through the condenser 1641, all of the neon lamps break down and conduct the pulse through a plurality of coupling condensers, similar to a coupling condenser 1648, connected to the control electrodes of the space tubes. Since the control electrodes of all of the space tubes are provided with a fixed enabling bias from related voltage dividers, these pulses render all of the space tubes 1525, 1535, 1545, 1635, and 1645 conductive. Rendering these tubes conductive provides positive potential drops across their cathode resistors which, together wtih the voltages across the cathode coupling condensers connected to conductive mark tubes, is sufficient to elevate the cathode potentials of the conductive ones of the mark tubes 1520, 1530, 1540, 1630, and 1640 to a point at which conduction no longer can be sustained. Accordingly, all of the conductive mark tubes in the transmitting commutator 214 are extinguished in response to firing the stop tube 1516 in the counting chain.

As set forth above, the first item of information recorded on the magnetic film 137 by the recorder 136 is a letter shift code comprising mark pulses in all of the five channels of the magnetic tape (Fig. 31). Accordingly, following the cycle of operation of the counting chain in which the motor magnet 910 is operated and released to sweep this code combination past the transducing heads 931–935, positive pulses are transmitted through the amplifier 920 and over the cable 1030 to the control electrodes of all of the mark tubes 1520, 1530, 1540, 1630, and 1640, thereby rendering all of these tubes conductive and extinguishing all of the space tubes 1525, 1535, 1545, 1635, and 1645. Since, as indicated above, a number of figure shift character code combinations such as figure shift "F," figure shift "G," and figure shift "H" are used for control functions, the transmitting commutator 214 includes a decoding circuit arrangement for causing the storage of either a letter shift or a figure shift condition therein. This decoding circuit arrangement is of the general type shown and described in the copending application of Frank A. Morris, Serial No. 546,947 filed November 15, 1955 and in the copending application of Charles R. Fisher, Jr., Serial No. 546,957 filed November 15, 1955, both of which copending applications are assigned to the same assignee as the present application. In general, the decoding circuit comprises series circuits of blocking diodes, such as neon lamps, connected between pulse sources and control tubes for permitting the pulse sources to operate a selected one of the control tubes only when a selected code combination is stored in the binary pairs. To accomplish this, the blocking diodes in each series circuit are selectively connected to the cathode circits of each of the binary pairs to receive forward or backward biasing potentials in accordance with the storage of a space or a mark condition in the related binary pairs.

To decode or recognize the letter shift code now stored in the binary pairs, when the start tube 1510 in the counting chain is next fired, in addition to providing an enabling bias for the counting tube 1511, a positive pulse is coupled over a condenser 1676 to the control electrode of a gaseous discharge prime tube 1675, the control electrode of which is provided with a fixed enabling bias by a voltage divider. Firing the tube 1675 produces a negative going pulse at the anode thereof which is coupled through a condenser 1679 to the anode of a normally conductive tube 1680, thereby extinguishing this tube. A positive potential drop is produced across a cathode resistor 1678 by firing the prime tube 1675, and this positive potential is supplied to a terminal 1677 which is connected to a plurality of terminals 1651, 1661, 1666, and 1671 to provide an enabling bias for a plurality of tubes 1650, 1655, 1660, 1665, and 1670.

The sequential operation of the counting chain including the tubes 1511, 1512, 1513, 1514, and 1515 continues, as described above, until the tube 1515 is is rendered conductive to produce a positive voltage drop across its cathode resistor which is coupled through a condenser 1551 to the control electrode of a letter shift drive tube 1550, the control electrode of which is provided with a fixed enabling bias by a voltage divider. This pulse renders the tube 1550 conductive so that the positive voltage pulse appearing across its cathode resistor 1552 is coupled through a condenser 1553 to a blocking diode 1554 comprising a neon lamp. The right hand terminal of the lamp 1554, as shown in Fig. 15, is connected to ground through a resistor 1556 and a portion of the cathode resistance of the nonconductive space tube 1525. The terminal of the neon lamp 1554 which is connected to the condenser 1553 is supplied with a positive potential from the cathode resistor 1522 of the conductive mark tube 1520 through a resistor 1555. The potential applied across the lamp 1554 due to the conductive condition of the mark tube 1520 is slightly below its ionizing potential so that the positive pulse supplied through the condenser 1533 ionizes the neon lamp 1554 to couple the positive pulse to a condenser 1557.

In a similar manner, due to the conductive condition of the mark tubes 1530, 1540, 1630, and 1640, a plurality of other blocking diodes, similar to the neon lamp 1554, are sequentially rendered conductive to transmit the positive pulse provided by firing the letter shift prime tube 1550 to the control electrode of the letter shift tube 1650, the control electrode of which is provided with an enabling bias from the terminal 1677 due to the conductive condition of the prime tube 1675. This pulse renders the tube 1650 conductive to provide a voltage drop across its cathode resistor 1652 which, when added to the voltage on a cathode coupling condenser 1653, is sufficient to extinguish the figure shift tube 1655. Accordingly, the transmission of the letter shift code to the transmitting commutator 214 causes the firing of the letter shift tube 1650 to store this information in the transmitting commutator 214.

Referring back to the firing of the tube 1515, which tube represents the last information bit in the transmitted combinational code, the firing of this tube also couples a positive pulse through a condenser 1681 to the control electrode of the tube 1680, the control electrode of which is provided with a fixed enabling bias by a voltage divider. This pulse fires the tube 1680 to produce a negative voltage swing which is coupled through the condenser 1679 to extinguish the prime tube 1675, thereby removing the positive enabling bias from the terminal 1677 and, accordingly, from the control electrodes connected thereto. However, this does not change the conductive condition of the discharge device 1650.

The firing of the tube 1515 also provides an enabling bias for the stop tube 1516 so that this tube is fired in response to the transmission of the next pulse from the multivibrator 1400. Firing the stop tube 1516 operates the motor magnet 910 in the transmitter 138 to open the contacts 911 so that the tubes 1510–1516 are again extinguished and so that the drive tube 1550 is also extinguished. Firing the tube 1516 also resets the binary pairs to space conditions. Extinguishing the tube 1516 again releases the motor magnet 910 so that the second code combination stored on the magnetic film 137 is moved past the transducing heads 931–935 to transmit mark pulses representing a figure shift code combination (Fig. 31) to the control electrodes of only the tubes 1520, 1530, 1630, and 1640 so as to render these tubes conductive and to extinguish the tubes 1525, 1535, 1635, and 1645. Accordingly, at this time, the tubes 1520, 1530, 1545, 1630, and 1640 are in a conductive condition representing the figure shift code combination.

When the next cycle of operation of the counting chain in the transmitting commutator 214 is initiated following the storage of the figure shift code in the binary pairs, the prime tube 1675 is again rendered conductive to provide an enabling potential for the control electrodes of the tubes 1650 and 1655, among others, and the tube 1680 is again extinguished. When the last code bit tube 1515 is again rendered conductive, a pulse is once again transmitted over the coupling condenser 1551 to fire the tube 1550. The positive potential produced across the cathode resistor 1552 is simultaneously transmitted to the coupling condenser 1553 and also to a coupling condenser 1559. However, the pulse transmitted to the condenser 1553 is blocked at a neon lamp 1546 associated with the third binary pair including the tubes 1540 and 1545 inasmuch as the right hand terminal of the neon lamp 1546 is connected to a positive potential on the cathode resistor of the conductive space tube 1545. Thus when the pulse transmitted through the condenser 1553 and the preceding neon lamps is applied to the neon lamp 1546, both electrodes of this lamp are at a positive potential and the tube 1546 does not break down to transmit the pulse to the control electrode of the tube 1650.

However, the positive pulse supplied through the coupling condenser 1559 is transmitted through a series of neon lamps, including a lamp 1548, to the control electrode of the figure shift tube 1655. The neon tube 1548, which is associated with the third binary pair including the tubes 1540 and 1545, has its right hand electrode connected to ground through the cathode resistance of the extinguished mark tube 1540 and its left hand electrode connected to a positive potential on the cathode resistor of the conductive space tube 1545. This biasing arrangement for the lamp 1548, as contrasted with that provided for the lamp 1546, permits it to ionize and pass the pulse from the condenser 1559 through the remaining neon lamps to the control electrode of the figure shift tube 1655, thereby rendering this tube conductive. The flow of current through a cathode resistor 1656 associated with the figure shift tube 1655 produces a positive potential which, when added to the positive potential across the cathode coupling condenser 1653, is sufficient to elevate the potential of the cathode of the letter shift tube 1650 to a point that this tube is extinguished. In addition, rendering the tube 1655 conductive provides a positive potential which is supplied through a series resistor 1561 to a blocking diode or neon lamp 1562 associated with the control electrode of a figure shift drive tube 1560, thereby providing an enabling potential for this tube.

The firing of the tube 1515 also extinguishes the prime tube 1675 to remove the switched bias from the tubes 1650, 1655, 1660, 1665, and 1670, fires the tube 1680, and resets the binary pairs to space conditions, as described above. The completion of this cycle of operation of the counting chain also momentarily operates the motor magnet 910 in the transmittter 138 to extinguish the tubes in the counting chain and the drive tube 1550 and to advance the magnetic film 137 a single step during which the third code combination recorded on the film 137 is swept past the transducing heads 931–935 to transmit a code combination representing the character "F" to the binary pairs. The sensing of the character "F" (Fig. 31) transmits positive pulses to the control electrodes of the mark tubes 1520, 1540, and 1630 so that these tubes are rendered conductive and the corresponding space tubes 1525, 1545, and 1635 are extinguished. Accordingly, the tubes 1520, 1535, 1540, 1630, and 1645 are in a conductive condition at this time.

The transmission of the character "F" following the transmission of a figure shift code is utilized by the outgoing link 210 to control the operation of the train information recorder circuit 216 so that the common train message is stored in the recorder 3500. Therefore, when the counting chain initiates the cycle of operation immediately following the above storage of the character "F" in the binary pairs, the prime tube 1675 is again rendered conductive to provide a switched bias at the terminals 1651, 1661, 1666, and 1671. When the tube 1515 is fired in this cycle of operation of the counting chain, a positive pulse is again coupled through the condenser 1551 to the control electrode of the letter shift drive tube 1550, thereby rendering this tube conductive to transmit a positive pulse to the condensers 1553 and 1559. However, these pulses produce no useful function inasmuch as the neon lamp gating circuits associated with these paths are not conditioned to transmit a pulse to the control electrodes of either of the tubes 1650 or 1655 inasmuch as neither a figure shift code nor a letter shift code has been stored in the binary pairs.

The firing of the tube 1515 also transmits a positive pulse through a coupling condenser 1563 to the neon tube 1562. As set forth above, the right hand electrode of this blocking diode is connected to a positive potential through the resistor 1561 and, accordingly, the pulse supplied to the condenser 1563 is coupled through the diode 1562 and a coupling condenser 1564 to the control electrode of the figure shift drive tube 1560, the control electrode of which is provided with a fixed bias by a voltage divider. Firing the tube 1560 produces a positive potential across a cathode resistor 1565 which is coupled through a condenser 1566 to a series circuit of neon lamps which are selectively strapped to the cathode resistors of the tubes in the binary pairs in accordance with the mark and space conditions forming the "F" code. Therefore, a pulse is transmitted through this circuit only when the tubes 1520, 1535, 1540, 1630, and 1645 are in a conductive condition to represent the combinational code for the character "F." This pulse is applied to the control electrode of a figure shift "F" control tube 1660, the control electrode of which is supplied with an enabling bias by the prime tube 1675 so as to fire the tube 1660. Rendering this tube conductive completes an operating circuit for a relay 1720 which extends from B+ potential to ground through a normally closed pair of contacts 1714 and the winding of the relay 1720. The operation of the relay 1720 indicates that a figure shift "F" code combination has been received by the transmitting commutator 214.

The counting chain in the transmitting commutator 214 thereupon completes its cycle of operation incident to which all of the space tubes in the binary pairs are placed in a conductive condition, the mark tubes in the binary pairs are extinguished, the prime tube 1675 is extinguished, and the motor magnet 910 in the transmitter 138 is momentarily rendered conductive so that the tubes 1550, 1560, and 1510–1516 are extinguished and the next code combination recorded on the magnetic tape 137, which comprises the first character in the common or repetitive message, is swept past the transducing heads 931–935 to be stored in the binary pairs in the transmitting commutator 214, as described above.

The operation of the relay 1720 closes a plurality of contacts 1721 and 1722 and opens the contacts 1723. Opening the contacts 1723 interrupts the above described operating circuit for the start relay 1500 so that this relay releases to open the contacts 1501 and 1502. Opening the contacts 1501 removes the enabling bias from the control electrode of the start tube 1510 in the counting chain in the transmitting commutator 214 sa that continued operation of the counting chain is arrested.

The closure of the contacts 1722 completes an operating circuit for a relay 1740 extending through a pair of normally closed contacts 1731 so that this relay operates to close a plurality of contacts 1741, 1743, 1745, 1746, 1747, 1748, 1749, and **1741*a*. The contacts 1747 are of a preliminary make type and close to complete a holding circuit for the relay 1740 extending to ground at the closed contacts 1722. The contacts 1741 are also of a preliminary make type and close to provide a shunt across the input terminals to a train information amplifier 1756, thereby to render this amplifier nonresponsive to applied signals. The closure of the contacts 1743 and 1748 connects a negative potential to one side of the winding of the transducing head 1755 in the train information recorder 3500, and the closure of the contacts 1745 and 1746 connects resistance negative battery both to the other side of the winding of the transducing head 1755 and to the output of a transistorized flip-flop circuit controlled by the transmitting commutator 214. These switching operations condition the transducing head 1755 for receiving the common or repetitive message comprising the train information from the transmitting commutator 214 for storage on the loop of magnetic tape 3502 in the train information recorder 3500**.

Referring back to the operation of the relay 1720, the closure of the contacts 1721 completes an operating circuit for a relay 1700 extending to ground through the closed contacts 1721 and a pair of mutually closed contacts 1713. The operation of the relay 1700 closes a plurality of contacts 1702, 1704, and 1705 and opens a plurality of contacts 1701, 1703, and 1706. The closure of the contacts 1704 completes a holding circuit for the relay 1700 extending to ground through the normally closed contacts 1713, the contacts **1741*a*, which are closed in response to the operation of the relay 1740, also providing a holding circuit for the relay 1700. The opening of the contacts 1703 removes a shunt around the input leads to the train information amplifier 1756, but a shunt therefor is provided at the closed contacts 1741. The closure of the contacts 1705 prepares an operating circuit for a relay 1710 and an energizing circuit for a tape contact gaseous discharge tube 1754. The opening of the contacts 1706 interrupts the above described circuit for forwarding ground to the open contacts 1811, thereby to insure that no attempt is made to associate the connector link 212 with the register decoder 240 during the time that the common message is stored in the recorder 3500. The closure of the contacts 1702 energizes the continuous drive motor 1750 (Figs. 17 and 35) for the train information recorder 3500 so that the magnetic tape 3502 therein is continuously advanced at a suitable speed for transducing operations. The train information recorder 3500 is now conditioned to receive the items of information stored on the magnetic film 137** which pertain to the common or repetitive message.

To again initiate operation of the transmitting commutator 214 to transmit mark and space pulse information from the transmitter 138 to the magnetic tape 3502 in the train storage information recorder 3500, the closure of the contacts 1749, when the relay 1740 is operated as described above, completes a time delayed operating circuit for the start relay 1500. This circuit extends from ground at a pair of normally closed contacts 1943 to a common main ground terminal and thence through a plurality of closed contacts 1812, 1821, 1734, and 1749 and a thermistor 1503 to the operating winding of the start relay 1500. The thermistor 1503 provides a suitable time delay for insuring that the magnetic tape 3502 in the train recorder 3500 is moving at a suitable speed for transducing operations and that the remainder of the switching operations described above in the train information recorder circuit 216 have been completed. When the start relay 1500 operates, the contacts 1501 and 1502 are again closed. The closure of the contacts 1502 provides a shunt around the thermistor 1503, and the closure of the contacts 1501 again provides an enabling bias for the start tube 1510 in the counting chain in the transmitting commutator 214.

When the next pulse is supplied through the pulse clipping circuit 1410 from the multivibrator 1400 to the control electrode of the start tube 1510, this tube is rendered conductive to perform the functions described above. In addition, however, the firing of the start tube 1510 transmits a space pulse to a flip-flop circuit in the train information recorder circuit 216. When the tube 1510 is fired, a positive pulse is coupled through a condenser 1507 to a blocking diode comprising a neon lamp 1505. The terminal of the diode 1505 which is connected to the condenser 1507 is provided with a positive potential close to its ionizing potential by a voltage divider and the other terminal is connected to ground through a resistor 1574 so that the lamp 1505 is ionized by the pulse supplied by the condenser 1507 to transmit it over a space signal conductor to a condenser 1771 connected to the base electrode of a transistor 1770. This positive pulse is also applied to a blocking diode 1763, but the other electrode of the neon tube forming this diode is connected to a positive potential provided by a voltage divider so that this lamp does not break down to transmit the pulse. The application of a positive pulse to the transistor 1770 operates the flip-flop circuit in the train information recorder circuit 216 to record a space pulse on the magnetic tape 3502 in the train information recorder 3500 representing a start signal.

When the next tube 1511 in the counting chain is rendered conductive to provide an enabling bias for the tube 1512, as described above, a space pulse or a mark pulse is transmitted to the flip-flop circuit in the train information recorder circuit 216 in accordance with the marking or spacing condition stored in the first binary pair comprising the tubes 1520 and 1525. When the tube 1511 fires, a positive pulse is coupled to both of a pair of condensers 1572 and 1573. Assuming that the mark tube 1520 in the first binary pair is now conducting, a positive potential is supplied to one terminal of a blocking neon lamp or tube 1570 through a resistor 1576, and the other terminal of this neon lamp is connected to ground through a resistor 1575. Accordingly, the application of a pulse to the condenser 1572 causes the neon lamp 1570 to pass this positive pulse so that it is transmitted through a coupling condenser 1761 to the base electrode of a transistor 1760 comprising the other of the pair of transistors forming the flip-flop circuit in the train information recorder circuit 216. This pulse is also supplied to one electrode of a blocking diode comprising a neon tube 1762, but the other electrode of this neon tube is connected to a positive potential supplied by a voltage divider so that this pulse is not transmitted through the blocking diode 1762. Since the space tube 1525 in the first binary pair is extinguished due to the conductive condition of the mark tube 1520, both sides of a blocking diode comprising a neon tube 1571 are connected to ground, one side through the cathode resistor of the tube 1525 and the other side through the resistor 1574. Accordingly, the pulse transmitted through the coupling condenser 1573 is not further transmitted to the input of the transistor 1770 in the train information recorder circuit 216. In a similar manner, the firing of each of the tubes 1512, 1513, 1514, and 1515 selectively couples a positive pulse either to the base electrode of the transistor 1760 or to the base electrode of the transistor 1770 through one of a pair of neon tube gates in accordance with the mark or space condition stored in the associated binary pair.

Following the firing of the tube 1515, the tube 1516 is fired to transmit a stop pulse to the transistor 1760 through a condenser 1623 and a neon lamp 1624 having a fixed bias. The firing of the tube 1516 again momentarily energizes the motor magnet 910 in the transmitter 138 so that the items of information stored on the magnetic film 137 which comprise the common or repetitive message are sequentially transmitted to the train information recorder circuit 216 for storage on the magnetic tape 3502 in the train information recorder 3500.

Referring now to the operation of the flip-flop circuit in the train information recorder circuit 216, this circuit selectively energizes the transducing head 1755 in the train information recorder 3500 under the control of mark and space pulses received from the transmitting commutator 214 so that a bipolar type of magnetic record is provided on the endless loop of magnetic tape 3502. More specifically, and as described above, when the start tube 1510 is rendered conductive, a positive pulse representing a spacing condition is supplied to the input of the flip-flop circuit. This pulse is transmitted through a coupling condenser 1771 to the base electrode of the transistor 1770. Assuming that the transistor 1770 is in a conductive condition at this time, the positive pulse supplied to the coupling condenser 1771 places the base electrode of the transistor 1770 at a positive potential with respect to its emitter electrode so that conduction in the transistor 1770 is cut off. The interruption of current flow in the collector circuit of the transistor 1770 reduces the potential drop across a resistor 1766 in a voltage divider also including a pair of resistances 1764 and 1765 so that a more negative potential is applied to the base electrode of the transistor 1760, thereby rendering this transistor conductive. The flow of collector current in the transistor 1760 produces a positive potential drop across a resistor 1772, forming a portion of a voltage divider also including a pair of resistances 1773 and 1774, to maintain a more positive potential on the base electrode of the transistor 1770, thereby to hold this transistor in a nonconductive condition following the dissipation of the triggering impulse supplied to the condenser 1771.

The termination of conduction in the transistor 1770 reduces the potential drop across an emitter resistor 1775 so that the potential supplied to the emitter electrode of a buffer transistor 1780 becomes more positive. Further, when the transistor 1760 is rendered conductive, the flow of emitter current in the transistor 1760 causes the base electrode of the buffer transistor 1780 to go negative with respect to the emitter thereof so that the emitter electrode of the buffer transistor 1780 conducts to carry the combined collector and base currents of the transistor 1760 as well as the collector current of the transistor 1780. This current flow provides a negative drop across the resistor 1775 to aid in maintaining the transistor 1770 in a cutoff condition.

The flow of current through a collector resistor 1781 of the now conducting buffer transistor 1780 provides a more positive potential on the base electrode of output drive transistor 1790 so that this transistor is cut off, the emitter electrode thereof being provided with a small fixed negative bias by a voltage divider including a pair of resistances 1791 and 1792 connected between negative battery and ground. When the drive transistor 1790 is rendered nonconductive, current flows through the winding of the transducing head 1755 in a first direction representing the recording of a space pulse on the loop of magnetic tape 3502.

More specifically, one side of the winding of the head 1755 is connected to negative battery through the closed contacts 1745 and a series resistor 1794. The other side of the winding of the transducing head 1755 is connected by the closed contacts 1743 to negative battery through a resistor 1796 and to ground through a resistor 1795 and the closed contacts 1748. Accordingly, electron current flows from negative battery through the resistor 1794, the closed contacts 1745, the winding of the head 1755, the closed contacts 1743, the resistor 1795, and thence to ground through the closed contacts 1748 to saturate the magnetic tape 3502 in a first polar direction representing a spacing condition. This spacing condition continues until such time as a mark pulse is supplied from the transmitting commutator 214 to a flip-flop circuit in the train information recorder circuit 216.

Assuming that a mark pulse is transmitted through the coupling condenser 1761 to the base electrode of the transistor 1760, this positive going pulse cuts off the transistor 1760 so that the voltage drop across the resistor 1772 is terminated, thereby providing a sufficient negative bias on the base electrode of the transistor 1770 to place this transistor in a conductive state. The collector current flow through the now conductive transistor 1770 provides a positive drop across the resistor 1766 so that the transistor 1760 is maintained in a cutoff condition. The flow of the emitter current in the transistor 1770 provides a negative potential across the emitter resistor 1775 which is supplied to the emitter electrode of the buffer transistor 1780. The application of a negative potential to this emitter electrode together with the termination of the conductive condition in the transistor 1760, which causes the base electrode of the transistor 1780 to go to substantially ground potential, cuts off the transistor 1780 so that the termination of collector current flow in the transistor 1780 provides a more negative potential at the base electrode of the output drive transistor 1790. The application of a more negative potential to this base electrode places the transistor 1790 in a conductive condition so that a voltage drop is produced across the resistor 1794 and a resistor 1793, which are connected in series with the collector electrode of the transistor 1790.

The values of the resistances 1793 and 1794 are such that, when the transistor 1790 is conducting, the voltage at their junction is more positive than the voltage applied to the other side of the winding of the head 1755. Therefore, electron current now flows from negative battery through the resistor 1796, the closed contacts 1743, the winding of the transducing head 1755, the contacts 1745 and 1746 and thence to ground through the resistors 1793 and 1792 and the collector and emitter electrodes of the transistor 1790. It will be noted that this direction of electron current flow is the opposite to that which is provided when the transistor 1790 is cut off, and, accordingly, the magnetic tape 3502 in the trunk recorder 3500 is saturated in an opposite polar direction in response to the receipt of a mark pulse by the flip-flop circuit in the train information recorder circuit 216. The transistors 1760 and 1770 provide a flip-flop circuit having two stable conditions in which the conductive condition in the circuit is varied only in response to the application of a triggering pulse. Accordingly, the transducing head 1755 remains energized in the above described manner until such time as a space pulse is transmitted to the coupling condenser 1771 to again shift the conductive condition of this circuit. It should be noted that inasmuch as the recording on the magnetic tape 3502 is provided in a bipolar manner, there is no need to provide erasing facilities inasmuch as the tape 3502 is saturated in either of two polar directions in accordance with the direction of current flow through the head 1755 during the data recording operations.

The flip-flop circuit in the train information recorder circuit 216 is operated, as described above, under the control of the transmitting commutator 214 to record all of the items of information forming the common message or train report on the magnetic tape 3502 in the recorder 3500. This data is subsequently transmitted to each of the pairs of selected recorders to form a part of each of the individual wheel reports or messages.

As described above, when the common train data or repetitive message has been transmitted, the operator at the remote sending station 102 transmits a figure shift "G" code combination which is utilized to render the train recorder 3500 ineffective and to cause the association of the common register recoder circuit 240 with the connector link 212 in the seized outgoing link 210 so that the circuit 240 is conditioned to receive the following switch codes for establishing signaling paths from the transmitter 138 to a selected pair of recorders or printers. More specifically, in the cycle of operation following the storage of the figure shift code combination in the binary pairs in the transmitting commutator 214, the figure shift tube 1655 is rendered conductive, as described above, so that an enabling bias is provided on its cathode resistor 1656 for biasing the blocking diode 1562 to substantially its ionizing potential. Thereafter, the transmitting commutator 214 is cleared, and the transmitter 138 transmits a code combination representing the character "G" (Fig. 31) to the transmitting commutator 214 which is stored in the binary pairs by rendering the mark tubes 1530, 1630, and 1640 conductive, the space tubes 1525 and 1545 remaining in a conductive condition.

In the cycle of operation of the counting chain following the storage of this information in the transmitting commutator 214, when the tube 1515 is rendered conductive, a pulse is transmitted through the coupling condensers 1563 and 1564 and the blocking diode 1562 to the control electrode of the figure shift drive tube 1560, thereby rendering this tube conductive so that a positive pulse is transmitted through a condenser 1567 and a plurality of blocking diodes or neon lamps connected in series therewith to the control electrode of the figure shift "G" control tube 1665. A pulse is transmitted through only this series circuit arrangement inasmuch as the blocking diodes therein are properly biased for conduction only when the tubes 1525, 1530, 1545, 1630, and 1640 are in a conductive condition. Similarly, the positive pulse supplied to the coupling condenser 1566 from the cathode resistor 1565 of the tube 1560 is not transmitted to the control electrode of the figure shift "F" control tube 1660 inasmuch as all of the blocking diodes connected in series therewith are not properly biased for conduction.

The control tube 1665 is provided with an enabling bias at the terminal 1666 by the conductive prime tube 1675, and, accordingly, the tube 1665 is rendered conductive by the pulse from the decoding circuit to provide a flow of current from B+ potential to ground through the upper operating winding of a relay 1810 in the connector link 212 and a pair of normally closed contacts 1813. This flow of current operates the relay 1810 to close a plurality of contacts 1811 and 1814 and to open the contacts 1812 and 1813. Following the firing of the tube 1665 and the operation of the relay 1810, the counting chain in the transmitting commutator 214 completes its cycle of operation to perform the functions described above and, in momentarily operating the motor magnet 910, stores the first or tens digit of the first two digit switch code combination in the binary pairs in the transmitting commutator 214. As described above, in the illustrative first message, the first recorder or printer to be seized is designated by the characters "18," and, accordingly, the Baudot code combination for the character "1" (Fig. 31) is stored in the binary pairs of the transmitting commutator 214 by placing the tubes 1520, 1530, 1540, 1635, and 1640 in a conductive condition.

Referring to the above described operation of the relay 1810, the closure of the contacts 1814, which are of a preliminary make type, completes a holding circuit for a lower winding on the relay 1810 extending to the main ground terminal through a pair of normally closed contacts 1939. The opening of the contacts 1813 interrupts the above described operating circuit for the relay 1810 and also removes anode potential from the control tube 1665 so that this tube is extinguished. The opening of the contacts 1812 interrupts the above described operating circuit for the start relay 1500 so that this relay releases to arrest further operation of the transmitting commutator 214 under the control of the multivibrator 1400. The closure of the contacts 1814 also completes an operating circuit for a relay 1730 in the train information recorder circuit 216, this circuit extending from the main ground terminal through the closed contacts 1939 and 1814.

The operation of the relay 1730 opens the contacts 1731, 1733, and 1734 and closes a pair of contacts 1732. The closure of the contacts 1732 completes a holding circuit for a lower winding of the relay 1730 extending to the main ground terminal in the connector link 212. The opening of the contacts 1734 interrupts an additional point in the previously interrupted time delayed operating circuit for the start relay 1500, and the opening of the contacts 1733 interrupts an additional point in the direct operating circuit for the start relay 1500, which circuit was previously interrupted by the opening of the contacts 1723. The opening of the contacts 1731 interrupts the holding circuit for the relay 1740 so that this relay restores to its normal condition.

The release of the relay 1740 connects the transducing head 1755 to the input of the amplifier 1756, removes the biasing network for the output transducer 1790, and disconnects the transducing head 1755 from the output of the flip-flop circuit in the train information recorder circuit 216. The opening of the contacts 1749 interrupts an additional point in the time delayed operating circuit for the start relay 1500. The opening of the contacts **1741*a* interrupts one of the holding and operating paths for the relay 1700**.

The drive motor 1750 in the train information recorder 3500 remains energized to advance the magnetic tape 3502 towards its normal home position, as defined by the conductive element 3534 (Fig. 35) carried on the loop of magnetic tape 3502. When this magnetic tape approaches its normal home position in which the beginning of the common message is disposed adjacent the transducing head 1755, the conductive element 3534 bridges the pair of brushes 1752 and 1753 so that B+ potential is connected to the control electrode of a tape contact control gaseous discharge tube 1754, thereby rendering this tube conductive. Firing the tube 1754 represents that the magnetic tape 3502 has been returned to its normal home position or effective beginning and produces a flow of current from B+ potential through the closed contacts 1705 and the winding of a relay 1710 to operate this relay. The operation of the relay 1710 closes a plurality of contacts 1711 and 1712 and opens the contacts 1713 and 1714.

The closure of the contacts 1712, which are of a preliminary make type, connects a shunt across the input to the amplifier 1756, thereby preventing inadvertent operation of the amplifier 1756 by transient signals produced by the switching operations. The opening of the contacts 1714 interrupts the above described operating circuit for the relay 1720 so that this relay is released and the figure shift "F" control tube 1660 is extinguished. Releasing the relay 1720 returns the contacts controlled thereby to their normal position. The opening of the contacts 1713 interrupts the holding circuit for the relay 1700 so that this relay restores the contacts controlled thereby to their normal position. The opening of the contacts 1702 terminates the normal energization of the motor 1750 to prevent further movement of the magnetic tape. The closure of the contacts 1701 completes a circuit extending to negative battery through a ballast lamp 1751 and the closed contacts 1711 for providing a momentarily effective source of energization for braking the motor 1750, thereby to prevent overrun of the magnetic tape 3502. The closure of the contacts 1703 provides another shunt across the input leads to the amplifier 1756, and the opening of the contacts 1705 releases the relay 1710 and extinguishes the tube 1754.

At the completion of the storage of the repetitive message or the common train data in the train information recorder 3500, incident to which continuous operation of the transmitting commutator 214 and the transmitter 138 is interrupted, the connector link 212 calls in the common register decoder 240 under the control of a marker control circuit 230 (Fig. 20) so that the switch codes representing the two printers to which the first message is to be directed are transmitted from the transmitter 138 through the transmitting commutator 214 to the register decoder 240. More specifically, the above described operation of the relay 1810 to close the contacts 1811 and the release of the relay 1700 to close the contacts 1706 completes an operating circuit for a lockout relay 1900 in the connector link 212. This circuit extends from negative battery through a resistor 1998, a pair of normally closed contacts 1902, a plurality of normally closed contacts similar to the contacts 1902 in other connector links, a plurality of closed contacts 2013 and 1904, the winding of the relay 1900, the closed contacts 1811, 1921, 1931, and 1706 and to ground in the supervisory circuit 250. The operation of the relay 1900 closes a plurality of contacts 1901, 1903, and 1905 and opens the contacts 1902 and 1904.

The closure of the contacts 1903 and the opening of the contacts 1904, which form a make-before-break contact arrangement, transfer the energizing circuit for the relay 1900 from the above described operating circuit to a direct holding circuit extending to negative battery through the resistance 1998. The opening of the contacts 1902 opens the common battery circuit to prevent other connector links from attempting to seize the register decoder 240 during the association thereof with the connector link 212, the opening of the contacts 1902 further interrupting a normally completed operating circuit for an alarm relay 2020 in the marker control circuit 230. This relay, however, is slow-to-release and does not release at this time. The closure of the contacts 1901 prepares an operating circuit for a relay 1800.

The closure of the contacts 1905 completes an obvious operating circuit for a slow-to-release guard relay 2010 in the marker control circuit 230. The operation of the relay 2010 closes a plurality of contacts 2011, 2012, and 2014 and opens the contacts 2013. The closure of the contacts 2014 provides a source of ground which is subsequently extended through the register decoder 240 to selectively operate switching relays in the line connectors 218 and 219. The closure of the contacts 2011 illuminates a lamp 2015 to indicate the operation of the marker control circuit 230. The closure of the contacts 2012 completes the prepared operating circuit for the relay 1800 so that this relay operates to close a group of contacts 1801, a group of contacts 1802, and a plurality of other contacts 1803–1809 and **1801*a*–1806*a*. The operation of the relay 1800 interconnects the connector link 212 with the register decoder 240**.

More specifically, the closure of the group of contacts 1801 connects a pair of cables 2370 and 2260 connected to the output of one half of the register decoder 240 to a cable 1899 which is connected to the input of the line connector 218. Similarly, the closure of the group of contacts 1802 interconnects a pair of cables 2470 and 2570 connected to the output of the second half of the register decoder 240 with the input of the line connector 219 through a cable 1898. The closure of the contacts 1806 and 1807 prepares an operating circuit for a second busy relay 1910 in the connector link 212, and the closure of the contacts 1808 prepares an operating circuit for a switch relay 1930 in this connector link. The closure of the contacts 1803 prepares a circuit for extending start ground to the start relay 1500 in the transmitting commutator 214, which circuit is controlled by the register decoder 240.

The closure of the contacts 1804 connects a terminal 1896 to the lower operating winding of an alarm relay 1830 in the connector link 212 so that, if an alarm condition is established during the interval in which the connector link 212 is associated with the register decoder 240, the alarm relay 1830 is operated to open the contacts 1831 and to close a plurality of contacts 1832 and 1833. The closure of the contacts 1833 applies ground to a terminal 1892 which is connected to the supervisory circuit 250 to provide an indication of the alarm condition in the connector link 212. The opening of the contacts 1831 interrupts the above described circuit for applying ground to the start relay 1500 and thus prevents further operation of the transmitting commutator 214 and the transmitter 138. The closure of the contacts 1832 extends holding ground from a pair of normally closed and grounded contacts 1891 on an alarm release key to the upper winding of the relay 1830, thereby to maintain this relay operated. The ground supplied at the closed contacts 1832 is also extended to an alarm lamp 1893 to provide a visible indication in the connector link 212 of the alarm condition. The alarm relay 1830 remains operated to prevent further operation of the outgoing link 210 under the control of the associated incoming link 130 until such time as the alarm release key is manually operated to open the contacts 1891.

Referring back to the above described operation of the guard relay 2010 in the marker control circuit 230, the closure of the contacts 2014 extends ground over a conductor 2096 to the register decoder 240, thereby to condition a first register therein for receiving and storing the first switch character or code. More specifically, the ground provided on the conductor 2096 is extended through a plurality of normally closed contacts 2101, 2111, 2121, and 2131 to the operating winding of a relay 2200, thereby operating this relay to close a plurality of contacts 2201–2208. The closure of the contacts 2204–2208 interconnects the operating windings of five relays 2210, 2220, 2230, 2240, and 2250 with a contact network controlled by a plurality of relays 2145, 2155, 2165, 2175, and 2185 which are selectively sequentially operated in accordance with the code combinations received from the transmitter 138 and the transmitting commutator 214 representing the values of the switch code digits. The closure of the contacts 2203 prepares an operating circuit for the start relay 1500 in the transmitting commutator 214, and the closure of the contacts 2202 prepares an operating circuit for a second switching relay 2300. The closure of the contacts 2201 prepares a holding circuit for the relay 2200 and an operating circuit for a relay 2130. Accordingly, at this time, the first digit register including the relays 2210, 2220, 2230, 2240, and 2250 is conditioned to receive the first switch character transmitted to the register decoder 240.

Referring back to the above described operation of the relay 1800, the closure of the contacts **1801*a*–1805*a* connects the cathodes of the mark tubes 1520, 1530, 1540, 1630, and 1640 in the transmitting commutator 214 to the control electrodes of a plurality of readout tubes 2140, 2150, 2160, 2170, and 2180, respectively, in the register decoder 240. As set forth above, the first switch character "1" comprising the tens digit of the pair of digits identifying the first recorder to be seized is now stored in the binary pairs in the transmitting commutator 214 so that the mark tubes 1520, 1530, 1540, and 1640 are in a conductive condition to supply a positive enabling potential to the control electrodes of the readout tubes 2140, 2150, 2160, and 2180**. However, this positive potential is not sufficient to fire these tubes. Further, the tubes are not capable of being rendered conductive inasmuch as B+ anode potential is not supplied thereto.

The plurality of tubes 2140, 2150, 2160, 2170, and 2180 together with their associated relays 2145, 2155, 2165, 2175, and 2185 are selectively rendered responsive to operation by the transmitting commutator 214 under the control of a read relay 2100. When the relay 1800 is operated, as described above, to close the contacts **1806*a*, the operating winding of the relay 2100 is connected to the collector electrode of a normally conductive transistor 1840 so that an operating circuit for this relay is completed. However, due to its spring load, the relay 2100 does not operate immediately. The operation of the relay 1800 also closes a pair of contacts 1809 so that B+ potential is extended from the normally closed contacts 911 in the transmitter 138 through the contacts 1809 to a switching device having a single stable state which controls the conductivity of the transistor 1840. When the contacts 1809 are closed, the B+ potential produces a positive voltage drop across a resistor 1861 to provide a positive going pulse which is slightly differentiated in a network including a condenser 1862 and a resistor 1863. The differentiated pulse is then coupled through a rectifier 1864, which is biased in its reverse direction by approximately fifty volts, and a pair of condensers 1865 and 1866 to one terminal of a rectifier 1852**.

This terminal of the rectifier 1852 is normally biased in its forward direction by the negative battery supplied through a resistor 1851, which together with a pair of resistors 1853 and 1854, form a voltage dividing network for normally maintaining the base electrode of a transistor 1850 at a potential which is slightly negative with respect to its emitter electrode. Accordingly, the transistor 1850 is normally in a conductive condition in which the electron current flow out of its emitter electrode, including both base and collector current, through a resistor 1855 provides a negative potential for the base electrode of the output transistor 1840 so as to maintain this transistor in a conductive condition.

However, when the positive pulse is coupled through the condenser 1866 to the rectifier 1852, this rectifier is biased in its reverse direction so that the base electrode of the transistor 1850 immediately goes to a positive potential as determined by the values of the resistors 1853 and 1854 so as to cut off conduction in the transistor 1850. The termination of current flow in the transistor 1850 provides a negative voltage swing across a collector resistor 1856 which is coupled to the base electrode of a transistor 1860, which is normally supplied with a somewhat positive potential by a voltage divider including a pair of resistances 1868 and 1869. This negative potential renders the transistor 1860 conductive.

Rendering the transistor 1850 nonconductive removes the negative bias for the base electrode of the drive transistor 1840 so that conduction therethrough is terminated. Cutting off the transistor 1840 occurs before the read relay 2100 can operate over the above described circuit. However, after a selected time delay, the positive pulse supplied at the condenser 1862 is dissipated so that the transistor 1860 cuts off and the transistors 1850 and 1840 return to a conductive condition. Rendering the transistor 1840 conductive operates the read relay 2100 over the above described operating circuit.

The operation of the relay 2100 closes a plurality of contacts 2102, 2103, and 2104 and opens the contacts 2101. The closure of the contacts 2103 connects B+ potential to the anodes of the tubes 2140, 2150, 2160, 2170, and 2180 through the operating windings of the relays 2145, 2155, 2165, 2175, and 2185. To provide a means for selectively rendering those of the tubes 2140, 2150, 2160, 2170, and 2180 conductive which are supplied with a positive bias at their control electrodes, a plurality of condensers 2141, 2151, 2161, 2171, and 2181 are provided. These condensers are normally charged to a negative potential from negative battery through a common resistor 2142 and each of a plurality of resistors similar to a resistor 2143 individual to the tube 2140. Therefore, when the contacts 2104 are closed to ground the negative side of these condensers, a positive pulse is applied to the control electrodes of all of the tubes. However, only those tubes which have been provided with a positive enabling bias from the binary pairs in the transmitting commutator 214 are rendered conductive. Accordingly, at this time, the tubes 2140, 2150, 2160, and 2180 are fired to operate the relays 2145, 2155, 2165, and 2185 so that a plurality of contacts 2146, 2147, 2148, 2156, 2157, 2166, 2167, 2168, 2186, 2187, and 2188 are closed, among others.

The closure of the contacts 2146, 2156, 2166, and 2186, together with the prior closure of the contacts 2208, 2207, 2206, and 2204, prepares operating paths for the relays 2210, 2220, 2230, and 2250. The operations of the contacts 2147, 2187, and 2167 prepare a path for extending ground from a pair of now open contacts 2133 through the closed contacts 2102, 2147, 2176, 2186, and 2167 to the above described operating circuits for the first group of storage relays. The contact arrangement including the contacts 2147, 2167, 2176, and 2187 is utilized to distinguish between codes representing numerical characters and all other codes. Since the switch data comprises only numerical characters, ground is forwarded to the contacts 2146, 2156, 2166, and 2186, for instance, only when a numerical code combination of some type has been stored in the register decoder 240. In the event that a non-numerical code has been stored therein, the above described contact field prepares a path for extending ground to a non-numerical code conductor 2199.

Referring back to the above described operation of the read relay 2100, the opening of the contacts 2101 removes direct ground from the operating winding of the first switch relay 2200 and, accordingly, removes the ground shunt around the operating winding of the relay 2130 so that the relay 2200 is held operated in series with the winding of the relay 2130, thereby operating this relay to open the contacts 2131 and a pair of contacts 2134 and to close a plurality of contacts 2132 and 2133. The opening of the contacts 2131 interrupts, at an additional point, the operating circuit for the relay 2200, and the concurrent closure of the contacts 2132 prepares a circuit extending through the closed contacts 2202 for operating the second switching relay 2300. This circuit, however, is interrupted at the open contacts 2101. The closure of the contacts 2133 extends ground over the above described operating paths so that the relays 2210, 2220, 2230, and 2250 are operated.

The operation of these relays closes a plurality of contacts 2211, 2212, 2221, 2222, 2231, 2232, 2251, and 2252, among others. The closure of the contacts 2212, 2222, 2232, and 2252 prepares a marking path extending to a conductor 2261 representing the value of the stored tens digit, i.e. "1." The closure of the contacts 2211, 2221, 2231, and 2251 completes holding circuits for the lower windings of the operated relays extending to the main ground provided on the conductor 2096.

Referring back to the above described operation of the reading relays 2145, 2155, 2165, and 2185, the operation of these relays completes an operating circuit for the start relay 1500 in the transmitting commutator 214. This circuit extends from the ground provided on the conductor 2096 through any one of the plurality of closed contacts 2148, 2157, 2168, and 2188 and through the closed contacts 2203, 2047, 1803, and 1831 to the operating winding of the start relay 1500 so that this relay operates to close the contacts 1501. The closure of these contacts again initiates a cycle of operation of the counting chain in the transmitting commutator 214 during which mark and space pulses representing the stored numerical character "1" are transmitted to the input of the flip-flop circuit in the train information recorder circuit 216. However, the output of this circuit is not connected to any data receiving device at this time, and, accordingly, the production of mark and space pulses at this time produces no useful function.

At the end of this cycle of operation, all of the operations controlled by the firing of the tubes 1515 and 1516 take place, as described above, and included in which is the clearing of the binary pairs and their subsequent reoperation in accordance with the code representing the second switch digit "8" (Fig. 31) which places the tubes 1525, 1530, 1540, 1635, and 1645 in a conductive condition. Restoring the binary pairs to space conditions and then reoperating them to represent the second switch digit in the first recorder designation varies the enabling potentials supplied to the control electrodes of the readout tubes 2140, 2150, 2160, 2170, and 2180, but the conductive and non-conductive conditions thereof obviously are not changed by these voltage variations. Incident to advancing the magnetic film 137 to transmit the second switch digit to the binary pairs, the contacts 911 are momentarily opened to extinguish certain of the discharge devices in the commutator 214 by removing B+ potential. This momentary opening of the contacts 911 also pulses B+ potential across the resistor 1861 in the input to the time delay circuit including the transistors 1840, 1850, and 1860 so that the transistor 1840 is again cut off to release the read relay 2100.

In releasing, the relay 2100 closes the contacts 2101 and opens the contacts 2102, 2103, and 2104. Opening the contacts 2103 extinguishes the fired tubes 2140, 2150, 2160, and 2180 and releases the associated relays 2145, 2155, 2165, and 2185 so that the above described paths for operating the relays 2210, 2220, and 2250 are interrupted and the path for applying ground to the start relay 1500 is opened to prevent the counting chain in the transmitting commutator 214 from passing through an additional cycle of operation. The opening of the contacts 2104 permits the condensers 2141, 2151, 2161, 2171, and 2181 to again charge to a negative potential. The opening of the contacts 2102 interrupts, at an additional point, the operating circuit for the relays 2210, 2220, 2230, and 2250, but these relays are maintained operated over the above described holding circuits.

The closure of the contacts 2101 completes an operating circuit for the second switch relay 2300 extending from the conductor 2096 through the closed contacts 2101, 2111, 2121, 2132, and 2202. The operation of the relay 2300 closes a plurality of contacts 2301, 2302, 2303, and a group of contacts 2304. The closure of the group of contacts 2304 interconnects a plurality of register relays 2310, 2320, 2330, 2340, and 2350 with the contact field controlled by the relays 2145, 2155, 2165, 2175, and 2185. The closure of the contacts 2301 completes a holding circuit for the relay 2300 and prepares an operating circuit for a relay 2120. The closure of the contacts 2303 prepares another operating circuit for the start relay 1500 in the commutator 214, and the closure of the contacts 2302 prepares an operating circuit for a third switching relay 2460.

As described above, the second switch code digit comprising the units digit "8" of the first switch combination is stored in the binary pairs in the transmitting commutator 214 so that only the mark tubes 1530 and 1540 are conducting to provide an enabling bias at the control electrodes of the tubes 2150 and 2160. Accordingly, when the charge is dissipated on the condenser 1866, the transistors 1840 and 1850 switch to a conductive condition and the transistor 1860 switches to a nonconductive condition so that the read relay 2100 is again operated. The opening of the contacts 2101 removes the ground shunt for the operating winding of the relay 2120 so that this relay operates to close a plurality of contacts 2122 and 2124 and to open the contacts 2121 and 2123. Opening the contacts 2123 interrupts the operating and holding circuits for the relays 2130 and 2200 so that these relays release. The release of the relay 2200 disconnects the first group of register relays in the register decoder 240 from the contact field controlled by the relays 2145, 2155, 2165, 2175, and 2185 so that only the relays comprising the second digit register in the register decoder 240 are effective to receive and store the units digit "8."

The closure of the contacts 2103 again applies B+ potential to the tubes 2140, 2150, 2160, 2170, and 2180, and the closure of the contacts 2104 again pulses the control electrodes of all of these tubes so that the tubes 2150 and 2160 are rendered conductive in accordance with the code representation of the switch character "8," thereby to operate the relays 2155 and 2165. The operation of these relays closes the contacts 2157 and 2168 to again return start ground to the relay 1500 in the transmitting commutator 214 and closes the contacts 2156 and 2166, among others, so that the relays 2320 and 2330 are prepared for operation. The operating paths for these relays extend from the ground on the conductor 2096 through the closed contacts 2124 and 2102 to the numerical character code checking contact field controlled by the readout relays and thence over the above described paths to the operating windings of the relays 2320 and 2330.

In operating, the relays 2320 and 2330 close a plurality of contacts 2321, 2322, 2331, 2332, and 2333, among others. The closure of the contacts 2332 prepares a path for extending ground to a conductor 2351 to represent that the value of the stored units digit of the first switch combination is either "8" or "9." Similarly, the closure of the contacts 2322 and 2333 prepares a path for extending ground to a conductor 2361 to indicate that the stored one of these two units digits "8" or "9" is even, i.e. "8." The closure of the contacts 2321 and 2331 completes holding paths for the lower windings of the relays 2320 and 2330 extending to ground at the conductor 2096. Accordingly, at this time the values of the tens and units digits of the first switch code combination have been stored in the register decoder 240.

As described above, the closure of the contacts 2157 and 2168 returns start ground to the relay 1500 in the transmitting commutator 214 so that an additional cycle of operation of the counting chain therein is initiated. During this cycle of operation, the binary pairs in the commutator 214 are returned to spacing conditions and the magnetic tape or film 137 in the transmitter 138 is then advanced a single step to store a code combination representing a diagonal or slash in the binary pairs. As set forth above, a slash is transmitted to separate the two groups of digits forming the switch codes of the two recorders which are to receive the first message. The slash or diagonal code comprises marking conditions in the first, third, fourth, and fifth time positions (Fig. 31) and, accordingly, the tubes 1520, 1535, 1540, 1630, and 1640 are in a conductive condition representing this character. Simultaneously with storing the slash code in the binary pairs in the transmitting commutator 214, the contacts 911 are momentarily opened and closed to transmit a positive pulse to the flip-flop circuit in the connector link 212, thereby causing the transistor 1840 to again be rendered nonconductive. Rendering the transistor 1840 nonconductive releases the read relay 2100 so that the contacts 2102, 2103, and 2104 are opened, and the contacts 2101 are closed.

Since the information now stored in the transmitting commutator 214 does not comprise a switch code digit, the register decoder 240 includes means for preventing the storage of this code combination in the next group of register relays and means for preventing the transmission of an alarm signal representing an incorrect character code from the register decoder 240. More specifically, the closure of the contacts 2101 completes a circuit for extending ground from the conductor 2096 through the closed contacts 2111, 2122, and 2302 to the operating winding of a switch relay 2460 so that this relay operates to close a plurality of contacts 2461, 2462, and 2463. The closure of the contacts 2462 prepares an operating path for a fourth switch relay 2400, and the closure of the contacts 2463 completes another circuit for extending start ground to the relay 1500. The closure of the contacts 2461 completes a holding path for the relay 2460 and prepares an operating path for a relay 2110.

Referring back to the release of the relay 2100, the opening of the contacts 2103 extinguishes the tubes 2150 and 2160 and releases their associated reading relays, while the opening of the contacts 2104 permits the condensers 2141, 2151, 2161, 2171, and 2181 to charge, as described above. The opening of the contacts 2102 interrupts the above described path for extending operating ground to the windings of the relays 2320 and 2330, but these relays remain operated over the above described holding circuits.

Following the time delay interval of the flip-flop circuit in the connector link 212, the transistor 1840 is again rendered conductive to operate the read relay 2100 so that, in opening the contacts 2101, the ground shunt is removed from the winding of the relay 2110 so that this relay operates in series with the winding of the relay 2460. The operation of the relay 2110 opens the contacts 2111 and 2113 and closes a pair of contacts 2112. The opening of the contacts 2111 interrupts an additional point in the operating circuit for the relay 2460, and the closure of the contacts 2111 prepares an additional point in the operating circuit for the relay 2400. The opening of the contacts 2113 interrupts the holding and operating circuit for the relays 2120 and 2300 so that these relays release. The release of the relay 2300 disconnects the relays forming the second digit register in the register decoder 240 from the contact field controlled by the readout relays in the register decoder 240.

Referring back to the operation of the read relay 2100, the closure of the contacts 2103 and 2104 causes the tubes 2140, 2160, 2170, and 2180 to be selectively rendered conductive to operate their associated relays in accordance with the marking conditions stored in the binary pairs in the transmitting commutator 214. In operating the relays 2145, 2165, 2175, and 2185, a plurality of contacts including the contacts 2147 and a pair of contacts 2177 are closed. Since the code combination stored represents a diagonal and not a numerical character, the closure of the contacts 2147 and 2177 connects the closed contacts 2102 to the non-numerical code conductor 2199. However, ground is not extended to the conductor 2199 inasmuch as both of the relays 2120 and 2130 are released at this time, and ground is not forwarded to the contacts 2102 from the conductor 2096. Further, the selective operation of these readout relays does not start the storage of a non-numerical code combination in the register decoder 240 inasmuch as, when the relay 2460 is operated, none of the register relay groups in the register decoder 240 are connected to the contact field controlled by these readout relays.

The closure of one or more of the contacts 2148, 2168, and 2188 together with the closure of the contacts 2463 completes a circuit for extending ground to the start relay 1500 in the transmitting commutator 214 so that, as described above, the transmitter 138 is again stepped to transmit the first or tens digit of the second switch code to the transmitting commutator 214 for storage therein. As described above, in an illustrative call, this tens digit of the second switch code is "0" so that the mark tubes 1530, 1540, and 1640 are rendered conductive. Simultaneously with storing this information in the commutator 214, the flip-flop circuit in the connector link 212 is again operated so that the read relay 2100 is momentarily released and then operated. During this operation, the relays 2460 and 2110 are released, and the relays 2400 and 2130 are operated, the operation of the relay 2400 closing a plurality of contacts 2401, 2402, and 2403 and a group of contacts 2404. The closure of the contacts 2404 interconnects a plurality of relays 2410, 2420, 2430, 2440, and 2450 with the contact field of the readout relays so that this group of register relays is conditioned to receive the code combination representing "0." The closure of the contacts 2403 prepares a circuit for extending start ground to the relay 1500, and the closure of the contacts 2402 prepares a holding circuit for the relay 2400 and an operating circuit for the relay 2130. The closure of the contacts 2401 prepares a portion of an operating circuit for a fifth switching relay 2500.

Since the second, third, and fifth time positions in the combinational code provide marking conditions when the numerical character to be stored is "0," the relays 2420, 2430, and 2450 are rendered conductive to provide marking conditions on a single conductor of the cable 2470 representing the tens digit "0."

Following the storage of the tens digit of the second switch code in the register decoder 240, the transmitter 138 is advanced a single step to store the units digit "7" in the transmitting commutator 214 and to again cause the momentary release of the read relay 2100 during which the relays 2400 and 2130 are released and the relays 2120 and 2500 are operated. The operation of the relay 2500 closes a plurality of contacts 2501, 2502, and 2503, and a group of contacts 2504. The closure of the group of contacts 2504, together with the release of the relay 2400 to open the group of contacts 2404, connects the fourth group of register relays comprising a plurality of relays 2510, 2520, 2530, 2540, and 2550 to the contact field controlled by the readout relays. The momentary release and reoperation of the relay 2100 also causes the storage of the combinational code representing the numerical character "7" to be stored in the register decoder 240 so that the relays 2510, 2520, and 2530 are operated. The operation of these relays selects a single conductor in the cable 2570 in accordance with the information that the units digit of the second switch code comprises either the even digit "6" or the odd digit "7" and selects a conductor 2591 to indicate that, in the selected pair of units digits, the odd digit "7" is to be utilized in establishing the switching connection. Further, as described above, the operation of the relay 2500 together with the operation of at least one of the readout relays provides a circuit for extending ground to the start relay 1500 in the transmitting commutator 214 so that the binary storage pairs therein are cleared and the transmitter 138 is operated so that the next code combination stored on the magnetic film 137 is transmitted to and stored in these binary pairs.

As described above, this next code combination may represent any control code, such as figure shift, so that the tubes 1520, 1530, 1545, 1630, and 1640 are placed in conductive conditions. As described above, selectively rendering this combination of tubes conductive also causes the figure shift tube 1655 to be placed in a conductive condition in the event that this tube has inadvertently been rendered nonconductive at any point during the prior transmission. Incident to storing this code combination in the commutator 214, the flip-flop circuit in the connector link 212 again momentarily releases the read relay 2100 in the register decoder 240 so that the relays 2500 and 2120 are released and so that a relay 2560 is operated in combination with the relay 2110. Further, during this momentary operation, the readout relays controlled by the gas tubes in the register decoder 240 are selectively operated in accordance with the code combination representing figure shift, but, as in the case of the storage of the slash in the register decoder 240, the contacts 2102 are not provided with ground for extension to the conductor 2199 due to the released condition of the relays 2120 and 2130. The release of the relay 2500 disconnects the fourth group of storage relays in the register decoder 240 so that no attempt is made to store the figure shift code combination in the fourth digit register.

Operating the relay 2560 closes a plurality of contacts 2561, 2562, and 2563. The closure of the contacts 2561 completes the operating circuit for the relay 2110 so that this relay is operated, as described above, incident to the release and reoperation of the read relay 2100. It should be noted that the relay 2560 does not include a pair of contacts for extending ground to the start relay 1500 so that, when the relay 2500 releases to open the contacts 2503, ground is not again applied to the start relay 1500 in the transmitting commutator 214. Accordingly, when the cycle of operation of the counting chain in the commutator 214 at the end of which the figure shift code is transmitted to the commutator 214 is completed, an additional cycle of operation of the counting chain is not initiated and the figure shift code combination remains in the binary pairs in the transmitting commutator 214. At this time, the flip-flop circuit remains in its conductive state with the transistor 1840 maintaining the read relay 2100 in the register decoder 240 in an operated condition.

Since the numerical designations of the first and second recorders which are to receive the first message stored on the magnetic film 137 have now been stored in the register decoder 240, the operation of the relay 2560 therein is utilized to initiate the operation of the line connectors 218 and 219 in the outgoing link 210 so that a pair of output line circuits are seized in accordance with the digital values of the switch codes stored in the register decoder 240, i.e., "18" and "07." More specifically, to operate the line connector 218 in accordance with the first switch code "18" stored in the first two groups of register relays 2210, 2220, 2230, 2240, and 2250 and 2310, 2320, 2330, 2340, and 2350, the closure of the contacts 2562 and 2563 completes paths for extending direct ground and resistance ground over the marking paths prepared by the operated ones of the above identified relays to relays in the line connector 218 which interconnect the transmitter 138 with the output line circuit associated with the first of the two recorders or printers which is to be seized. The closure of the contacts 2563 extends ground from the closed and grounded contacts 2014 through a resistor 2098, a pair of closed contacts 2041 and a conductor 2097 to the conductor 2361 which has been selected by the closure of the contacts 2322 and 2333 to represent that the even one of the units digits "8" and "9" is to be used in selecting the recorder. The conductor 2361 extends over a cable 2360 to a pair of normally closed contacts 2051 in the marker control circuit 230 so that the resistance ground on the conductor 2361 is then forwarded over a conductor in a cable 2090 to one of the closed group of contacts 1801 in the connector link 212. This resistance ground is then forwarded over a conductor in the cable 1899 to the line connector 218.

The line connector 218 includes twenty tens digit relays of which only six relays 2600, 2610, 2700, 2710, 2720, and 2730 representing the tens even digit "0," the tens odd digit "0," the tens even digit "1," the tens odd digit "1," the tens even digit "9" and the tens odd digit "9," respectively, are shown. Since the resistance ground on the conductor 2361 indicates that the units digit is even, this resistance ground is applied to the lower windings of only the even digit relays 2600, 2700, and 2720, among others. The flow of current in parallel through the lower operating windings of all of the even tens digit relays is insufficient to operate any of these relays, including the illustrated relays 2600, 2700, or 2720.

To complete the operation of a selected one only of the twenty tens digit relays in the line connector 218, the closure of the contacts 2562 extends direct ground from the closed contacts 2014 through a pair of normally closed contacts 2043 and a conductor 2099 to the conductor 2261 selected by the closed contacts 2252, 2222, 2232, and 2212, which conductor represents the tens digit "1." The direct ground on this conductor is extended through a cable 2260, one of the group of closed contacts 1801, a conductor in the cable 1899, and a pair of series resistances 2701 and 2711 to the upper operating windings of the tens digit "1" relays 2700 and 2710, thereby selectively energizing the upper windings of both of these two relays. The current flow through either of these upper windings, considered individually, is insufficient to operate the associated relay. However, the tens digit "1" even relay 2700 also has its lower operating winding energized from resistance ground by the completion of the above described circuit and, accordingly, the relay 2700 only operates to close a plurality of contacts 2702–2705, among others.

The closure of the contacts 2704 prepares a holding circuit for the relay 2700. The closure of the contacts 2705 prepares an additional portion of an operating circuit for a switch relay 1930 in the connector link 212. The closure of the contacts 2702 and 2703 prepares circuits for seizing all of the output line circuits designated by the tens digit "1" which are associated even units digits.

The closure of the contacts 2562 also provides the line connector 218 with information relating to the pair of units digits including the stored units digit of the recorder designation for selectively operating one of a plurality of units digits relays 2620, 2630, 2640, 2650, and 2740 in the connector 218 representing the units digit combinations "01," "23," "45," "67," and "89," respectively. The closure of the contacts 2562 extends direct ground over the above described path to the conductor 2351 which represents the units digits "8" and "9." This ground is extended over the cable 2370 and through one of the closed contacts 1801 to the cable 1899 and thence to the operating winding of the relay 2740 representing the pair of units digits "89." The operation of the relay 2740 closes a plurality of contacts 2741–2744. The closure of the contacts 2743 prepares a holding circuit for the relay 2740, and the closure of the contacts 2744 completes an operating circuit for the slow-to-operate switch relay 1930 in the connector link 212. The closure of the contacts 2741 and 2742 connects the connector link 212 with the output line circuit 260 (Fig. 28) associated with the printer or recorder 270 which is arbitrarily designated as No. 18.

In a similar manner, the closure of the contacts 2562 and 2563 extends resistance ground and direct ground through the marking paths controlled by the groups of relays 2410, 2420, 2430, 2440, and 2450 and 2510, 2520, 2530, 2540 and 2550 to selectively operate the line connector 219 in accordance with the information stored in these two groups of register relays representing the second printer or recorder which is to be seized and which is designated as "07." The completion of the operation of the terminating office line connector or second line connector 219 cuts through a circuit from the connector link 212 to the line circuit 262 connected to the second recorder which is arbitrarily designated as No. 07.

When both of the line connectors 218 and 219 are operated in accordance with the information stored in the register decoder 240, the connector link 212 performs a busy test to determine the availability of the two seized recorders 270 and 272. More specifically, this busy test path, in the case of the line connector 218, extends from the upper operating winding of a busy relay 1920 in the connector link 212 through a pair of normally closed contacts 1934 and the closed contacts 2742 and 2703 to the operating winding of a cutoff relay 2800 in the line circuit 260. If the line circuit 260 has previously been seized by another outgoing link, such as the link 220, ground is applied to the operating winding of the relay 2800 from this other outgoing link so that the upper operating winding of the busy test relay 1920 is energized to operate this relay to open a plurality of contacts 1921 and 1922 and to close a pair of contacts 1923. The opening of the contacts 1922 interrupts a point in the operating circuit for the slow-to-operate switch relay 1930 so that this relay cannot be operated. The opening of the contacts 1921 causes the release of the lockout relay 1900 and the accompanying release of the guard relay 2010 in the marker control circuit 230, in a manner described in detail hereinafter. The closure of the contacts 1923 completes an operating circuit for the second busy test relay 1910 extending from main ground through the closed contacts 1807 and 1806.

The operation of the relay 1910 closes a plurality of contacts 1911 and 1912. The closure of the contacts 1911 provides a source of holding ground for the operated connector 218, and the closure of the contacts 1912 completes an obvious holding circuit for the relay 1910 extending from main ground through the closed contacts 1939.

In a similar manner, a busy test circuit is completed for the connector 219 extending through a pair of normally closed contacts 1936 to the lower winding of the busy test relay 1920. Accordingly, if either of the connectors 218 or 219 associated with the connector link 212 seizes a line circuit, such as the line circuits 260 and 262, which is in a busy condition, the busy test relays 1920 and 1910 are operated. In operating, these two relays release the register decoder 240 by causing the sequential release of the lockout relay 1900 in the connector link 212 and the guard relay 2010 in the marker control circuit 230. These relays also provide a holding ground to the line connectors 218 and 219 for maintaining the relays operated to await the release of the busy recorder. The operation of the busy relays further prevents the operation of the switch relay 1930 in the connector link 212 and thus prevents the initiation of the transmission of information from the transmitter 138 and from the train information recorder 3500, as described in detail below.

Assuming, however, that the output line circuits 260 and 262 seized by the line connectors 218 and 219 are in an idle condition, the busy test relays 1910 and 1920 are not operated. At this time, the slow-to-operate switch relay 1930 is operated. The operating circuit for this relay, with respect to the line connector 218, extends from ground through the closed contacts 1808, 2705, 2744, and 1922. The completion of this circuit operates the switch relay 1930 so that a plurality of contacts 1932, 1933, 1935, 1937, 1938, **1931*a*, 1932*a*, and 1934*a* are closed, and the contacts 1931, 1934, 1936, 1939, and 1933*a*** are opened.

The closure of the contacts 1932 completes a holding circuit for the lower operating winding of the relay 1930 extending to ground at the closed contacts 1805. The closure of the contacts 1938 extends ground over the circuits prepared by the closure of the contacts 2704 and 2743 for maintaining the operated relays in the line connectors 218 and 219 operated. The closure of the contacts 1933 extends ground from the closed contacts 1805 to the operating winding of the cutoff relay 2800 in the line circuit 260 seized by the line connector 218, this circuit extending through the closed contacts 2742 and 2703. The operation of the cutoff relay 2800 opens a pair of contacts 2801 to remove a resistance ground shunt from the signaling lead of the recorder 270, which is connected to negative battery in the printer 270 through the winding of a printer magnet. The concurrent opening of the contacts 1934 interrupts the above described operating circuit for the upper winding of the busy test relay 1920. In a similar manner, the closure of the contacts 1935 operates the cutoff relay in the line circuit 262 seized by the terminating office line connector 219, and the concurrent opening of the contacts 1936 interrupts the operating circuit for the lower winding of the busy test relay 1920 extending to the line circuit 262.

The closure of the contacts **1931*a* and 1932*a* connects a signaling lead extending to the output of the flip-flop circuit in the train information recorder circuit 216 to the signaling leads of the recorders 270 and 262. The closure of the contacts 1934*a* and the opening of the contacts 1933*a* connects a terminal 1977 to this signaling lead extending to the train information recorder circuit 216 to permit a monitoring printer to be connected to the output of this circuit to provide a record of the information which is being simultaneously transmitted to the recorders 270 and 272**.

The opening of the contacts 1931 interrupts the above described operating circuit for the lockout relay 1900 so that this relay restores to its normal condition and thereby again completes the series circuit from the resistance 1998 for holding the alarm relay 2020 operated and for preventing operation of a second alarm relay 2030. Further, in opening the contacts 1905, the release of the relay 1900 opens the above described operating circuit for the slow-to-release guard relay 2010 in the marker control circuit 230, this relay, however, remaining operated for a period due to the slow-to-release characteristic thereof. The opening of the contacts 1901 releases the gang relay 1800 in the connector link 212, thereby to terminate the association of the connector link 212 and of the line connectors 218 and 219 with the common register decoder 240. Releasing the relay 1800 releases the read relay 2100 in the register decoder and the operated tubes and readout relays therein and also disassociates the tubes 2140, 2150, 2160, 2170, and 2180 from the output of the binary pairs in the transmitting commutator 214, thereby to prepare the register decoder 240 for association with another outgoing link, such as the link 220. The opening of the contacts 1808 interrupts the above described operating circuit for the switch relay 1930, but this relay remains operated over the above described holding circuit.

Referring back to the above described operation of the switch relay 1930, the opening of the contacts 1939 removes holding ground from the lower winding of the relay 1810 so that this relay releases to restore the contacts controlled thereby to their normal condition. The closure of the contacts 1812 extends holding ground to the relay 1930 through the closed contacts 1821 and 1932 to replace the holding ground removed by the opening of the contacts 1805 when the gang relay 1800 releases. The holding ground at the contacts 1812 also holds the cutoff relays in the line circuits 260 and 262 operated. The closure of the contacts 1813 again prepares an operating circuit for the relay 1810, and the opening of the contacts 1811 interrupts an additional point in the operating circuit for the lockout relay 1900.

After its slow-to-release interval, the guard relay 2010 releases to restore the contacts controlled thereby to their normal condition and, in closing the contacts 2013, renders the plurality of other connector links, such as the link 222, effective to operate the marker control circuit 230 and to seize the common register decoder 240. The opening of the contacts 2014 removes the main source of ground from the conductor 2096 so that the operated groups of register relays in the register decoder 240 are released, thereby completing the conditioning of this circuit for receiving switch code information from another outgoing link on seizure thereof. The opening of the contacts 2014 also removes the sources of resistance and direct ground for operating the relays in the line connectors 218 and 219, but these circuits have previously been interrupted by the release of the gang relay 1800 and the operated relays in the connectors 218 and 219 remain operated over the above described holding circuits.

With the completion of the seizure of the two recorders 270 and 272 in accordance with the two switch codes preceding the first message, the operation of the transmitter 138 under the control of the transmitting commutator 214 is again initiated in response to the operation of the switch relay 1930. More specifically, the ground provided by the loose tape control in the transmitter 138 described above is forwarded through the closed contacts 1723 and 1937 to the closed contacts 1831 and thence to the operating winding of the start relay 1500. The operation of the relay 1500 renders the multivibrator 1400 effective to control sequential operation of the counting chain in the transmitting commutator 214 during which successive items of information are fed from the transmitter 138 to the binary pairs in the transmitting commutator. Incident to each cycle of operation thereof, the binary pairs and the counting chain cooperate to supply mark and space pulse information through the coupling condensers 1761 and 1771 to the input transistors 1760 and 1770 in the flip-flop circuit provided in the train information recorder circuit 216 so that the conductive state of the output transistor 1790 is varied in accordance with these signals. The collector electrode of the output transistor 1790 is connected to the printing magnets in the recorders 270 and 272 over a circuit including the closed contacts 1931*a* and 1932*a* so that identical messages are stored in each of these recorders. This transmission of data under the control of the flip-flop circuit in the train information recorder circuit 216 continues until such time as the common information stored in the train information recorder 3500 is to be transmitted to both of the recorders 270 and 272. It should be noted that, although mark and space pulses are produced in accordance with the switching character during the operation of the register decoder 240, these pulses are not effective to operate any recorders since a conductive path from the flip-flop circuit has not been established.

At the point in the first individual message or first car report at which the common message comprising the train number and date and time of departure of the train is to be inserted, a figure shift "F" code combination is stored on the magnetic film 137, as described above. The transmission of these two codes to the transmitting commutator 214 fires the tubes 1655 and 1660 in sequence, as described above, so that the relay 1720 is operated to close the contacts 1721 and 1722 and to open the contacts 1723. The opening of the contacts 1723 interrupts the above described operating circuit for the start relay 1500 so that operation of the transmitting commutator 214 under the control of the multivibrator 1400 is terminated, thereby interrupting operation of the transmitter 138. Due to the prior operation of the relay 1730, which remains held in an operated condition over the holding circuit including the closed contacts 1732, the closure of the contacts 1722 does not operate the relay 1740 at this time. However, the closure of the contacts 1721 again completes the operating circuit for the relay 1700 so that the motor 1750 is again energized to initiate movement of the magnetic tape 3502.

The closure of the contacts 1705 in response to the operation of this relay prepares an operating circuit for the relay 1710 controlled by the tape sensing contacts 1752 and 1753. At this time the transducing head 1755 of the train information recorder 3500 is connected to the input of the amplifier 1756 through the normally closed contacts 1742 and 1744, and this input to the amplifier is not shunted inasmuch as the operation of the relay 1700 opens the shunting contacts 1703. The output of the amplifier 1756 is connected to a pair of coupling condensers 1767 and 1768, the other sides of which are connected to a B— potential provided by a pair of voltage dividers. These other terminals of the condenser 1767 and 1768 are also connected to the input condensers 1761 and 1777 of the transistors 1760 and 1770 through the blocking diodes 1763 and 1762. Accordingly, when the amplifier 1756 provides positive pulses in response to the transducing head 1755 sensing signals recorded on the magnetic tape 3502, one or the other of the blocking diodes 1762 and 1763 is rendered conductive to supply input mark and space pulses to the transistors 1760 and 1770, thereby varying the conductive state of the output transmitter 1790 to transmit mark and space pulse information to the recording magnets in the recorders 270 and 272. Therefore, the initiation of movement of the magnetic tape 3502 relative to the transducing head 1755 provides mark and space pulse signals which are transmitted through the amplifier 1756 to control the operation of the flip-flop circuit in the train information recorder circuit 216, thereby to cause the common or repetitive message stored on this magnetic tape to be supplied to both of the seized recorders, such as the recorders or printers 270 and 272.

The transmission of this repetitive message to the recorders continues until such time as the effective end or beginning of this loop of magnetic tape is reached, at which time the conductive foil 3534 carried thereon bridges the contacts 1752 and 1753 to again fire the tube 1754 and, accordingly, to operate the relay 1710. The operation of the relay 1710 closes the contacts 1711 and 1712 and opens the contacts 1714 and 1713. The closure of the preliminary make contacts 1712 provides a shunt across the input of the amplifier 1756 to prevent spurious signals from being transmitted thereto incident to the switching operations in the train information recorder circuit 216. The closure of the contacts 1711 provides a surge of direct current potential to the windings of the motor 1750, thereby to provide instantaneous braking of the tape drive motor. The opening of the contacts 1714 releases the relay 1720 and extinguishes the tube 1660, and the opening of the contacts 1713 releases the relay 1700 so that once again movement of the magnetic tape 3502 in the train information recorder 3500 is terminated. The opening of the contacts 1705, in response to the release of the relay 1700, releases the relay 1710 and extinguishes the tube 1754. Accordingly, at this time, all of the relays in the train information recorder circuit 216, with the exception of the relay 1730, are in a released condition.

In releasing, the relay 1720 closes the contacts 1723 to again provide ground to the start relay 1500 in the transmitting commutator 214 so that this commutator is again operated under the control of the multivibrator 1400 to transmit the remainder of the first message to the two seized printers in the manner described in detail above. This data transmission continues until such time as all of the first message has been transmitted, as represented by the transmission of a figure shift "G" code combination from the transmitter 138 to the transmitting commutator 214. This receipt of a figure shift "G" code combination is utilized to drop off the two seized recorders 270 and 272 and to again call in the common register decoder 240 so that connections are established to other two printers in accordance with the next pair of switch codes which are received from the transmitter 138.

More specifically and as described in detail hereinabove, the transmission of successive figure shift and "G" code combinations fires the tubes 1655 and 1665 so that the relay 1810 is again operated to close the contacts 1811 and 1814 and to open the contacts 1812 and 1813. The opening of the contacts 1812 removes holding ground from the switch relay 1930 so that this relay releases to restore the contacts controlled thereby to their normal position. The opening of the contacts 1937 interrupts the above described circuit for supplying ground to the start relay 1500 so that this relay releases to arrest further operation of the transmitting commutator 214. The opening of the contacts **1931*a* and 1932*a* disconnects the seized printers 270 and 272 from the output of the flip-flop circuit in the train information recorder circuit 216. The opening of the contacts 1933 and 1935 interrupts the operating circuit for the cutoff relays, such as the relay 2800 in the line circuit 260, so that the previously seized line circuits 260 and 262 are released. The opening of the contacts 1938 removes ground from the holding circuits for the operated relays in the line connectors 218 and 219** so that these relays restore to their normal conditions.

The closure of the contacts 1931, together with the closure of the contacts 1811 in response to operation of the relay 1810, again prepares an operating circuit for the lockout relay 1900 in the connector link 212. In the event that the marker control circuit 230 and, accordingly, the register decoder circuit 240 are idle at this time, the lockout relay 1900 again operates to cause the operation of the guard relay 2010, the consequent seizure of the register decoder 240, and its association with the connector link 212 by the operation of the gang relay 1800. The transmitting commutator 214 thereafter transmits the two sets of two-digit switch codes from the magnetic film 137 to the register decoder 240 for storage therein and for use in establishing a connection through the line connectors 218 and 219 to the line circuits associated with the recorders to which the next message is to be transmitted. Following the completion of the seizure of these two printers or recorders, the satisfactory completion of the busy test, and the operation of the switch relay 1930 in the connector link 212, the register decoder 240 is again released, and the second message stored on the magnetic tape 137 is transmitted to these two subsequent seized recorders together with the interposed common or repetitive message which is stored on the loop of magnetic tape 3502 in the train information recorder 3500.

As described above, following the transmission of a complete train report comprising a series of car reports or individual messages, the input line circuit 112, the line marker 132, the receiving commutator 134, and the recorder 136 are released. Incident to this release, ground is removed from the conductor 461 so that the busy relay 1140 in the link marker 202 forming the termination of the incoming link 130 is released. However, at this time, the storage tape loop between the now released recorder 136 and the transmitter 138 contains message information together with the end of message signal comprising figure shift "H" which is utilized as a release signal, and this data must be transmitted by the transmitter 138 to the proper recorders. The link marker 202 includes means for insuring the transmission of this information.

More specifically, when the relay 1140 is released, the contacts 1141, 1142, 1144, 1146, and 1147 are closed and the contacts 1143, 1145, and 1148 are opened. The opening of the contacts 1143 and 1145 interrupts the above described circuit for extending ground to the start relay 1500 in the transmitting commutator 214 during the intervals in which the loose tape contacts 952 are closed. However, the closure of the contacts 1146 extends ground directly through the closed contacts 1007 to the contacts 1723 and 1831 which selectively control the operation of the start relay 1500. Therefore, the transmission of information from the transmitter 138 to the seized recorder continues irrespective of the condition of the contacts 951 and 952 which sense the amount of magnetic film 137 in the storage loop between the recording heads 921–925 and the reproducing heads 931–935.

However, if the recorder 136 is not in operation, the supply of tape between the recorder 136 and the transmitter 138 is reduced so that the tape goes into a tight tape condition in which there remains information stored on the magnetic film 137 in the space between the transducing heads 921–925 and 931–935 which is to be recorded. The link marker 202 includes further means for insuring that this data is transmitted following the establishment of a tight tape condition. More specifically, the link marker 202 includes means for stepping the motor magnet 900 in the recorder 136 in response to each step of operation of the motor magnet 910 in the transmitter 138 following the establishment of a tight tape condition so that the magnetic film 137 is advanced a single step with respect to both the recording heads 921–925 and the transducing heads 931–935 in order to permit the information stored on the tape interposed between the recorder 136 and the transmitter 138 to be transmitted to the selected recorders.

When the contacts 951 are closed indicating a tight tape condition, the B+ potential supplied at the normally closed contacts 911 is extended to ground through a voltage divider including a pair of resistances 1181 and 1182, and the common connection of these two resistances is connected through a plurality of closed contacts 1123, 1142, 951, 1141, and 1121 to one terminal of a coupling condenser 845, the other terminal of which is connected to the control electrode of the tube 840 in the receiving commutator 134. Each time the contacts 911 are opened and closed incident to advancing the magnetic film 137 a single step relative to the reproducing heads 921–935, a positive going potential is coupled through the condenser 845 to the control electrode of the tube 840, thereby rendering this tube conductive. Firing the tube 840 couples a positive pulse through the condenser 834 to the control electrode of the stop tube 830. However, this tube is in a conductive condition at this time inasmuch as information is not being received by the receiving commutator 134. However, firing the tube 840 again operates the transistors 850 and 855 so that the motor magnet 900 in the recorder 136 is again momentarily operated to open the contacts 901, thereby to extinguish the tube 840 and to operate the step-by-step drive mechanism so that the magnetic film 137 is advanced a single step relative to the recording heads 921–925. In this manner, the magnetic film 137 is advanced a single step relative to the recording heads 921–925 in response to each step of movement of this magnetic film relative to the transducing heads 931–935 following the release of the receiving commutator 134 and following the establishment of a tight tape condition between the recorder 136 and the transmitter 138.

As described above, following the transmission of a complete train report and following the recording of all of the information stored on the magnetic film 137, the outgoing link 210 and the remainder of the incoming link 130 are released under the control of a code combination representing figure shift "H." More specifically, the transmission of the figure shift code combination from the transmitter 138 to the commutator 214 fires the tube 1655, and the following storage of the "H" code combination (Fig. 31) in the binary pairs in the transmitting commutator 214 places the tubes 1525, 1535, 1540, 1635, and 1640 in a conductive condition. When the counting chain in the transmitting commutator 214 advances through it next cycle of operation, the figure shift drive tube 1560 is fired to supply a positive pulse to a coupling condenser 1568 and also to the coupling condensers 1566 and 1567. The pulses supplied to the condensers 1566 and 1567 perform no useful function inasmuch as transmission of these pulses to the control electrodes of the tubes 1660 and 1665 is blocked by the series arrangement of blocking diodes. However, the blocking diodes connected in series with the coupling condenser 1568 are properly conditioned by the selective operation of the binary pairs described above to be rendered conductive in response to the application of a positive pulse so that a positive pulse is coupled to the control electrode of the tube 1670, thereby rendering this tube conductive to operate a release relay 1940 in the connector link 212. The operation of the relay 1940 opens a plurality of contacts 1941, 1943, 1944, and 1945 and closes a pair of contacts 1942.

The closure of the contacts 1942 completes a holding circuit for the release relay 1940 extending to ground at the closed contacts 1822. The opening of the contacts 1941 interrupts the operating circuit for the relay 1940 so that the tube 1670 is extinguished. The opening of the contacts 1943 removes main ground from the connector link 212 and its associated train information recorder circuit 216 so that the relays 1730 and 1930 are released to restore their contacts to their normal position. The opening of the contacts 1945 prevents any attempts to reassign the connector link 212 in the outgoing link 210 until such time as the outgoing link 210 has been restored to a normal condition. The opening of the contacts 1944 interrupts the above described operating and holding circuit for the relay 1820 in the connector link 212 so that this relay restores to its normal condition.

Further, the opening of the contacts 1944 interrupts the holding circuit for the operated relay 1000 in the link marker 202 so that this relay releases to disconnect the transmitter 138 from the outgoing link 210. In releasing, the relay 1000 opens the contacts 1001*a* so that the operating circuit for the relay 1120 is opened. The release of this relay opens the contacts 1121, 1123, and 1127 and closes the contacts 1122, 1124, 1125, 1126, and 1128. The opening of the contacts 1123 interrupts the above described circuit for applying positive pulses to the tube 840 in the receiving commutator 134 and, accordingly, interrupts additional operation of the motor magnet 900 in the recorder 136. The closure of the contacts 1124 prepares an operating circuit for the relay 1130, but this relay is not operated at this time inasmuch as, as described above, the contacts 951 are closed as an indication that a tight tape condition exists between the recorder 136 and the transmitter 138. Referring back to the connector link 212, the release of the relay 1820 therein opens the contacts 1822 to remove holding ground from the release relay 1940 so that this relay releases. With the release of the relay 1940, all of the components in the outgoing link 210 have been restored to their normal condition to place the link 210 in a condition in which it is capable of being seized by one of the incoming links 130, 140, or 150 for use in recording information.

As described above, when the incoming link 130 is released during the recording of the items of information which are stored on the magnetic film 137 in the storage loop between the recorder 136 and the transmitter 138, the release of the busy relay provides a means for permitting the continued operation of the transmitting commutator 214 so that the tape between the recorder 136 and the transmitter 138 is taken up to provide a tight tape condition and thereafter the tape is simultaneously stepped in the recorder 136 and the transmitter 138 until such time as all of the items have been transmitted, as signified by the transmission of a figure shift "H" combination to the transmitting commutator 214. However, it is possible that, following the release of the incoming link 130 at the end of a first complete message or train report, this link 130 will again be seized from one of the remote sending offices 102, 104, 106, or 108 prior to the completion of the recording of the first message stored thereon. In this event, the busy relay 1140 and the memory relay 1130 are again simultaneously operated, the operation of the relay 1140 opening the contacts 1146 to remove start ground from the transmitting commutator 214. However, if the tape loop control arrangement is in such a condition that the loose tape contacts 952 are closed, start ground is immediately reapplied to the start relay 1500 over the circuit described above including the closed contacts 1143 and 1145 so that the magnetic film 137 in the storage loop having the remainder of the first message is advanced through the transmitter 138 while the magnetic tape 137 is being advanced into the storage loop by the recorder 136 as the items of the second message are being stored thereon. In the event that a tight tape condition arises due to transmission of information from the transmitter 138 at a more rapid rate than the recording of the second train report by the recorder 136, the establishment of a tight tape condition merely arrests operation of the transmitting commutator 214 until such time as sufficient tape 137 has been provided in the storage loop including items of information pertaining to the second message to establish a loose tape condition which initiates renewed operation of the transmitting commutator 214.

However, when the figure shift "H" combination is received at the end of the first message, information pertaining to the second message is now in the storage loop, and the link marker 202 includes means to insure another allotting operation in which the link marker 202 forming a portion of the incoming link 130 is again associated with another idle outgoing link, such as one of the links 210 or 220. As described above, incident to the release of the outgoing link 210 in response to the receipt of the figure shift "H" combination signifying the end of the first message, the relay 1120 is released to restore the contacts controlled thereby to their normal condition. The closure of the contacts 1125 together with the prior closure of the contacts 1132 in response to operating the relay 1130 when the link marker 202 was reseized completes the operating circuit for the relay 1110. The operation of the relay 1110 operates the link marker 202 and the link lockout and allotter circuit 280 so that the incoming link 130 is again associated with an idle outgoing link to permit the items of information in the second message to be recorded by a seleced plurality of recorders. Incident to the allotting operation, the lockout relay 1100 in the link marker 202 is operated to open the contacts 1105, among others, thereby releasing the memory relay 1130.

An additional operating condition which may arise in the transmission of information through an incoming link, such as the incoming link 130, to one of the plurality of outgoing links 210 or 220 is the recording of two or more complete train reports on the film 137 in a time interval which is shorter than the time period required to complete the transmission of the remainder of the first message which is stored in the tape loop between the recorder 136 and the transmitter 138. As an example, the busy relay 1140 and the memory relay 1130 are operated in response to the second seizure of the link 130 upon initiation of the recording of the second message. However, when the storage of the second message terminates prior to the completion of the retransmission of the first message on the magnetic film 137, the busy relay 1140 is again released. The release of this relay, in closing the contacts 1146, again provides means for insuring continuing operation of the transmitting commutator 214 to complete the production of the printed records of the first message. Incident to the production of these records, the voltage divider including the resistances 1181 and 1182 is utilized if a tight tape condition arises during the completion of the storage of the second message. When the relay 1120 is then released at the completion of the retransmission of the first message, the memory relay 1130, by virtue of the closed contacts 1132, then causes an additional allotting operation to be performed in which the incoming link 130 is again associated with an idle outgoing link, as described above, to transmit the second message which has been stored on the film 137.

However, incident to this second allotting operation, the operation of the lockout relay 1100 opens the contacts 1105 to interrupt the holding circuit for the memory relay 1130 so that this relay releases. Therefore, at the termination of the recording of the second message, as determined by the second transmission of figure shift "H" from the transmitter 138, when the relay 1120 is again released, another operating circuit is not provided for the relay 1110 due to the fact that both the busy relay 1140 and the memory relay 1130 are released. However, at this time, the third message remains on the magnetic tape 137 and it is necessary to provide means for once again causing an allotting operation to be performed so that an idle outgoing link, such as one of the links 210 or 220, is again associated with the incoming link 130.

Accordingly, when the relay 1120 releases at the end of the second message, the relay 1140 being in a released condition and the loose tape contacts 952 being closed to signify the presence of unrecorded material in the storage loop between the recorder 136 and the transmitter 138, an operating circuit for the memory relay 1130 is completed extending from ground through the closed contacts 1122, 1142, 952, 1144, and 1124. The operation of the memory relay 1130, in closing the contacts 1132, again causes the operation of the relay 1110 so that the link lockout and allotter circuit 280 is again placed in operation to associate the incoming link 130 with an idle outgoing link. The outgoing link then controls the transmission of the items of information remaining in the storage loop between the recorder 136 and the transmitter 138. Accordingly, whenever a link marker, such as the link marker 202, is released with the magnetic film or tape 137 in the recorder 136 and the transmitter 138 associated therewith forming a supply loop therebetween in which a loose tape condition is provided, the memory relay 1130 is immediately operated to cause an allotting operation to be performed so that an outgoing link is seized to cause the items of information stored on the magnetic film in this loop to be played back or recorded.

In the event that, during transmission, any of the switch codes are distorted so that the register decoder 240 cannot be correctly operated to seize the two printers or recorders which are to receive the car report information, an intercept line circuit 2810 and an intercept recorder 2820 are provided for receiving the messages for which the switch codes have been incorrectly received. More specifically, as described above, whenever a non-numerical code combination is received in the register decoder 240 with any of the relays 2200, 2300, 2400, or 2500 in an operated condition, ground is supplied to the conductor 2199. This ground is extended to the operating winding of an intercept relay 2040 in the marker control circuit 230 to cause the operation of this relay. In operating, the relay 2040 opens the contacts 2041, 2043, and 2047 and closes a plurality of contacts 2042, 2044, 2045, and 2046. The closure of the contacts 2045 completes an obvious holding circuit for the intercept relay 2040 extending to the closed and grounded contacts 2014.

In opening the contacts 2047, the above described circuit for forwarding start ground to the start relay 1500 in the transmitting commutator 214 is interrupted so that, as soon as a non-numerical code has been transmitted to the register decoder 240 for storage therein at times other than those when the slash and figure shift are transmitted, as described above, the transmitting commutator 214 is prevented from further operation so that additional information is not transmitted to the register decoder 240. The opening of the contacts 2041 removes resistance ground from the conductor 2097, and the opening of the contacts 2043 removes direct ground from the conductor 2099. As set forth above, these two conductors provide ground for extension through the marking paths prepared by the register decoder 240 for producing selective operation of the relays in the line connectors 218 and 219. Accordingly, the opening of the contacts 2041 and 2043 prevents the operation of the line connectors 218 and 219 to seize a line circuit in accordance with any information stored in the register decoder 240.

The concurrent closure of the contacts 2042 and 2044 extends resistance and direct ground, respectively, to a plurality of normally open contacts 2052, 2054, 2056, 2058, **2051*a*, and 2053*a* controlled by a second intercept relay 2050. The closure of the contacts 2046 completes an obvious operating circuit for the second intercept relay 2050 so that this relay operates to open a plurality of contacts 2051, 2053, 2055, 2057, 2059, and 2052*a* and to close the contacts 2052, 2054, 2056, 2058, 2051*a*, and 2053*a*. The opening of the contacts 2051, 2053, 2055, 2057, 2059, and 2052*a* disconnects the two sets of output conductors of the register decoder 240 representing the tens digit "0," the units digit "0," and the tens digit even from the related contacts in the groups of contacts 1081 and 1082 controlled by the gang relay 1800. The closure of the contacts 2052, 2054, 2056, 2058, 2051*a*, and 2053*a* connects these contacts of the gang relay directly to the resistance and direct ground provided at the closed contacts 2042 and 2044. This resistance and direct ground is extended to the operating windings of the relays in the line connectors 218 and 219 to operate relays therein for seizing the intercept printer or recorder 2820**.

More specifically, in the line connector 218, these ground and resistance ground signals operate a tens digit "0" even relay 2600 and the units digits "01" relay 2620. The operation of the relay 2600 closes a group of contacts including a plurality of contacts 2602 and 2603 and a plurality of other contacts 2604 and 2605. The operation of the relay 2620 closes a plurality of contacts 2622, 2623, 2624, and 2625. The closure of the contacts 2602, 2603, 2622, and 2623 connects one of the output signaling leads and one of the windings of the busy test relay 1920 to the intercept line circuit 2810. Similarly, the line connector 219 operates to connect the intercept line circuit 2810 to the other of the windings of the busy test relay 1920 and to the other of the output signaling leads in the connector link 212. The closure of the contacts 2605 and 2625 again prepares an operating circuit for the slow-to-operate switch relay 1930, and the closure of the contacts 2604 and 2264 prepares a holding circuit for the relays 2600 and 2620, similar functions occurring in the line connector 219.

In the event that the intercept recorder 2820 is in a busy condition, as evidenced by the application of ground to the conductors connected to the operating windings of the busy test relay 1920, this relay is operated to perform the functions described above. However, in the event that the intercept line circuit 2810 and the intercept recorder 2820 are in an idle condition, the switch relay 1930 is operated, as described above, so that the remaining switch codes, if any, stored on the magnetic film 137 together with the message stored on the magnetic film 137 is transmitted to the intercept recorder 2820 in the manner described above.

The operation of the switch relay 1930 also serves to release the register decoder 240 and to release the lockout relay 1900 and the guard relay 2010 so that the holding circuit for the intercept relays 2040 and 2050 is opened. The release of these relays conditions the marker control circuit 230 for operation in response to the next receipt of a figure shift "G" combination by the transmitting commutator in any one of the outgoing links to which the marker control circuit 230 is common. In this manner, the transfer of a distorted switch code to the register decoder 240 comprising other than a numerical character causes the intercept recorder 2820 to be placed in operation to receive the message immediately following the distorted switch code. The intercept recorder 2820 and its line circuit 2810 are released in response to the receipt of a figure shift "G" code by the transmitting commutator 214.

Although the above described data processing system has been described in conjunction with the details of an automatic telegraph system which is particularly adapted for utilizing data comprising train and wheel reports, it should be understood that the circuits and operational techniques embodied therein are capable of general application. Accordingly, it should be understood that many other modifications and embodiments may be devised by those skilled in the art which will fall within the spirit and scope of the principles of this invention.

What is claimed as new and desired to be secured by Letters Patent of the United States is:

1. In a data handling system, a plurality of data receiving stations, means for storing messages having address portions, a first plurality of electronic means operated in accordance with said messages, switching means including a second plurality of electronic means, and means for transferring said address portions from said first plurality of electronic means to said second plurality of electronic means to operate said switching means to establish data handling circuits from said means for storing messages through said first plurality of electronic means to selected ones of said data receiving stations.

2. In a telegraph switching system including stations, a plurality of controlled conduction means, a storage medium for receiving a plurality of successive switch code combinations, means controlled by said storage medium for sequentially applying potentials representing said switch code combinations to said controlled conduction means to operate said devices in accordance with said code combinations, a plurality of registers, decoding means sequentially operable under the control of said controlled conduction means to store said successive switch code combinations in said registers in decoded form, and switching means controlled by said registers for establishing a data receiving path for one of said stations.

3. The system set forth in claim 2 in which the decoding means includes means for controlling the application of said potentials representing the switch code combinations to said controlled conduction means.

4. A data switching system comprising a plurality of input means operated in accordance with switch directing signals, means for supplying successive switch directing signals to said input means, switching means, control means for controlling said switching means and selectively operated by said input means to receive and store a plurality of said switch directing signals, and means operated following the storage of a predetermined number of said signals in said control means for then operating said switching means in accordance with said signals.

5. The system set forth in claim 4 including means operated following the operation of said switching means for rendering said control means ineffective to store signals under the control of said input means.

6. In a data handling system having means for storing a message having an address portion, data recording means, data transmitting means controlled by said stored message, switching means for establishing a signaling path from said data transmitting means to said recording means, control means for selectively operating said switching means, and means for connecting said control means to said data transmitting means to receive said address portion to operate said switching means and for releasing said control means incident to the establishment of a signaling path to said recording means.

7. In a data switching system including a data transmitting means and a plurality of data recorders, a plurality of control means, means for successively operating said control means in accordance with switch directing signals, a plurality of storage means sequentially operated by said control means to store said switch directing signals, switching means, and means operated following the storage of a predetermined number of said signals in said storage means for then operating said switching means in accordance with the stored signals to extend a signaling path from said data transmitting means to a selected data recorder.

8. The system set forth in claim 7 in which said means for successively operating said control means includes said data transmitting means.

9. The system set forth in claim 7 in which said control means comprise controlled conduction means and in which said plurality of storage means includes a plurality of groups of relays successively connected to and operated by said controlled conduction means.

10. A data switching system including a first plurality of control means operated in accordance with switch directing signals, means for sequentially supplying switch directing signals to said first plurality of control means, a second plurality of control means selectively operated by said first plurality of control means, switch controlling means operated by said second plurality of control means in accordance with said switch directing signals, and means operated in response to each operation of said switch controlling means for operating said means for sequentially supplying switch directing signals and for restoring said first and second plurality of control means to a normal condition.

11. A data switching system for use with messages having switch directing signals in a coded form, a first plurality of electronic means providing a pattern of conductive and nonconductive conditions in accordance with said switch directing signals, switching means connected to said first plurality of electronic means, means for controlling the operation of said switching means including a second plurality of electronic means, means for selectively supplying control signals to said second plurality of electronic means from said first plurality of devices, and means for selectively operating said second plurality of electronic means in accordance with said supplied control signals to actuate said switching means to extend a message transmitting path from said first plurality of electronic means.

12. The system set forth in claim 11 in which said second plurality of electronic means each includes a control electrode selectively provided with a biasing potential by said control signals for enabling the electronic means to be rendered conductive, and in which said means for selectively operating said second plurality of electronic means includes means for supplying signals to all of said second plurality of electronic means to render conductive only those of said second plurality of electronic means having biasing potentials supplied to their control electrodes.

13. A message switching system comprising a first plurality of electronic means selectively operated to off and on conditions in accordance with a coded representation of a switch controlling character, a second plurality of electronic means each having a control electrode connected to one of said first plurality of electronic means to selectively receive an enabling potential in accordance with the on or off condition of the connected one of said first plurality of electronic means, switching means controlled by said second plurality of electronic means, and means for supplying an operating pulse to each of said control electrodes to operate those of said second plurality of electronic means having an enabling potential, the selective operation of said second plurality of electronic means controlling the operation of said switching means.

14. The system set forth in claim 13 including means for successively supplying a plurality of switch controlling characters to said first plurality of electronic means, and means for restoring said second plurality of electronic means to a normal condition incident to supplying each of said switch controlling characters to said first plurality of electronic means.

15. In a switching system for use with control signals having numerical significance, a plurality of relays each having a pair of operating windings, a plurality of contacts controlled by said relays for selectively establishing a conductive path, means for energizing one of the windings of one of said relays in accordance with the numerical value of the control signal, and means for energizing the other of the windings of a group of said relays including said one relay in accordance with the odd or even character of the control signal whereby only said one relay is operated to actuate said plurality of contacts.

16. In a switching system for use with control signals having numerical significance, a plurality of relays controlling a plurality of contacts for establishing a selected conductive path, means for partially energizing a group of said relays in accordance with the odd or even character of a portion of the control signal, and means for additionally energizing one of said group of relays in accordance with the numerical value of a portion of said control signal to operate only said one of said group of relays.

17. In a switching system for use with a plural digit control signal, a first and a second plurality of relays controlling a plurality of contacts for establishing a conductive path, means for operating a selected one of said first plurality of relays representing a pair of digits in one order in accordance with the value of one of the digits in said control signal, means for partially energizing a group of relays in said second plurality of relays in accordance with the odd or even character of said one digit in said control signal, and means for further energizing one of said relays in said group of relays in accordance with the value of another digit in said control signal to operate said one relay in said energized group of relays whereby said plurality of contacts is actuated in accordance with the control signal to establish a conductive path.

18. A data switching system for use with a control signal including a tens digit and a units digit comprising a first plurality of relays representing successive pairs of units digits, a second plurality of relays including pairs of relays representing each of the tens digits, a plurality of contacts controlled by said relays in said first and second pluralities for establishing a conductive path in accordance with the control signal, and control means for selectively operating one of said first plurality of relays in accordance with the value of the units digit and for operating one of the relays in said second plurality in accordance with the value of the tens digit and the odd or even character of the units digit.

19. The switching system set forth in claim 18 in which the control means includes means for energizing both of the pair of relays representing the value of the tens digit and means for additionally energizing only one of said energized pair of relays in accordance with the odd or even character of the units digit of said control signal.

20. The switching system set forth in claim 18 in which the control means includes means for energizing one of each of said pairs of tens digit relays in accordance with the odd or even character of the units digit of the control signal, and means for energizing the pair of said tens relays representing the value of the tens digit whereby only the single relay in said energized pair of relays is operated which is concurrently energized in accordance with the odd or even character of the units digit of the control signal.

21. In a data transmission system utilizing messages including message directing portions, a sensible medium adapted to store said messages and said message directing portions, message receiving means, control means controlled by said message directing portions for rendering said receiving means effective to receive said stored messages, transmitting means including medium moving means for transmitting messages to said receiving means, and means controlled by said control means for controlling the operation of said medium moving means.

22. In a data handling system, data storing means for storing messages having address portions, a plurality of data transmitting means, means for rendering one of said data transmitting means responsive to receive said stored messages from said data storing means, a switch controlling means common to said plurality of data transmitting means, means for connecting said associated one of said data transmitting means to said switch controlling means, switching means, and means for transferring said address portions from said one transmitting means to said switch controlling means to operate said controlling means to actuate said switching means in accordance with said address portions.

23. In a data handling system comprising a plurality of data transmitting stations, a plurality of data receiving links each including means for recording received data on and means for reproducing recorded data from a sensible member, means for connecting one of said transmitting stations to an idle one of said data receiving links, a plurality of outgoing links each including switching means, means for connecting one of said outgoing links to said one data receiving link, a switch controlling means common to said outgoing links, and means for connecting said switch controlling means to said one outgoing link to operate the switching means in said one outgoing link to establish a signaling path from the means for reproducing recorded data in said one data receiving link.

24. A data handling system comprising a data transmitting station, a data receiving link connected to said station and including a storage elements for storing data and address signals received from said station, a plurality of outgoing links each including a distributor, means for connecting one of said outgoing links to said data receiving link to render the distributor in said one outgoing link responsive to the data and address signals stored on said element, and means operated by the distributor in said one outgoing link in accordance with said address signals for preparing a signaling path for receiving signals provided by the distributor in said one outgoing link in accordance with the stored data on said element in said data receiving link.

25. A data handling system comprising a plurality of data transmitting stations, a plurality of data receiving links each including a storage element for receiving and storing messages including address portions, means for seizing and connecting idle ones of said data receiving links to said transmitting stations, a plurality of outgoing links each including switching means, means for seizing and for selectively and individually connecting said outgoing links to seized ones of said data receiving links, a plurality of message recorders, switch control means common to said plurality of outgoing links, and means for selectively and sequentially connecting said switch control means to different seized ones of said outgoing links to utilize the address portions of the messages stored in the seized one of the data receiving links for selectively operating the switching means in the seized ones of the outgoing links to direct said messages to different ones of said message recorders.

26. A data handling system comprising a data transmitting station, a data receiving link connected to said station and including a storage element adapted to receive and store messages including address portions preceded by control signals transmitted by said station, a plurality of outgoing links each including switching means, means for connecting one of said outgoing links to said data receiving link, and means included in said one outgoing link and controlled by the control signals stored on said storage element in said data receiving link for connecting said switch control means to said one outgoing link at time spaced intervals during the connection of said one link to said data receiving link to utilize said address portions for selectively operating the switching means in said one outgoing link to direct the transmission of the messages stored on said element.

27. A data handling system comprising a data transmitting station, a data receiving link connected to said station and including a storage element adapted to receive and store messages including address portions and control signals, a plurality of outgoing links each including a data storing means and switching means, means for connecting one of said outgoing links to said data receiving link to place the data storing means in said one outgoing link under the control of said storage element, signaling means including said data storage means for supplying message signals, switch control means common to said outgoing links, and means controlled by said control signals for connecting said switch control means to said data storage means to utilize said address portions for operating the switching means in said one outgoing link to establish a signaling path for receiving said message signals.

28. A data handling system comprising a plurality of data transmitting stations, a plurality of data receiving links each including means for recording received data on and means for reproducing recorded data from a sensible member, means for connecting an idle one of said receiving links to a transmitting station to receive and record data transmitted therefrom, a plurality of outgoing links each including distributing means, means for connecting said one receiving link to an idle one of said outgoing links, and means including said distributing means in said one outgoing link and said means for reproducing recorded data in said one receiving link for supplying outgoing signals in accordance with the transmitted data recorded on the sensible member in said receiving link.

29. A data handling system comprising a plurality of data transmitting stations, a plurality of data receiving links each including means for recording received data on and reproducing means for reproducing recorded data from a sensible member, means for connecting an idle one of said data receiving links to a data transmitting station, a plurality of outgoing links each including switching means and a distributor, means for connecting one of said outgoing links to said one data receiving link to connect said reproducing means in said one receiving link with the distributor in said outgoing link, and means responsive to said connection of said receiving link and said outgoing link for operating the switching means in said one outgoing link to prepare a selected signaling path controlled by said connected distributor and reproducing means.

30. A data handling system comprising a data transmitting station, a plurality of data receiving links each including a storage element adapted to receive transmitted data and reproducing means for reproducing data from said storage element, means for connecting an idle one of said receiving links to said transmitting station to receive and store transmitted data on said element, a plurality of outgoing links each including a storage device, means for connecting one of said outgoing links to said one data receiving link, means for transferring a portion of the data stored in said one data receiving link to said storage device in said one outgoing link, recording means connected to said outgoing link, and means including said storage device in said one outgoing link and said reproducing means in said one data receiving link for transmitting said stored data to said recording means.

31. The data handling system set forth in claim 30 in which each of said outgoing links includes a transmitting commutator and in which said means for transferring a portion of the data stored in said one data receiving link includes the transmitting commutator in said one outgoing link.

32. A data handling system comprising a data transmitting station; a data receiving link connected to said station and including a storage element for storing data received from said station, said data comprising messages having related address portions and first and second control signals; a plurality of outgoing links, each of said outgoing links including a first storage means, a second storage means, and switching means; means for connecting one of said outgoing links to said first receiving link to place said data storage means under the control of the storage element in said data receiving link; means for advancing said storage element to transmit said stored first to said data storage means for storage therein; means controlled by the storage of a first control signal in said first storage means for transferring a message from said element to said second storage means; switch control means common to said outgoing links; means controlled by the storage of a second control signal in said first storage means for rendering said switch control means responsive to address portions stored in said first storage means to control the selective operation of the switching means in said one outgoing link, the selective operation of said switching means establishing a selected signaling path; and signaling means including said first storage means for transmitting signals over said signaling path in accordance with a message stored on said element.

33. The system set forth in claim 32 including means for operating said second storage means to supply signals to said signaling path in accordance with the message transferred to said second storage means from said storage element.

34. The system set forth in claim 33 in which the means for operating said second storage means to supply signals to said signaling path includes means controlled by the storage of a first control signal in said first storage means.

35. The system set forth in claim 33 in which the means for operating said second storage means to supply signals to said signaling path includes means for rendering said signaling means ineffective.

36. The system set forth in claim 33 in which the means for operating said second storage means to supply signals to said signaling path includes means to arrest operation of said means for advancing the storage element.

37. In a data handling system, a sensible medium for storing data, recording means for recording received data on said medium, first moving means for moving said medium relative to said recording means, reproducing means for reproducing recorded data from said medium, second moving means for moving said medium relative to said reproducing means, first means controlled by the amount of said medium disposed between said recording means and said reproducing means, and means controlled by said first means for simultaneously operating said first and second moving means.

38. In a data handling system, a sensible medium for storing data, recording means for recording received data on said medium, first moving means for moving said medium relative to said recording means, reproducing means for reproducing recorded data from said medium, second moving means for moving said medium relative to said reproducing means, sensing means for determining the amount of said medium disposed between said recording means and said reproducing means, and means controlled by said sensing means and including said second moving means for operating said first moving means.

39. In a data handling system, a sensible medium for storing data, recording means for recording received data on said medium, first moving means for moving said medium relative to said recording means, reproducing means for reproducing recorded data from said medium, second moving means for moving said medium relative to said reproducing means independently of movement of said medium relative to said recording means, and means controlled by said second moving means for operating said first moving means.

40. A message handling system comprising plurality of incoming signaling lines, a receiving link including a storage element for storing a plurality of received message means for connecting said receiving link to different ones of said incoming lines in sequence to receive a message from each of said lines, a plurality of outgoing links each including message sending means, means for connecting said receiving link to one of said outgoing links to render the message sending means in said one outgoing link responsive to the first message stored on said element, and means responsive to the completion of the transmission of said first message by the message sending means in said one outgoing link for releasing said one outgoing link and for connecting another one of said outgoing links to said receiving link.

41. A data handling system comprising a plurality of incoming signaling lines, a data receiving link including a storage means for storing a plurality of different received data entries, means for connecting said receiving link to different ones of said incoming lines in sequence to receive a data entry from each of said lines, a plurality of outgoing links each including a data transmitting means adapted to be controlled by said storage means to transmit the stored data entries, and means for connecting an idle one of said outgoing links to said receiving link following the transmission of each of said stored data entries by one of said data transmitting means.

42. A data handling system comprising a data receiving link including a length of storage medium adapted to store a plurality of data entries, a plurality of outgoing links each including data transmitting means adapted to be controlled by said storage medium, allotting means for connecting an idle one of said outgoing links to said data receiving link, and means controlled by the amount of said storage medium having data entries stored thereon for periodically operating said allotting means to connect an idle one of said outgoing links to said data receiving link following the transmission of each of said different data entries.

43. In a code controlled switching system, a plurality of recorders selectable in accordance with code signals, an intercept recorder, switching means, and control means connected to said switching means and responsive to receive code signals for operating said switching means to select one of said plurality of recorders in accordance with received code signals representing numerical characters and to select said intercept recorder in accordance with received code signals representing other than numerical characters.

44. In a code controlled switching system, a plurality of recorders selectable in accordance with code signals, an intercept recorder, switching means, means responsive to received code signals representing numerical characters for operating said switching means to establish a path to a selected one of said plurality of recorders, and means controlled by received code signals representing other than numerical characters for establishing a path to said intercept recorder.

45. In a code controlled switching system, a plurality of recorders selectable in accordance with received code signals, an intercept recorder, switching means, control means responsive to received code signals for operating said switching means to select one of said plurality of recorders in accordance with received code signals representing numerical characters, intercept means controlled by said control means for selecting said intercept recorder when code signals representing other than numerical characters are received by said control means, and means for periodically rendering said intercept means nonresponsive to non-numerical code signals received by said control means.

46. In a code controlled switching system, a plurality of recorders selectable in accordance with received code signals, switching means, register means for controlling the operation of said switching means, and control means responsive to received code signals for transferring received code signals representing numerical characters only to said register means so that said switching means is operated to select one of said plurality of recorders only in accordance with received code signals representing numerical characters.

47. The switching system set forth in claim 46 including an intercept recorder, and means operated by said control means for selecting said intercept recorder when code signals representing other than numerical characters are received by said control means.

48. In a data transmission system, storage means for receiving and storing a plurality of different messages and a common message, a plurality of recorders, and means controlled by said storage means for sequentially transmitting one of said different messages and said common message to different ones of said recorders.

49. In a data transmission system for use with messages having a repetitive portion, storage means for separately storing said messages and said repetitive portion, message receiving means, and means controlled by said storage means for transmitting said messages to said receiving means and for transmitting said repetitive portion to said message receiving means at time spaced intervals.

50. In a data transmission system, data transmitting means for transmitting a group of individual messages together with a common message, data receiving means connected to said transmitting means for storing said common message and said individual messages, recording means, and means for transmitting each of said individual messages to said recording means in conjunction with said common message, said common message being transmitted in conjunction with each of said individual messages.

51. In a data transmission system, data transmitting means for transmitting a group of individual messages together with a common message, data receiving means connected to said transmitting means for storing the received individual and common messages, a storage means controlled by the data receiving means for receiving and storing the common message, recording means, and means controlled by the stored individual messages and by the storage means for operating the recording means to record the common message in conjunction with each of the individual messages.

52. In a recorder control system, a recorder, first storage means for storing a message, second storage means for storing a repetitive message, transmitting means controlled by said first storage means for transmitting said message to said recorder, and control means controlled by said first storage means and including said second storage means for supplying said repetitive message to said recorder at time spaced intervals.

53. The apparatus set forth in claim 52 in which said control means includes means for momentarily arresting operation of said transmitting means.

54. In a data processing system, first storage means for storing a first message, second storage means for storing a second message, a recorder, first transmitting means controlled by said first storage means for transmitting said first message to said recorder, second trasnmitting means controlled by said second storage means for transmitting said second message to said recorder, and control means for initiating operation of said first and second transmitting means in a timed sequence to transmit and second message to said recorder interposed between portions of said first message.

55. The system set forth in claim 54 in which said control means is controlled by said first storage means.

56. In a data handling system, data transmitting means for transmitting a common message and a plurality of individual messages, data receiving means for storing the transmitted individual and common messages, a plurality of storage devices, means for connecting one of said storage devices to said data receiving means to receive and store said common message, recording means, and means including said connected storage device for operating said recording means to record said common message in conjunction with each of said individual messages.

57. A data handling system comprising data receiving means for storing a common message and a plurality of messages with address portions, a storage means for receiving and storing said common message, a plurality of recorders, means controlled by said data receiving means for directing said plurality of messages to selected ones of said recorders in accordance with said address portions, and means controlled by said storage means for directing said common message to each of said selected ones of said recorders.

58. A data handling system comprising transmitting means for transmitting a common message and a plurality of individual messages including address portions, data receiving means for receiving and storing said common message and said plurality of individual messages, a plurality of recorders, switching means controlled by said address portions for directing said individual messages to selected ones of said recorders, and means for transmitting said common message from said data receiving means to each of said selected ones of the recorders.

59. In a data handling system, a data link adapted to successively store a group of first messages and a plurality of groups of second messages, a storage means including a closed loop of sensible medium, means for transferring each of said first messages from said link to said sensible medium in said storage means, recording means, means controlled by said link for successively transmitting each of said plurality of groups of second messages to said recording means, and means controlled by said link for operating said storage means to transmit each of said group of first messages to said recording means in conjunction with different ones of said plurality of groups of second messages.

60. The system set forth in claim 59 including means for moving said loop through a predetermined movement during each transmission of one of said first messages to said recording means.

61. In a data handling system, data transmitting means for transmitting a common message and a plurality of individual messages together with control signals, data receiving means for storing transmitted common and individual messages and control signals, a storage means having a closed loop of a sensible medium, means for transferring said common message from said data receiving means to said loop of sensible medium, recording means controlled by said stored individual messages for producing records thereof, and means controlled by said stored control signals for moving said loop through a predetermined movement to transmit said common message to said recording means.

62. The system set forth in claim 61 including means controlled by a selected one of said control signals for initiating operation of said transferring means.

63. The system set forth in claim 61 including means controlled by a predetermined movement of said loop of sensible medium for arresting operation of said means for moving said loop.

64. In a data handling system, a data receiving link for storing a first message and a second message together with control signals, a magnetic recorder having an endless magnetic member, means controlled by one of said stored control signals for transmitting said first message to said magnetic recorder for storage on said magnetic member, recording means, means for transmitting said stored second message to said recording means, and means controlled by other of said control signals for transmitting said first message from said magnetic recorder to said recording means.

65. The system set forth in claim 64 including means for moving said endless magnetic member during transmission of said first message to said recording means, and means operated in accordance with a predetermined cycle of movement of said endless member for interrupting said transmission of said first message to said recording means.

66. In a data handling system, data transmitting means for transmitting a common message and a plurality of individual messages, data receiving means for storing said transmitted common message in sequential code form and said individual messages in simultaneous code form, recording means, and means controlled by said data receiving means for operating said recording means to record said common message in conjunction with each of said individual messages.

67. A data handling system using combinational codes and including means for transmitting a common message and a plurality of individual messages comprising data receiving means for storing a transmitted common message and a plurality of transmitted individual messages on a sensible medium in combinational code form, each character code combination stored on said sensible medium comprising a code unit of a plurality of bits adapted to be simultaneously sensed; a magnetic recorder including a magnetic member; converting means for simultaneously sensing all of the bits of each code unit stored on said sensible medium pertaining to said common message and for storing said common message on said magnetic member in the form of a plurality of combinational code units each including a plurality of bits adapted to be sequentially sensed; recording means; means including sensing means controlled by said sensible medium for transmitting said individual messages to said recording means; and control means including said magnetic member for transmitting said common message to said recording means.

68. The system set forth in claim 67 in which said control means includes means for operating said magnetic recorder to transmit said common message to said recording means incident to the transmission of each of said individual messages thereto.

69. The system set forth in claim 67 in which said control means includes means for cyclically moving said magnetic member through a predetermined path to transmit said common message to said recording means at time spaced intervals.

70. In a data transmission system, a first storage means for receiving and storing a plurality of different messages and a common message, a second storage means for receiving said common message from said first storage means and for storing said common message on a sensible medium, a plurality of recorders, means controlled by said first and second storage means for transmitting each of said different messages to a selected one of said plurality of recorders in conjunction with said common message, and means operative following the transmission of all of said plurality of different messages for removing said common message from said sensible medium.

References Cited in the file of this patent

UNITED STATES PATENTS

| | | |
|---|---|---|
| 2,501,063 | Levin | Mar. 21, 1950 |
| 2,633,326 | Putt | Dec. 12, 1950 |
| 2,614,169 | Cohen | Oct. 14, 1952 |
| 2,636,672 | Hamilton | Apr. 28, 1953 |
| 2,673,236 | Phelps | Mar. 23, 1954 |
| 2,679,638 | Bensky | May 25, 1954 |
| 2,710,392 | Jammer | June 7, 1955 |
| 2,714,626 | Locke | Aug. 2, 1955 |
| 2,719,773 | Karnaugh | Oct. 4, 1955 |
| 2,732,275 | MacNeill | Jan. 24, 1956 |
| 2,732,504 | Steele | Jan. 24 1956 |
| 2,766,318 | Bacon | Oct. 9, 1956 |
| 2,805,283 | Stiles | Sept. 3, 1957 |